US012764208B2

(12) United States Patent
Park et al.

(10) Patent No.: US 12,764,208 B2
(45) Date of Patent: Oct. 13, 2026

(54) ELECTRONIC DEVICE COMPRISING FLEXIBLE DISPLAY AND METHOD FOR CONTROLLING ELECTRONIC DEVICE

(71) Applicant: Samsung Electronics Co., Ltd., Suwon-si (KR)

(72) Inventors: Gyeongtae Park, Suwon-si (KR); Moonjeong Kim, Suwon-si (KR); Wankyu Kim, Suwon-si (KR); Sunghwan Park, Suwon-si (KR); Sangeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/808,964

(22) Filed: Aug. 19, 2024

(65) Prior Publication Data

US 2024/0414250 A1 Dec. 12, 2024

Related U.S. Application Data

(63) Continuation of application No. PCT/KR2023/000918, filed on Jan. 19, 2023.

(30) Foreign Application Priority Data

Mar. 3, 2022 (KR) ........................ 10-2022-0027719
Jul. 1, 2022 (KR) ........................ 10-2022-0081170

(51) Int. Cl.
*H04M 1/72469* (2021.01)
*G06F 3/04817* (2022.01)
(Continued)

(52) U.S. Cl.
CPC ...... *H04M 1/0235* (2013.01); *G06F 3/04817* (2013.01); *G06F 3/0488* (2013.01);
(Continued)

(58) Field of Classification Search
CPC .... G06F 1/1624; G06F 1/1652; G06F 1/1656; G06F 1/1677; G06F 1/1698;
(Continued)

(56) References Cited

U.S. PATENT DOCUMENTS 11,252,826 B2 2/2022 Park et al.
11,366,584 B2 * 6/2022 Chung ................ G06F 3/04883
(Continued)

FOREIGN PATENT DOCUMENTS

CN 112217923 A 1/2021
KR 100226152 B1 10/1999
(Continued)

OTHER PUBLICATIONS

International Search Report for PCT/KR2023/000918 mailed Apr. 27, 2023, 4 pages.
(Continued)

*Primary Examiner* — Mihir K Rayan
(74) *Attorney, Agent, or Firm* — NIXON & VANDERHYE P.C.

(57) ABSTRACT

An electronic device according to various embodiments of the present disclosure may comprise: a wireless communication module including wireless communication circuitry; a first housing; a second housing coupled to the first housing to be able to slide; a flexible display comprising a first display area visible when the second housing is in a slide-in state with regard to the first housing, and a second display area visible when the second housing is in a slide-out state with regard to the first housing; a memory; and at least one processor, comprising processing circuitry, operatively connected to the wireless communication module, the flexible display, and the memory. At least one processor, individually and/or collectively, may be configured to control the electronic device to: display a first application in the first display
(Continued)

area based on the second housing being in a slide-in state with regard to the first housing, display, at a first location in the first display area, a notification received from an external electronic device using the wireless communication module, generate a state change icon at a second location in the first display area based on reception of the notification, switch the second housing from the slide-in state to the slide-out state based on the state change icon being touched, and display a second application corresponding to the notification in the second display area.

14 Claims, 61 Drawing Sheets

(51) Int. Cl.

| | |
|---|---|
| ***G06F 3/0488*** | (2022.01) |
| ***G09G 3/00*** | (2006.01) |
| ***H04M 1/02*** | (2006.01) |
| ***H04M 1/72484*** | (2021.01) |

(52) U.S. Cl.
CPC .......... *G09G 3/035* (2020.08); *H04M 1/0268* (2013.01); *H04M 1/72469* (2021.01); *H04M 1/72484* (2021.01); *G09G 2354/00* (2013.01); *H04M 2201/38* (2013.01)

(58) Field of Classification Search
CPC ............... G06F 3/04817; G06F 3/0482; G06F 3/04842; G06F 3/0486; G06F 3/0488; G06F 3/04883; G06F 3/04886; G06F 2203/04803; G09G 3/035; G09G 2354/00; H05M 1/72403; H05M 1/72454; H05M 1/72469; H05M 1/72484; H04M 2201/38
See application file for complete search history.

(56) References Cited

U.S. PATENT DOCUMENTS

| | | | | |
|---|---|---|---|---|
| 2009/0160802 | A1* | 6/2009 | Yasumi ............... | H04M 1/0245 345/173 |
| 2015/0185980 | A1 | 7/2015 | An | |
| 2016/0378270 | A1 | 12/2016 | Lee | |
| 2019/0261519 | A1* | 8/2019 | Park ...................... | G06F 1/1652 |
| 2019/0346954 | A1* | 11/2019 | Jung ...................... | G06F 3/0416 |
| 2021/0034210 | A1* | 2/2021 | Chung .................. | G06F 3/0488 |
| 2021/0089173 | A1* | 3/2021 | Han ...................... | G06F 3/0488 |
| 2021/0263564 | A1 | 8/2021 | Chen | |
| 2022/0035494 | A1* | 2/2022 | Lee ....................... | G06F 3/0488 |
| 2022/0035513 | A1 | 2/2022 | Kang | |
| 2022/0035523 | A1 | 2/2022 | Noh et al. | |
| 2022/0057919 | A1 | 2/2022 | Noh | |
| 2022/0164093 | A1* | 5/2022 | Kang .................. | G06F 3/04842 |
| 2023/0077374 | A1* | 3/2023 | Yang ................... | G06F 3/04847 |
| 2023/0141581 | A1* | 5/2023 | Kim ...................... | G06F 3/0484 455/575.4 |
| 2023/0224401 | A1* | 7/2023 | Ok ...................... | H04M 1/0235 455/575.4 |

FOREIGN PATENT DOCUMENTS

| | | | |
|---|---|---|---|
| KR | 20150077774 | A | 7/2015 |
| KR | 20160142172 | A | 12/2016 |
| KR | 20170000553 | A | 1/2017 |
| KR | 20170083404 | A | 7/2017 |
| KR | 20190101184 | A | 8/2019 |
| KR | 20200119019 | A | 10/2020 |
| KR | 102262962 | B1 | 6/2021 |
| KR | 20220061785 | A | 5/2022 |
| KR | 20230031315 | A | 3/2023 |

OTHER PUBLICATIONS

Written Opinion of the ISA for PCT/KR2023/000918 mailed Apr. 27, 2023, 5 pages.
Extended European Search Report dated Apr. 4, 2025 for EP Application No. 23763617.0.
Office Action for IN Application No. 202417066326 dated Apr. 22, 2026, 9 pages.

* cited by examiner

FIG. 10B
300
330a
715
710
Dayna
Call
SHADOW ART
725
y
-x
x
z
-y

ELECTRONIC DEVICE COMPRISING FLEXIBLE DISPLAY AND METHOD FOR CONTROLLING ELECTRONIC DEVICE

CROSS-REFERENCE TO RELATED APPLICATIONS

This application is a continuation of International Application No. PCT/KR2023/000918 designating the United States, filed on Jan. 19, 2023, in the Korean Intellectual Property Receiving Office and claiming priority to Korean Patent Application Nos. 10-2022-0027719, filed on Mar. 3, 2022, and 10-2022-0081170, filed on Jul. 1, 2022, in the Korean Intellectual Property Office, the disclosures of each of which are incorporated by reference herein in their entireties.

BACKGROUND

Field

The disclosure relates to an electronic device including a flexible display and a method of controlling the electronic device.

Description of Related Art

The use of electronic devices such as smartphones is increasing, and various functions are being provided by electronic devices.

Such an electronic device may include various types of installed applications and provide various information such as text, images, or videos to the user using a display.

Various types of applications installed on the electronic device may be selectively executed according to the user's preference.

A plurality of applications running on the electronic device may include a foreground application currently displayed on the display screen and a background application that is not displayed on the screen.

For example, in the case of a bar-type electronic device with a limited display size, if the user using a first application intends to use a second application, the first application may be placed in the background and the second application may be displayed in the foreground on the display. When the second application is displayed on the display as a foreground application, the first application may be not displayed on the display as it is placed in the background.

The above bar-type electronic device may fail to simultaneously provide an application running in the foreground (e.g., second application) and an application running in the background (e.g., first application) to the user using the display.

SUMMARY

Embodiments of the disclosure may provide an electronic device and method that enable, using a first display area (e.g., first part) and a second display area (e.g., second part) of a flexible display, simultaneously displaying a first application currently in execution and a second application newly executed in response to occurrence of a specific event, or selective switching between the first application and the second application.

An electronic device according to various example embodiments of the disclosure may include: a wireless communication module including wireless communication circuitry; a first housing; a second housing slidably coupled to the first housing; a flexible display including a first display area visible in a slide-in state based on the second housing being slid in the first housing and a second display area visible in a slide-out state based on the second housing being slid out of the first housing; a memory; and at least one processor, comprising processing circuitry, operably connected to the wireless communication module, the flexible display, and the memory, wherein at least one processor, individually and/or collectively, may be configured to: control the display to display a first application on the first display area based on the second housing being slid in the first housing, display, in response to receiving a notification from an external electronic device through the wireless communication module, the notification being displayed at a first position of the first display area, generate a state change icon at a second position of the first display area based on reception of the notification, and switch, in response to touching the state change icon, the second housing from the slide-in state to the slide-out state and display a second application corresponding to the notification on the second display area.

A method of controlling an electronic device according to various example embodiments of the disclosure may include: displaying, under control of at least one processor of the electronic device in a slide-in state based on a second housing being slid in a first housing, a first application on a first display area of a flexible display; displaying, under control of at least one processor in response to receiving a notification from an external electronic device, the notification at a first position of the first display area; generating, under control of at least one processor, a state change icon at a second position of the first display area based on reception of the notification; and switching, under control of at least one processor in response to touching the state change icon, the second housing from the slide-in state to a slide-out state, and displaying a second application corresponding to the notification on the second display area of the flexible display.

According to various example embodiments of the disclosure, it is possible to provide an electronic device and method that enable, while a first application is running, even if a second application is newly executed in response to occurrence of a specific event, simultaneously displaying the first application and the second application using a first part and a second part of the flexible display (e.g., expandable display).

In addition, various effects that are directly or indirectly identified through this disclosure may be provided.

BRIEF DESCRIPTION OF THE DRAWINGS

In relation to the description of the drawings, the same or similar reference symbols may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
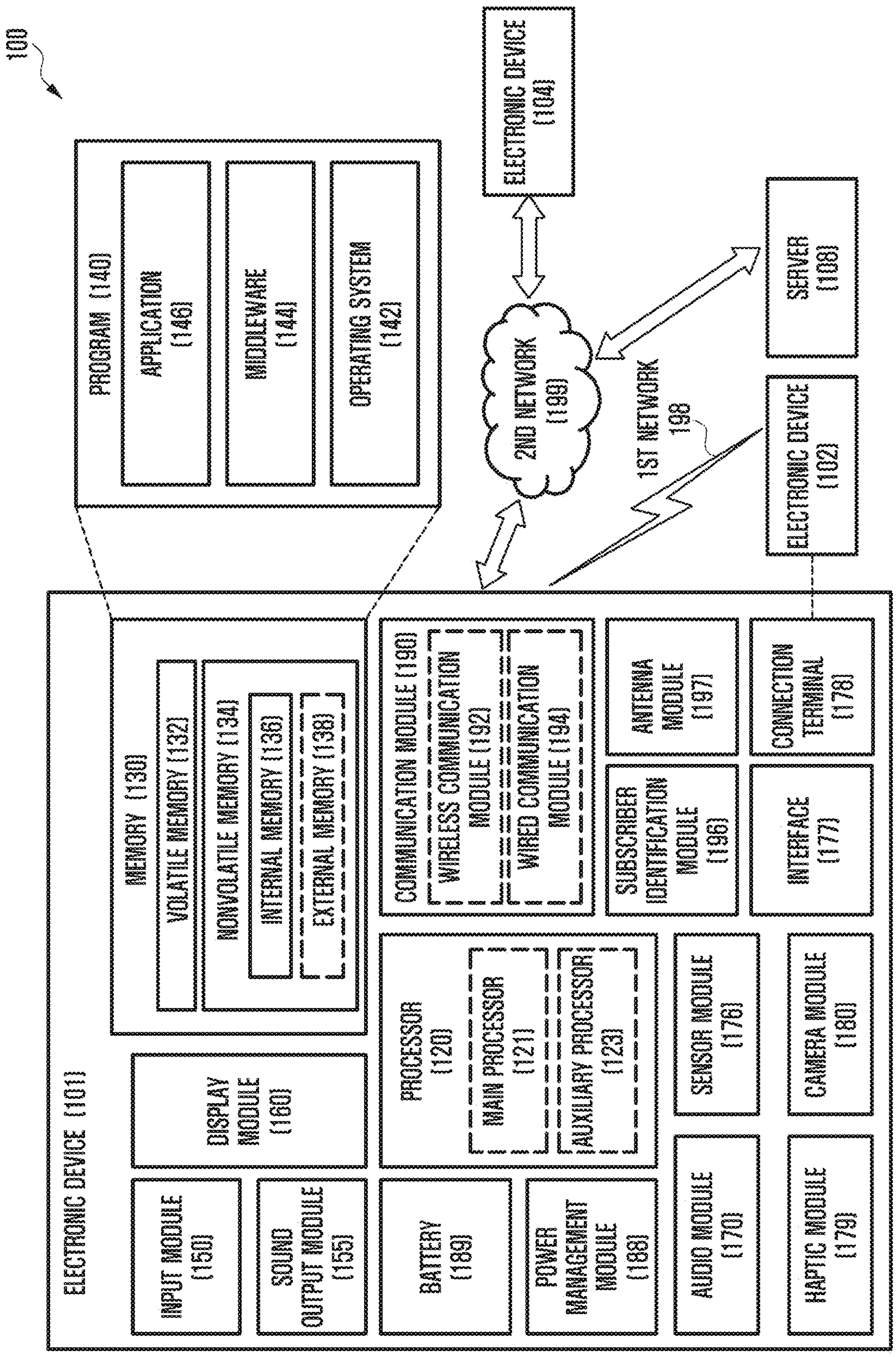
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
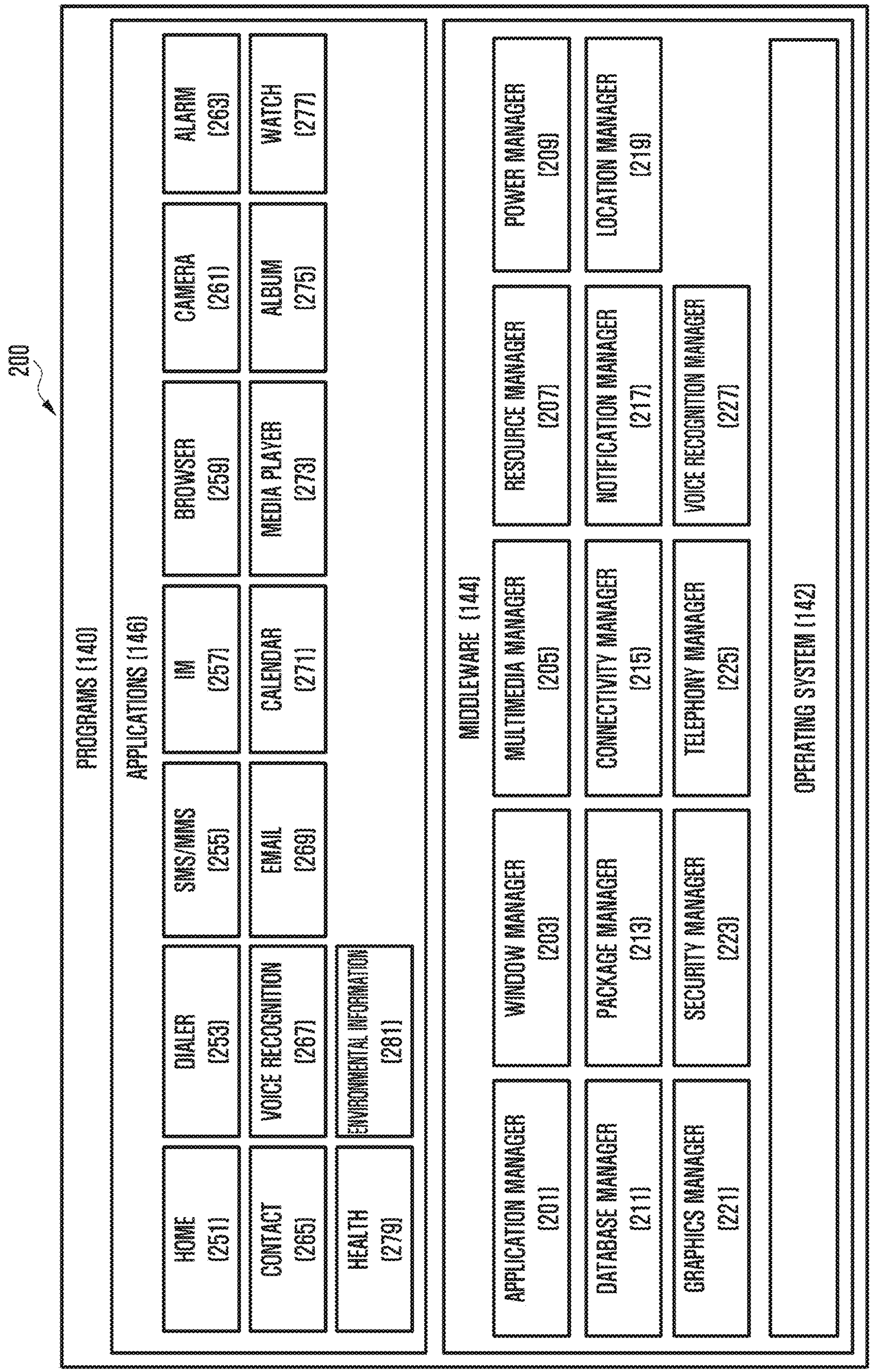
FIG. 2 is a block diagram illustrating example programs according to various embodiments.

FIG. 2 is a block diagram 200 illustrating various example programs 140 according to various embodiments.

According to an embodiment, the programs 140 may include an operating system 142 to control one or more resources of the electronic device 101, middleware 144, or applications 146 executable on the operating system 142. The operating system 142 may include, for example, Android™, iOS™, Windows™, Symbian™, Tizen™, or Bada™. At least some of the programs 140, for example, may be pre-loaded on the electronic device 101 during manufacture, or may be downloaded from or updated by an external electronic device (e.g., electronic device 102 or 104, or server 108) during usage by a user.

The operating system 142 may control management (e.g., allocation or reclamation) of one or more system resources (e.g., process, memory, or power source) of the electronic device 101. Additionally or alternatively, the operating system 142 may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the applications 146 such that functions or information provided from one or more resources of the electronic device 101 may be used by the applications 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphics manager 221, a security manager 223, a telephony manager 225, or a voice recognition manager 227.

The application manager 201, for example, may manage the life cycle of the applications 146. The window manager 203, for example, may manage one or more GUI resources that are used on the screen. The multimedia manager 205, for example, may identify one or more formats required for playing back media files, and may encode or decode a corresponding one of the media files using a codec appropriate for a corresponding format selected from the one or more formats. The resource manager 207, for example, may manage the source codes of the applications 146 or the memory space of the memory 130. The power manager 209, for example, may manage the capacity, temperature, or power of the battery 189, and determine or provide related information required for the operation of the electronic device 101 based on corresponding information among them. According to an embodiment, the power manager 209 may interwork with a basic input/output system (BIOS) (not shown) of the electronic device 101.

The database manager 211, for example, may generate, search, or change a database to be used by the applications 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., incoming call, message, or alert). The location manager 219, for example, may manage location information about the electronic device 101. The graphics manager 221, for example, may manage one or more graphical effects to be offered to a user or a user interface related thereto.

The security manager 223, for example, may provide system security or user authentication. The telephony manager 225, for example, may manage a voice call function or a video call function provided by the electronic device 101. The voice recognition manager 227, for example, may transmit user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some of existing components or add new components. According to an embodiment, at least some of the middleware 144 may be included as part of the operating system 142 or may be implemented as different software separate from the operating system 142.

The applications 146 may include applications, for example, home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., measuring biometric information such as amount of exercise or blood sugar), or environmental information 281 (e.g., measuring air pressure, humidity, or temperature information). According to an embodiment, the applications 146 may further include an information exchange application (not shown) that is capable of supporting information exchange between the electronic device 101 and an external electronic device. The information exchange application, for example, may include a notification relay application configured to transfer designated information (e.g., call, message, or alert) to the external electronic device, or a device management application configured to manage the external electronic device. The notification relay application may transfer notification information corresponding to an occurrence of a specified event (e.g., email reception) at another application (e.g., email application 269) of the electronic device 101 to the external electronic device. Additionally or alternatively, the notification relay application may receive notification information from the external electronic device and provide the notification information to the user of the electronic device 101.

The device management application may control, for example, the power (e.g., turn-on or turn-off) or the function (e.g., brightness, resolution, or focus) of the external electronic device or a specific component thereof (e.g., display module or camera module of the external electronic device). The device management application, additionally or alternatively, may support installation, deletion, or update of an application running on the external electronic device.

The electronic device according to various embodiments disclosed in this disclosure may be one of various types of devices. The electronic device may include, for example, a portable communication device (e.g., smartphone), a computer device, a portable multimedia device, a portable medical instrument, a camera, a wearable device, a home appliance, or the like. The electronic device according to an embodiment of this disclosure is not limited to those described above.

Various embodiments of this disclosure and terms used therein are not intended to limit the technical features described in this disclosure to specific embodiments, and should be understood as including various modifications, equivalents, or substitutes of a corresponding embodiment. With regard to the description of the drawings, similar reference numerals may be used to refer to similar or related elements. A singular form of a noun corresponding to a specific item may include one or multiple instances of the item unless the relevant context clearly indicates otherwise. In this disclosure, each of phrases such as "A or B", "at least one of A and B", "at least one of A or B", "A, B or C", "at least one of A, B and C", and "at least one of A, B or C" may include any one of or all possible combinations of the items enumerated together in the corresponding one of the phrases. Terms such as "1st" and "2nd", or "first" and "second" may be used to simply distinguish a corresponding component from another, and does not limit the components in other aspect (e.g., importance or order). When an element (e.g., first element) is referred to, with or without the term "operably" or "communicatively", as "coupled to/with" or "connected to/with" another element (e.g., second element), the element may be connected or coupled to the other element directly (e.g., wiredly), wirelessly, or via a third element.

The term "module" used in various embodiments of this disclosure may include a unit implemented in hardware, software, or firmware, or any combination thereof, and may be used interchangeably with other terms, for example, "logic", "logic block", "component", or "circuit". A module may be a single integral component, or a minimum unit or part thereof performing one or more functions. For example, according to an embodiment, a module may be implemented in a form of an application-specific integrated circuit (ASIC).

Various embodiments of this disclosure may be implemented as software (e.g., programs 140) including one or more instructions that are stored in a storage medium (e.g., internal memory 136 or external memory 138) readable by a machine (e.g., electronic device 101). For example, a processor (e.g., processor 120) of the machine (e.g., electronic device 101) may invoke at least one of the one or more instructions stored in the storage medium to execute it. This allows the machine to be operated to perform at least one function according to the invoked at least one instruction. The one or more instructions may include a code generated by a compiler or a code executable by an interpreter. The machine-readable storage medium may be provided in the form of a non-transitory storage medium. Here, the "non-transitory" storage medium is a tangible device and may not include a signal (e.g., electromagnetic wave), but this term does not distinguish whether data is stored semi-permanently or temporarily in the storage medium.

According to an embodiment, a method according to various embodiments disclosed in this disclosure may be provided by being included in a computer program product. The computer program product may be traded as a commodity between a seller and a purchaser. A computer program product may be distributed in the form of a machine-readable storage medium (e.g., compact disc read only memory (CD-ROM)) or be distributed online (e.g., download or upload) directly between two user devices (e.g., smartphones) through an application store (e.g., PlayStore™). For on-line distribution, at least a portion of the computer program product may be temporarily stored or temporarily created in a machine readable storage medium such as a memory of a manufacturer's server, an application store's server, or a relay server.

According to various embodiments, each component (e.g., module or program) of the above-described components may include a single entity or multiple entities, and some of the multiple entities may be separately arranged on other components. According to various embodiments, one or more components or operations may be omitted from the above-described components, or one or more other components or operations may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to various embodiments, operations performed by a module, a program, or another component may be carried out in sequence, in parallel, by repetition, or heuristically, or one or more of the operations may be executed in a different order or may be omitted, and one or more other operations may be added.

Figure 3A:
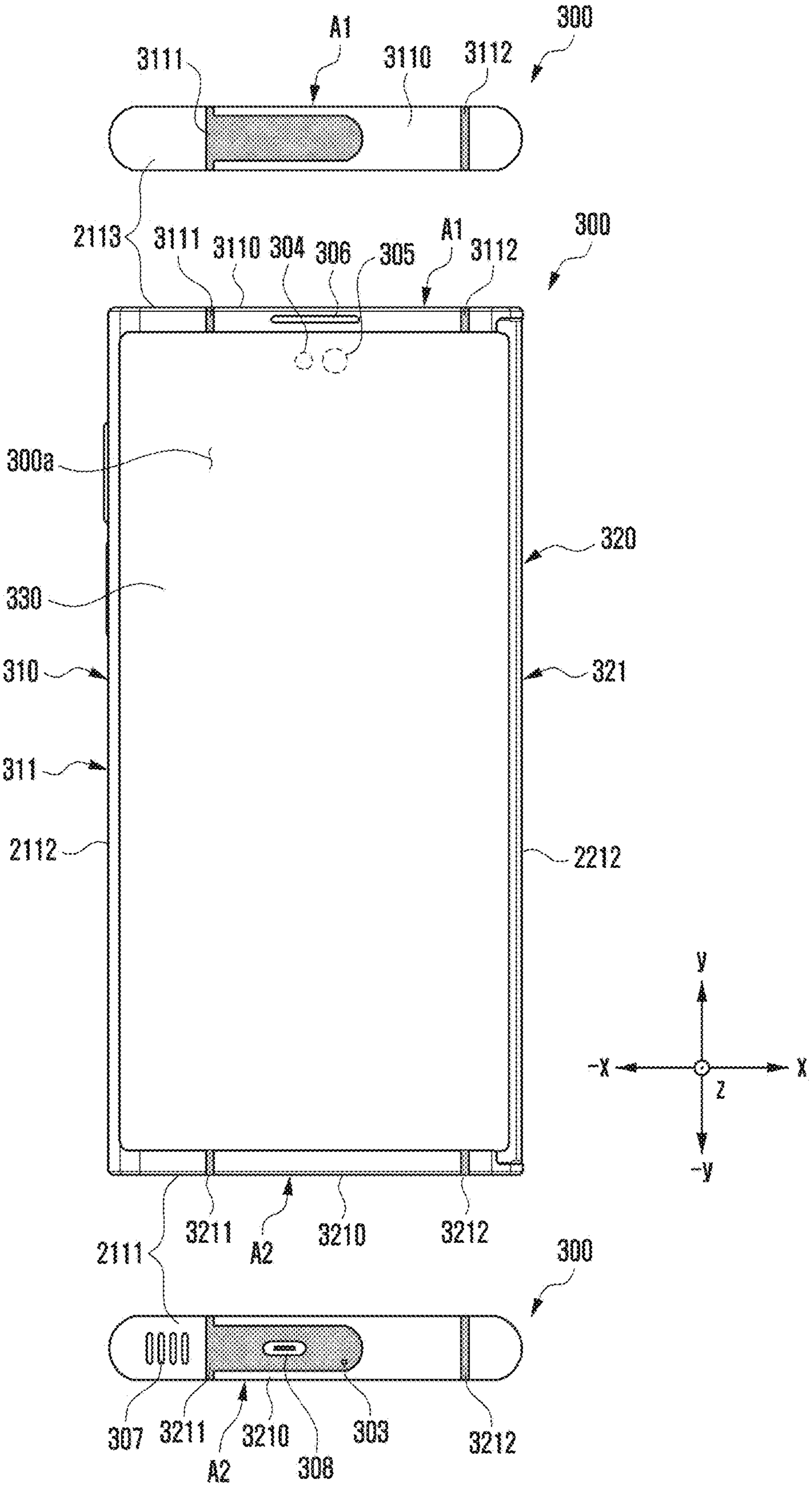
FIGS. 3A and 3B are diagrams illustrating the front and back of an example electronic device in a slide-in state according to various embodiments.
Figure 3B:
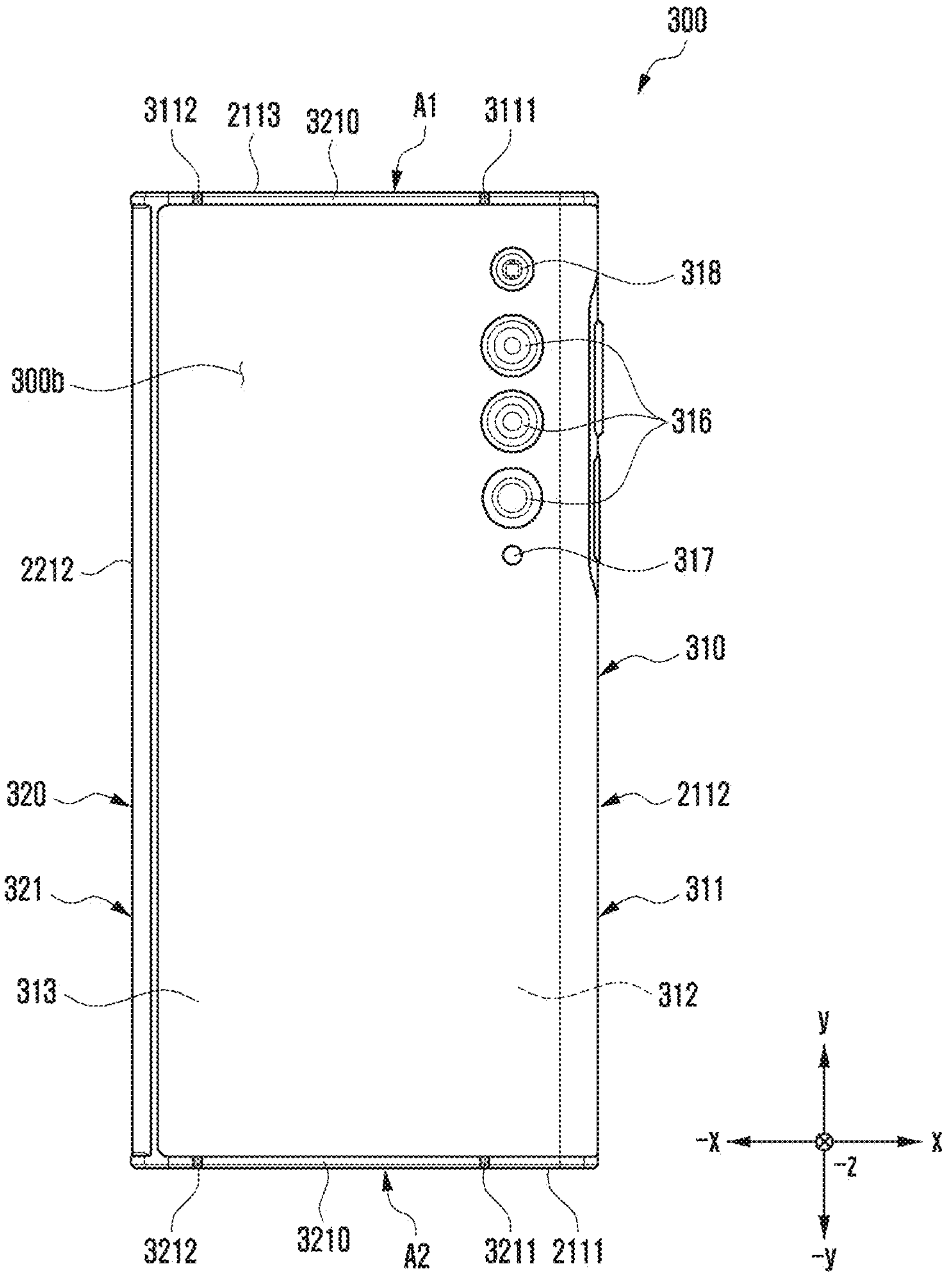
Figure 4A:
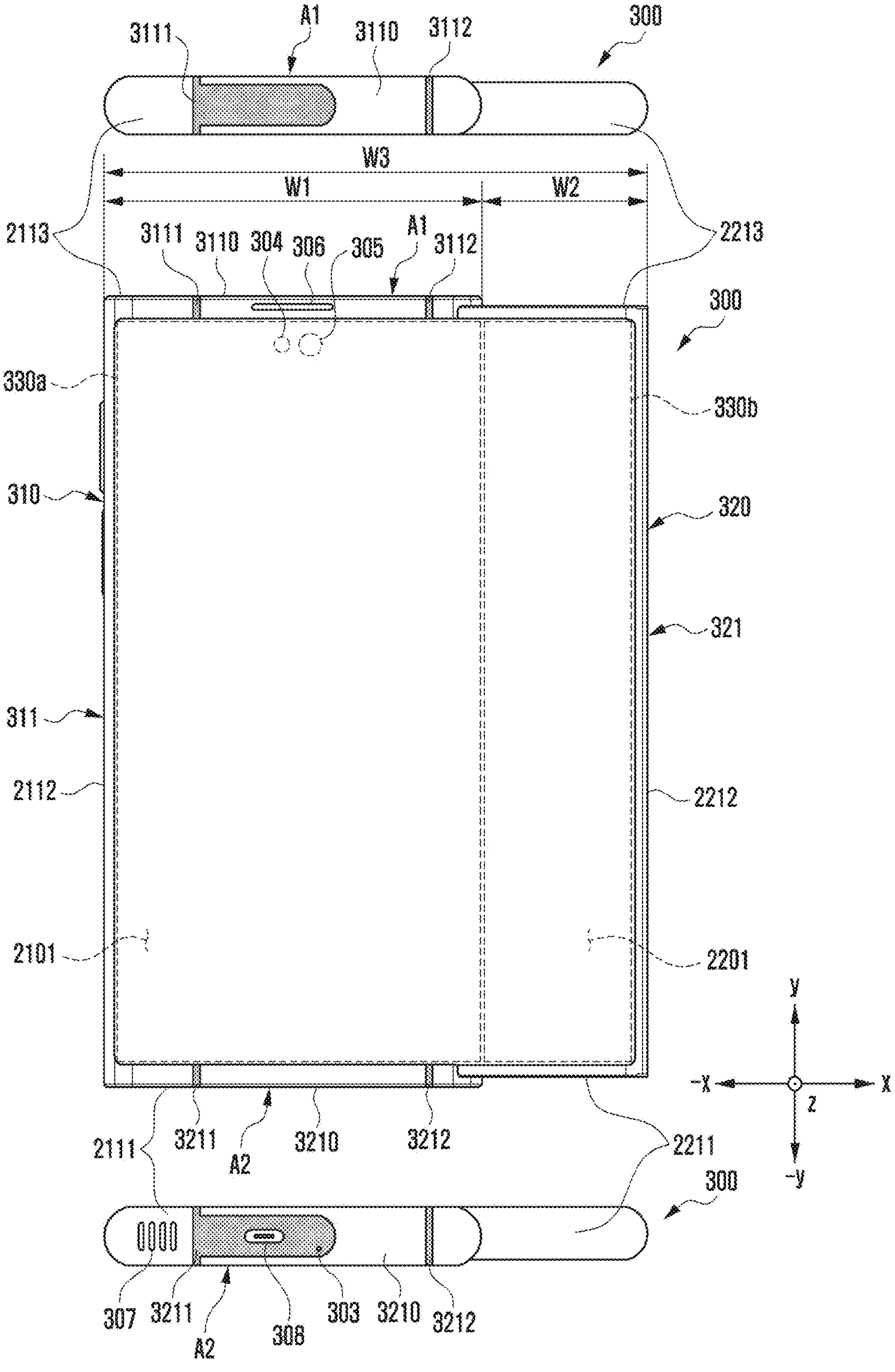
FIGS. 4A and 4B are diagrams illustrating the front and back of an example electronic device in a slide-out state according to various embodiments.
Figure 4B:
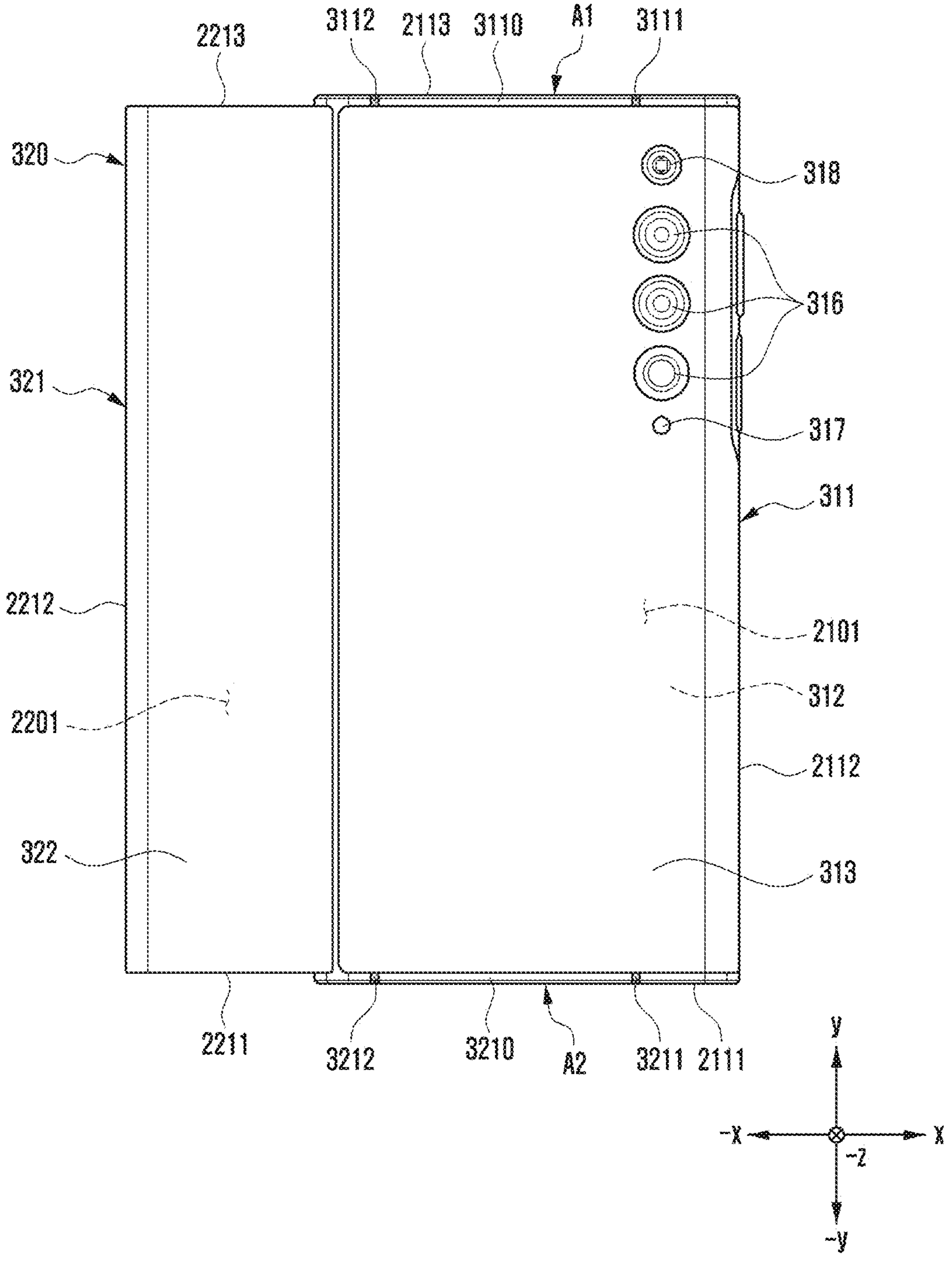

FIGS. 3A and 3B are diagrams illustrating the front and back of an electronic device in a slide-in state according to various embodiments. FIGS. 4A and 4B are diagrams illustrating the front and back of an electronic device in a slide-out state according to various embodiments.

The electronic device 300 of FIGS. 3A, 3B, 4A and 4B (which may be referred to as FIGS. 3A to 4B) may be at least partially similar to the electronic device 101 disclosed in FIG. 1 or may further include various embodiments. The electronic device 300 of FIGS. 3A to 4B may include a rollable type or sliding type electronic device.

With reference to FIGS. 3A to 4B, the electronic device 300 may include a first housing 310 (e.g., first housing structure or base housing), a second housing 320 (e.g., second housing structure or slide housing) movably coupled to the first housing 310 in a specified direction (e.g., x-axis direction) and within a specified distance, and a flexible display 330 disposed to be supported by at least a portion of the first housing 310 and the second housing 320. The flexible display 330 may include an expandable display or a stretchable display. The flexible display 330 may include the display module 160 shown in FIG. 1.

According to an embodiment, at least a portion of the second housing 320 may be accommodated in the first space 2101 of the first housing 310, so that the electronic device 300 may transition to the slide-in state. The electronic device 300 may include a bendable member or bendable support member (e.g., bendable member 340 in FIG. 5) (e.g., multi-joint hinge module or multi-bar assembly), which forms at least partially the same plane as at least a portion of the first housing 310 in the slide-out state and is at least partially accommodated in the second space 2201 of the second housing 320 in the slide-in state.

Figure 5:
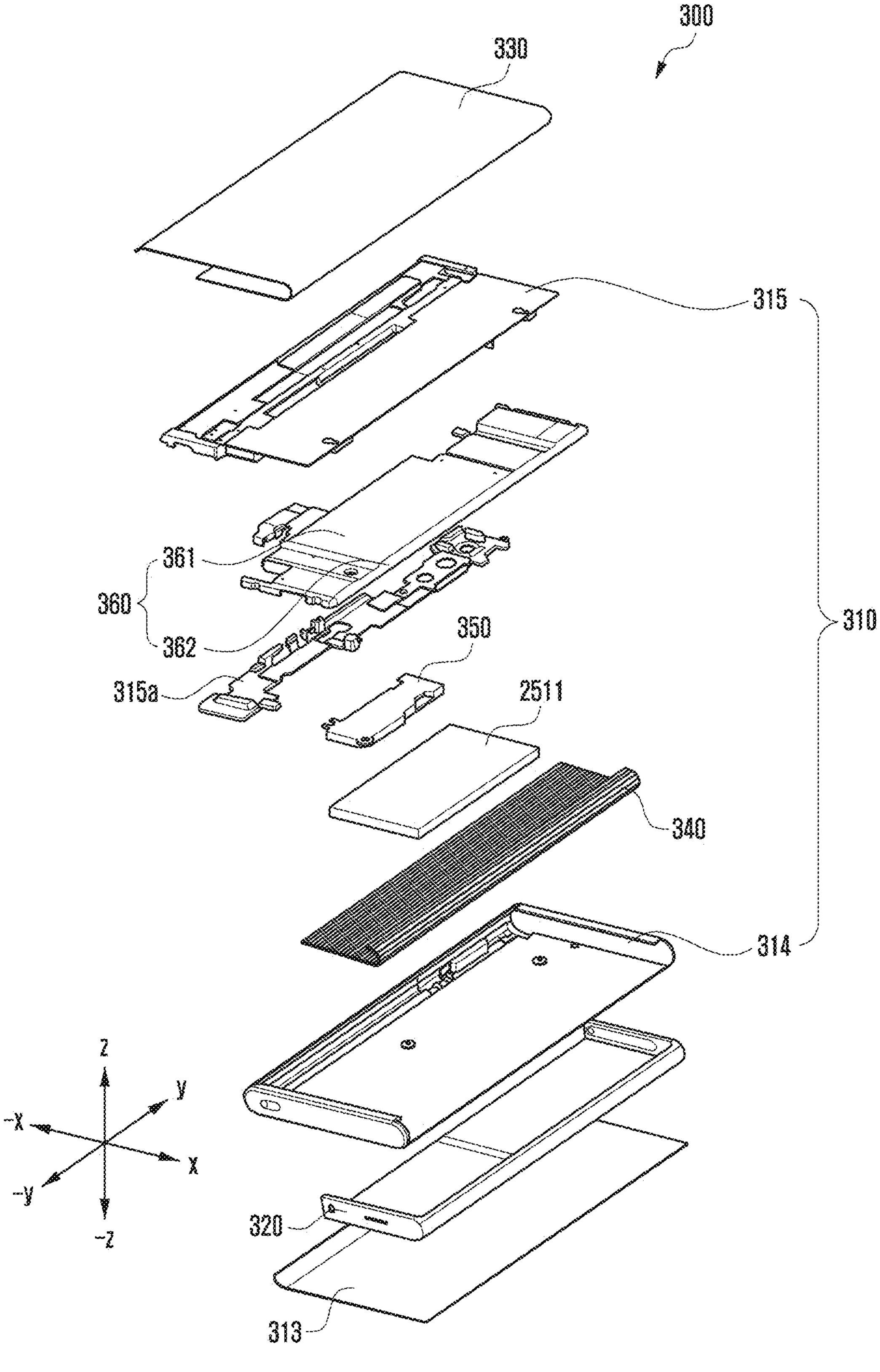
FIG. 5 is an exploded perspective view of an electronic device according to various embodiments.

According to an embodiment, at least a portion of the flexible display 330 may be arranged to be invisible from the outside in the slide-in state (e.g., first state) by being accommodated in the internal space 2201 of the second housing 320 while being supported by the bendable member (e.g., bendable member 340 in FIG. 5). At least a portion of the flexible display 330 may be arranged to be visible from the outside in the slide-out state (e.g., second state) while being supported by the bendable member (e.g., bendable member 340 in FIG. 5) forming at least partially the same plane as the first housing 310.

According to various embodiments, the electronic device 300 may include a front surface 300*a* (e.g., first surface), a rear surface 300*b* (e.g., second surface) facing in a direction opposite to the front surface 300*a*, and a side surface (not shown) surrounding the space between the front surface 300*a* and the rear surface 300*b*. For example, in the electronic device 300, the first housing 310 may include a first lateral member 311 and the second housing 320 may include a second lateral member 321.

According to an embodiment, the first lateral member 311 may include a first side surface 2111 having a first length along a first direction (e.g., x-axis direction), a second side surface 2112 extended from the first side surface 2111 along a substantially perpendicular direction (e.g., y-axis direction) to have a second length longer than the first length, and a third side surface 2113 extended from the second side surface 2112 substantially parallel to the first side surface 2111 to have the first length. The first lateral member 311 may be at least partially made of a conductive material (e.g., metal). At least a portion of the first lateral member 311 may include a first support member 312 extended up to at least a portion of the first space 2101 of the first housing 310.

According to an embodiment, the second lateral member 321 may include a fourth side surface 2211 at least partially corresponding to the first side surface 2111 and having a third length, a fifth side surface 2212 extended from the fourth side surface 2211 in a direction substantially parallel to the second side surface 2112 and having a fourth length longer than the third length, and a sixth side surface 2213 extended from the fifth side surface 2212 in correspondence to the third side surface 2113 and having the third length. The second lateral member 321 may be at least partially made of a conductive material (e.g., metal). At least a portion of the second lateral member 321 may include a second support member 322 extended up to at least a portion of the second space 2201 of the second housing 320.

According to an embodiment, the first side surface 2111 and the fourth side surface 2211, and the third side surface 2113 and the sixth side surface 2213 may be slidably coupled to each other. In the slide-in state of the electronic device 300, the fourth side surface 2211 may be arranged to overlap the first side surface 2111 to be substantially invisible from the outside. In the slide-in state of the electronic device 300, the sixth side surface 2213 may be arranged to overlap the third side surface 2113 to be substantially invisible from the outside. In a certain embodiment, the electronic device 300 may be arranged in the slide-in state so that at least a portion of the fourth side surface 2211 and the sixth side surface 2213 are at least partially visible from the outside.

According to an embodiment, in the slide-in state of the electronic device 300, the second support member 322 may be arranged to overlap the first support member 312 to be substantially invisible from the outside. In a certain embodiment, in the slide-in state, a portion of the second support member 322 may be arranged to overlap the first support member 312 to be invisible from the outside, and the remaining portion of the second support member 322 may be arranged to be visible from the outside.

According to an embodiment, the electronic device 300 may include a rear cover 313 disposed on at least a portion of the first housing 310. The rear cover 313 may be disposed on the rear surface 300*b* of the electronic device 300 through at least a portion of the first support member 312. In a certain embodiment, the rear cover 313 may be formed integrally with the first lateral member 311. The rear cover 313 may be made of polymer, coated or colored glass, ceramic, metal (e.g., aluminum, stainless steel (STS), or magnesium), or a combination of at least two thereof. In a certain embodiment, the rear cover 313 may be extended to at least a portion of the first lateral member 311. At least a portion of the first support member 312 may be replaced with the rear cover 313. The electronic device 300 may also include another rear cover (e.g., second rear cover) that is disposed on at least a portion of the second support member 322 in the second housing 320 or is replaced with at least a portion of the second support member 322.

According to an embodiment, the electronic device 300 may include a flexible display 330 (e.g., expandable display) arranged to be supported by at least a portion of the first housing 310 and the second housing 320. The flexible display 330 may include a first part 330*a* (e.g., first display area) that is always visible from the outside in the slide-in or slide-out state, and a second part 330*b* (e.g., second display area) extended from the first part 330*a* and expanding in a specified direction (e.g., x-axis direction) together with the second housing 320 in the slide-out state. The first part 330*a* of the flexible display 330 may include a first display area, and the second part 330*b* may include a second display area. The first part 330*a* of the flexible display 330 may include a flat surface, and the second part 330*b* may include a bendable part that is at least partially accommodated in the second space 2201 of the second housing 320 in the slide-in state so that at least a portion thereof is not visible from the outside. The first part 330*a* may be disposed to be supported by the first housing 310, and the second part 330*b* may be disposed to be at least partially supported by the bendable member (e.g., bendable member 340 in FIG. 5). As the second housing 320 slides out along a specified direction (e.g., x-axis direction), the second part 330*b* of the flexible display 330 may be extended from the first part 330*a* while being supported by the bendable member (e.g., bendable member 340 in FIG. 5) and be disposed to be visible from the outside while forming substantially the same plane as the first part 330*a*. As the second housing 320 slides into the first housing 310 along a specified direction (e.g. negative x-axis direction), the second part 330*b* of the flexible display 330 may be accommodated in the second space 3201 of the second housing 320 and be disposed so as not to be visible from the outside. In the electronic device 300, as the second housing 320 is moved in a sliding manner (e.g., sliding out) along a specified direction (e.g., x-axis direction) from the first housing 310, the display area of the flexible display 330 may be expanded. In an embodiment, the electronic device 300 may display at least one application in the slide-in state using the first part 330*a* (e.g., first display area) of the flexible display 330. In an embodiment, in a state where the second housing 320 is slid out from the first housing 310, the electronic device 300 may display at least one application using the first part 330*a* (e.g., first display area) and the second part 330*b* (e.g., second display area). In various embodiments, in the slide-out state, the flexible display 330 may display a first application (A) using the first part 330*a* and display a second application (B) using the second part 330*b*.

In an embodiment, although the size of the first part 330*a* (e.g., first display area) of the flexible display 330 is shown to be larger than the size of the second part 330*b* (e.g., second display area) in FIG. 4A, the sizes of the first part 330*a* and the second part 330*b* may be formed to be substantially the same, or the size of the second part 330*b* may be formed to be larger than that of the first part 330*a*. The first part 330*a* and the second part 330*b* of the flexible display 330 may be formed to have the same sizes or various different sizes.

According to an embodiment, the first housing 310 and the second housing 320 may be operated in a sliding manner so that their overall width is variable relative to each other. With reference to FIG. 4A, the electronic device 300 may be configured to have a first width W1 ranging from the second side surface 2112 to the fifth side surface 2212 in the slide-in state. The electronic device 300 may be configured to have a third width W3 larger than the first width W1 in the slide-out state as at least a portion of the bendable member (e.g., bendable member 340 in FIG. 5) accommodated in the second space 2201 of the second housing 310 is moved to have an additional second width W2. For example, the flexible display 330 may have a display area substantially corresponding to the first width W1 in the slide-in state, and may have an expanded display area substantially corresponding to the third width W3 in the slide-out state. In an embodiment, although the second width W2 is shown as being smaller than the first width W1 in FIG. 4A, the first width W1 and the second width W2 may be formed to have substantially the same width. In an embodiment, the first part 330*a* and the second part 330*b* of the flexible display 330 may be configured to have substantially the same display screen.

According to an embodiment, the electronic device 300 may include at least one of input module (e.g., microphone 303), sound output module (e.g. call receiver 306 or speaker 307), sensor module (304, 317), camera module (e.g., first camera module 305 or second camera module 316), connector port 308, key input device (not shown), or indicator (not shown), which is disposed in the first space 2101 of the first housing 310. The electronic device 300 may be configured so that at least one of the above-described components is omitted or other components are additionally included. In an embodiment, at least one of the above-described components may be disposed in the second space 2201 of the second housing 320.

According to various embodiments, the input module may include an embodiment related to the input module 150 in FIG. 1. The sound output module may include an embodiment related to the sound output module 155 in FIG. 1. The sensor module (304, 317) may include an embodiment related to the sensor module 176 in FIG. 1. The camera module may include an embodiment related to the camera module 180 in FIG. 1.

According to an embodiment, the input module (e.g., input module 150 in FIG. 1) may include a microphone 303. In a certain embodiment, the input module (e.g., microphone 303) may include a plurality of microphones arranged to detect the direction of a sound. The sound output module may include, for example, a call receiver 306 and a speaker 307. The speaker 307 may face the outside through at least one speaker hole formed in the first housing 310 in the slide-out state. The connector port 308 may face the outside through a connector port hole formed in the first housing 310 in the slide-out state. The call receiver 306 may include a speaker (e.g., piezo speaker) that operates without a separate speaker hole.

According to various embodiments, the sensor modules (304, 317) (e.g., sensor module 176 in FIG. 1) may generate an electrical signal or data value corresponding to an internal operating state of the electronic device 300 or an external environmental state. The sensor module (304, 317) may include, for example, a first sensor module 304 (e.g., proximity sensor or illuminance sensor) disposed on the front surface 300*a* of the electronic device 300, and/or a second sensor module 317 (e.g., heart rate monitoring (HRM) sensor) disposed on the rear surface 300*b*. The first sensor module 304 may be disposed on the rear surface (e.g., negative z-axis direction) of the flexible display 330 in the front surface 300*a* of the electronic device 300. The first sensor module 304 and/or the second sensor module 317 may include at least one of proximity sensor, illuminance sensor, time-of-flight (TOF) sensor, ultrasonic sensor, fingerprint recognition sensor, gesture sensor, gyro sensor, barometric pressure sensor, magnetic sensor, acceleration sensor, grip sensor, color sensor, infrared (IR) sensor, biometric sensor, temperature sensor, or humidity sensor.

According to an embodiment, the camera module (e.g., camera module 180 in FIG. 1) may include a first camera module 305 disposed on the front surface 300*a* of the electronic device 300, and a second camera module 316 disposed on the rear surface 300*b*. The electronic device 300 may include a flash 318 positioned near the second camera module 316. The camera modules 305 and 316 may include one or more lenses, an image sensor, and/or an image signal processor. The first camera module 305 may be disposed on the rear surface (e.g., negative z-axis direction) of the flexible display 330 and be configured to photograph a subject through a portion of the active area of the flexible display 330. The flash 318 may include, for example, a light-emitting diode or a xenon lamp.

According to an embodiment, the first camera module 305 among the camera modules and the sensor module 304 among the sensor modules 304 and 317 may be arranged to sense the external environment through the flexible display 330. For example, the first camera module 305 or the sensor module 304 may be disposed in the first space 2201 of the first housing 310 to come into contact with the external environment through a transmissive region or perforated opening formed in the flexible display 330. The area facing the first camera module 305 of the flexible display 330 may be formed as a transmissive region with a specified transmittance as part of the content display. According to an embodiment, the transmissive region may be formed to have a transmittance ranging from about 5% to about 20%. The transmissive region may include a region overlapping with an effective region (e.g., angle-of-view region) of the first camera module 305 through which light for generating an image is formed by the image sensor. For example, the transmissive region of the flexible display 330 may include a region with a lower pixel density and/or wiring density than the surrounding regions. For example, the camera module 305 may include an under display camera (UDC). In a certain embodiment, the sensor module 304 may be arranged in the internal space of the electronic device 300 so as to perform their functions without being visible through the flexible display 330.

According to an embodiment, the electronic device 300 may include one or more antennas A1 and A2 electrically connected to a wireless communication circuit (e.g., wireless communication module 192 in FIG. 1) disposed in the first space 2101 of the first housing 310. The at least one antenna A1 and A2 may include a first antenna A1 disposed in an upper part of the electronic device 300 and a second antenna A2 disposed in a lower part thereof. In a certain embodiment, the electronic device 300 may further include at least one antenna disposed on the second side surface 2112 of the first housing 310 and/or the fifth side surface 2212 of the second housing 320. The first antenna A1 may include a first conductive part 3110 segmented through at least one non-conductive portion 3111 and 3112 on the third side surface 2113 of the first lateral member 311. The first conductive part 3110 may be arranged to be segmented through the first non-conductive portion 3111 and the second non-conductive portion 3112 spaced apart at a specified interval, and may be electrically connected to the wireless communication circuit (e.g., wireless communication module 192 in FIG. 1). The second antenna A2 may include a second conductive part 3210 segmented through at least one non-conductive portion 3211 and 3212 on the first side surface 2111 of the first lateral member 311. The second conductive part 3210 may be arranged to be segmented through the third non-conductive portion 3211 and the fourth non-conductive portion 3212 spaced apart at a specified interval, and may be electrically connected to the wireless communication circuit (e.g., wireless communication module 192 in FIG. 1).

According to an embodiment, the wireless communication circuit (e.g., wireless communication module 192 in FIG. 1) may be configured to transmit and/or receive radio signals in a specified frequency band (e.g., approximately 800 MHz to 6000 MHz) (e.g., legacy band) through the first conductive part 3110 and/or the second conductive part 3120. In a certain embodiment, the electronic device 300 may further include at least one antenna module (e.g., 5G antenna module or antenna structure) disposed in the internal space (e.g., first space 2101 or second space 2201) and configured to transmit and receive radio signals in a frequency band ranging from about 3 GHz to 100 GHz through another wireless communication circuit (e.g., wireless communication module 192 in FIG. 1).

FIG. 5 is an exploded perspective view of an electronic device according to various embodiments.

With reference to FIG. 5, the electronic device 300 may include a first housing 310, a second housing 320 slidably coupled to the first housing 310, a bendable member 340 (e.g., multi-bar assembly) disposed at least partially rotatably in the second housing 320, and a flexible display 330 disposed to be supported by at least a portion of the bendable member 340 and the first housing 310. According to an embodiment, the first housing 310 may be provided through a combination of a cover housing 314 and a bracket housing 315 (e.g., front housing). In a certain embodiment, at least a portion of the cover housing 314 may include a first support member (e.g., first support member 312 in FIG. 4B) or may be replaced with the first support member 312.

According to an embodiment, the electronic device 300 may include a printed circuit board 350 disposed in a space (e.g., first space 2101 in FIG. 4A) between the cover housing 314 and the bracket housing 315, and at least one battery 2511 disposed adjacent to the printed circuit board 350. The electronic device 300 may further include an additional bracket 315*a* that is disposed in the space (e.g., first space 2101 in FIG. 4A) between the cover housing 314 and the bracket housing 315 to support the printed circuit board 350 or the at least one battery 2511.

According to an embodiment, one end (e.g., first end) of the bendable member 340 may be fixed to the first housing 310, and the other end (e.g., second end) may be disposed to be at least partially movably received in the internal space (e.g., second space 2201 in FIG. 4A) of the second housing 320. For example, the bendable member 340 may be at least partially accommodated in the internal space of the second housing 320 in the slide-in state. In the slide-out state, the bendable member 340 may be slid at least partially out from the inner space of the second housing 320 so as to form substantially the same plane as the first housing 310 (e.g., bracket housing 315). In an embodiment, the flexible display 330 supported by at least a portion of the first housing 310 and the bendable member 340, may vary in the display area visible from the outside according to the sliding operation.

According to an embodiment, the electronic device 300 may include a sliding frame 360 coupled to the second housing 320. The sliding frame 360 may be slidably coupled to the first housing 310 (e.g., bracket housing 315). The sliding frame 360 may include a plate part 361 slidably coupled to the first housing 310 (e.g., bracket housing 315), and a sliding bar 362 extended from the plate part 361 and pressing the rear surface of the bendable member 340. In a certain embodiment, the plate part 361 and the sliding bar 362 may be prepared separately and may be structurally combined. The sliding frame 360 may be included in the second housing 320. For example, the sliding frame 360 may be formed integrally with the second housing 320. In an embodiment, if the sliding frame 360 is formed as part of the second housing 320, the sliding frame 360 may be omitted.

Figure 6:
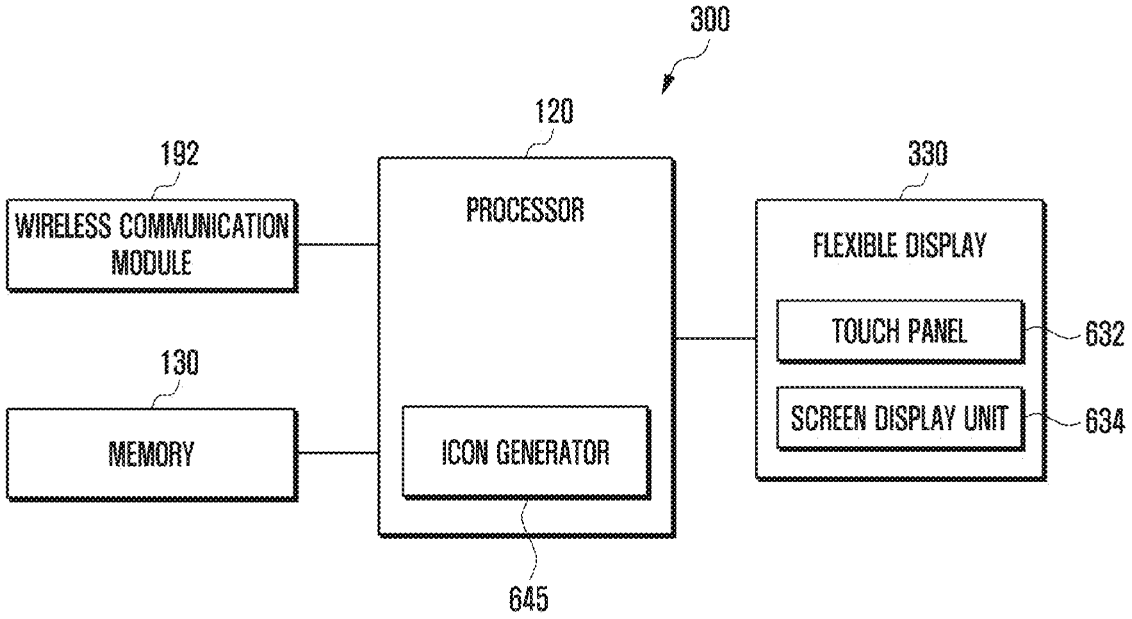
FIG. 6 is a block diagram illustrating an example configuration of an electronic device according to various embodiments.

FIG. 6 is a block diagram illustrating an example configuration of an electronic device according to various embodiments.

According to various embodiments, the electronic device 300 disclosed below may include the electronic device 101 of FIG. 1 and/or the electronic device 300 of FIGS. 2A to 5. In the following description, components that are substantially the same as those in the embodiments disclosed in FIGS. 1 to 5 are assigned the same reference symbols, and repeated descriptions may not be repeated. The configuration of the electronic device 300 disclosed in FIG. 6 may be applied substantially identically to the electronic device to be described in greater detail below.

According to various embodiments, although embodiments related to the electronic device 300 disclosed below describe a rollable type or sliding type electronic device as an example, without being limited thereto, they may be substantially equally applied to a foldable type or wearable type electronic device or tablet PC including the flexible display 330.

In an embodiment, although the electronic device 300 describes an example in which the first housing 310 is slid in the horizontal direction (e.g., x-axis direction) with respect to the second housing 320, without being limited thereto, it may be substantially equally applied to embodiments in which the first housing 310 and the second housing 320 are slid in the vertical direction (e.g., y-axis direction and/or negative y-axis direction).

With reference to FIG. 6, the electronic device 300 according to various embodiments of the disclosure may include a wireless communication module (e.g., including wireless communication circuitry) 192, a flexible display 330, a memory 130, and a processor (e.g., including processing circuitry) 120. The wireless communication module 192, the memory 130, and the processor 120 may be arranged on the printed circuit board 350 disclosed in FIG. 5.

According to an embodiment, the wireless communication module 192 may include various wireless communication circuitry and enable the electronic device 300 to transmit and/or receive various information to and from an external electronic device (e.g., external electronic device 102 or 104 or server 108 in FIG. 1). For example, the wireless communication module 192 may use the first network 198 or second network 199 shown in FIG. 1 to transmit or receive various data and/or content to or from the external electronic device 102, 104 or 108. In an embodiment, the wireless communication module 192 may exchange data related to notifications or shared information between the electronic device 300 and the external electronic device 102, 104 or 108. A notification (e.g., push notification) may include an event notifying the reception of, for example, a video call, a message, or an application such as a hyperlink.

According to various embodiments, the wireless communication module 192 may establish a communication channel with the external electronic device 102, 104 or 108 to support at least one of a voice call, a video call, or a data communication function of the electronic device 300. The wireless communication module 192 may include at least one of a mobile communication module (at least one module capable of supporting various communication schemes such as 2G, 3G, 4G, and 5G), a Wi-Fi (wireless fidelity) module, a short-range communication module, or a UWB (ultra wide band) communication module. The wireless communication module 192 may include an RF transmitter that up-converts and amplifies the frequency of a signal to be transmitted from the electronic device 300, and an RF receiver that low-noise amplifies a signal received from the external electronic device 102, 104 or 108 and down-converts the frequency of the amplified signal. The wireless communication module 192 may receive data from the external electronic device 102, 104 or 108 over a radio channel and transfer the received data to the processor 120.

According to an embodiment, the flexible display 330 may detect at least one of a touch signal, a long press signal, or a drag and drop signal input by the user of the electronic device 300. In an embodiment, the touch signal, long press signal, or drag and drop signal may be input through a finger or stylus pen of the user of the electronic device 300. Signals input and detected through the flexible display 330 may be transferred to the processor 120. When the user of the electronic device 300 touches an icon generated according to a specific event (e.g., state change icon 725 in FIG. 7) through the flexible display 330, the processor 120 may be configured to transition the electronic device 300 from a slide-in state (e.g., first state) to a slide-out state (e.g., second state). In an embodiment, the specific event may include a case where the electronic device 300 receives a notification (e.g., push notification) from an external electronic device 102, 104 or 108, a case where a specific shareable image is selected by the user in the electronic device 300, or a case where an input signal such as a long press is generated on the flexible display 330. In various embodiments, the state change icon 725 (refer to FIGS. 7A, 7B and 7C) generated according to a specific event may be an icon that can transition the electronic device 300 from the slide-in state (e.g., first state) to the slide-out state (e.g., second state) and can input a signal for expanding the flexible display 330. When the flexible display 330 is expanded, the first display area 330*a* (e.g., first part) and the second display area 330*b* (e.g., second part) may be exposed to the user of the electronic device 300. In an embodiment, the first display area 330*a* of the flexible display 330 may be exposed to the outside when the electronic device 300 is in the slide-in state (e.g., first state), and the second display area 330*b* may be exposed to the outside when the electronic device 300 is in the slide-out state (e.g., second state).

According to various embodiments, the flexible display 330 may perform an input function and a display function. The flexible display 330 may include a touch panel 632 and a screen display unit (e.g., including various circuitry) 634 to perform input and display functions. The touch panel 632 may include a touch sensor utilizing a capacitive overlay, resistive overlay, or infrared beam, or a pressure sensor. In addition to the above sensors, the touch panel 632 may be configured with various types of sensing means (e.g., sensing circuitry) capable of detecting the contact or pressure of an object (finger or stylus pen). The touch panel 632 may detect a touch (e.g., finger or stylus pen) of the user of the electronic device 300 and forward the detected signal to the processor 120. The detection signal may include at least one of coordinate information, direction information, or touch angle information about a touch input by the user of the electronic device 300. The screen display unit 634 may visually provide the user with menus, input data, function configuration information, and various information (e.g., user interface, icon, and/or application) of the electronic device 300. The screen display unit 634 may include at least one of a liquid crystal display (LCD), an organic light-emitting diode (OLED), or an active matrix organic light-emitting diode (AMOLED).

According to an embodiment, the memory 130 may store icons, applications (e.g., applications 146 in FIG. 2), and/or various types of content (text, image, video, and/or file) used in the electronic device 300. The memory 130 may store one or more instructions related to the slide-in state and slide-out state of the electronic device 300.

According to various embodiments, the memory 130 may store programs for processing and controlling the processor 120 of the electronic device 300 (e.g., programs 140 in FIGS. 1 and 2), an operating system (OS) (e.g., operating system 142 in FIGS. 1 and 2), and various input/output data. The memory 130 may store a program that controls the overall operation of the electronic device 300. The memory 130 may store a user interface (UI) provided by the electronic device 300 and various configuration information required for processing functions in the electronic device 300.

According to an embodiment, the processor 120 may be operably connected to the wireless communication module 192, the flexible display 330, and the memory 130. The processor 120 may include various processing circuitry and control the functions and operations of the wireless communication module 192, the flexible display 330, and the memory 130. The processor 120 may include at least one processor. In an embodiment, the processor 120 may include an icon generator 645. In response to occurrence of a specific event such as a case where the electronic device 300 receives a notification (e.g., push notification related to receiving a video call or message) from an external electronic device 102, 104 or 108, a specific shareable image is selected by the user in the electronic device 300, or an input signal such as a long press is generated on the flexible display 120, the icon generator 645 may generate an icon that enables selection of the expansion of the flexible display 330 (e.g., state change icon 725 in FIG. 7). The processor 120 may generate a state change icon (e.g., state change icon 725 in FIG. 7) corresponding to the type of notification (e.g., push notification, sharing notification, and/or hyperlink notification). The processor 120 may generate different state change icons depending on the type of notification. In various embodiments, the icon generator 645 may be omitted as long as the processor 120 can generate a state change icon 725 in response to occurrence of a specific event. The icon generator 645 may be integrated in circuit into the processor 120.

According to various embodiments, the processor 120 may control the overall operation of the electronic device 300 and signal flows between internal components, and perform data processing. The processor 120 may include, for example, a central processing unit (CPU), an application processor, and/or a communication processor. The processor 120 may be include a single core processor or a multi-core processor. The processor 120 may include at least one processor. The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Figure 7A:
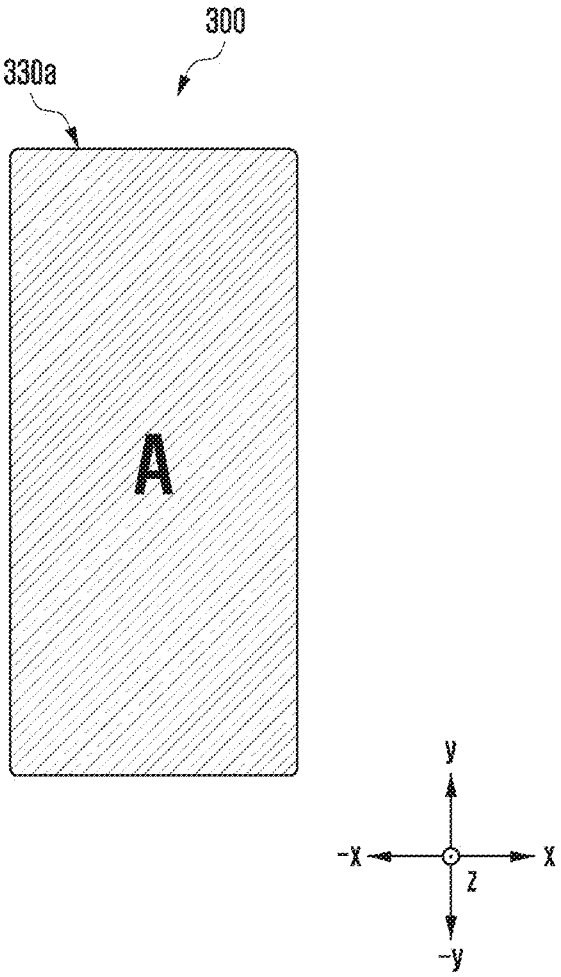
FIGS. 7A, 7B and 7C are diagrams illustrating a configuration in which the electronic device displays applications using a flexible display in response to receiving a notification according to various embodiments.
Figure 7B:
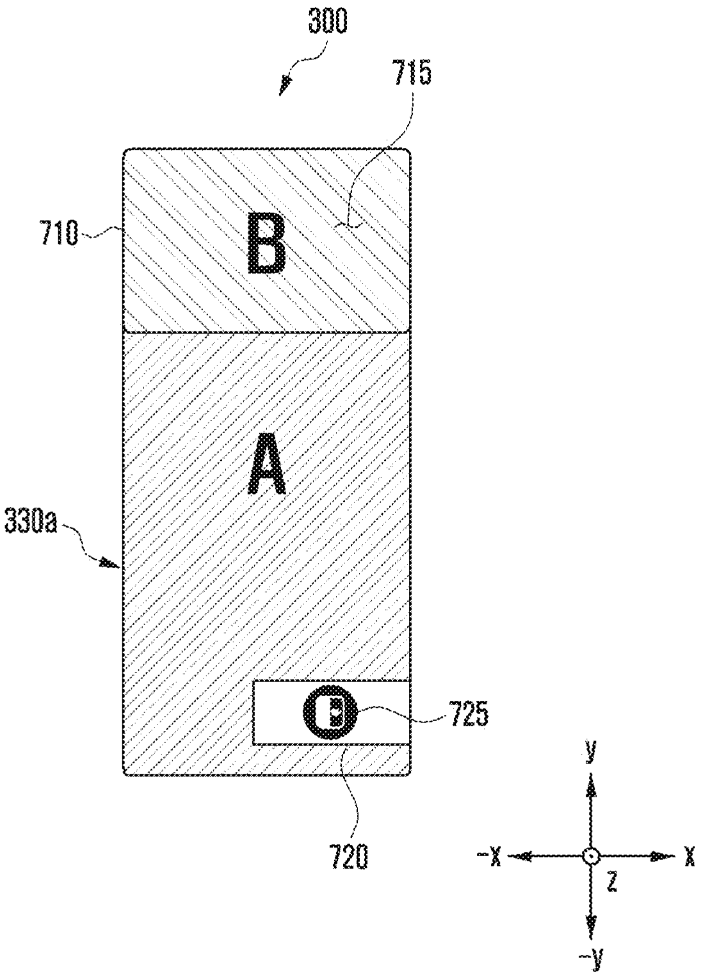
Figure 7C:
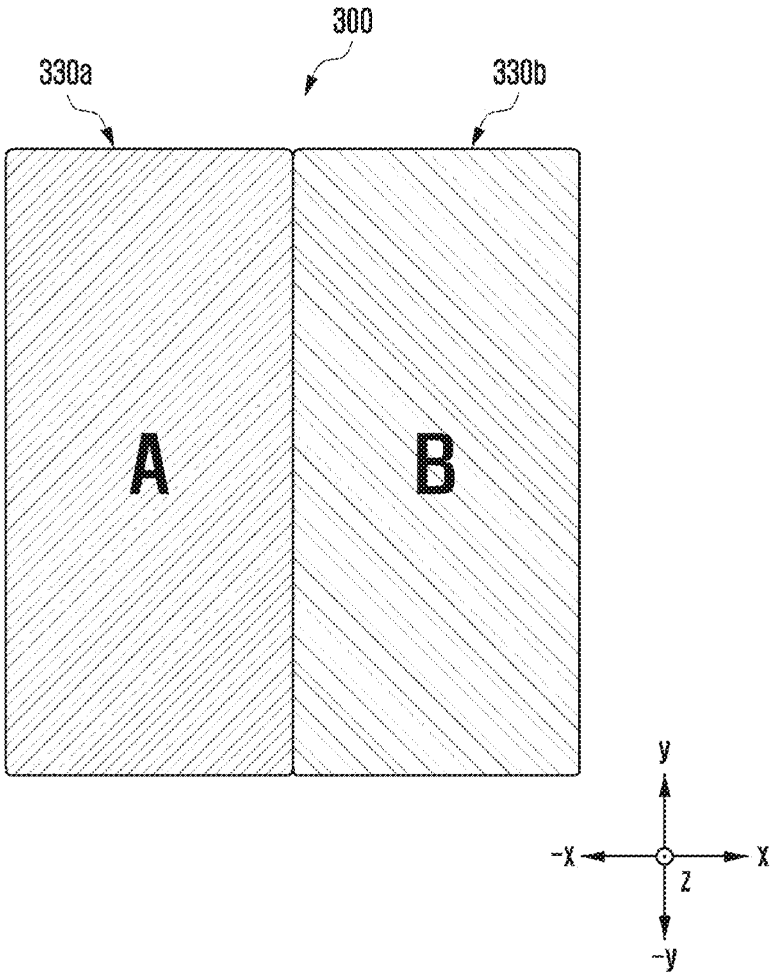

FIGS. 7A, 7B and 7C are diagrams illustrating a configuration in which the electronic device displays applications using a flexible display in response to receiving a notification according to various embodiments.

According to an embodiment, FIG. 7A may be a diagram illustrating a state where the electronic device 300 in the slide-in state is executing (e.g., displaying) a first application A on the first display area 330*a* (e.g., first part 330*a* in FIG. 4A) of the flexible display 330.

With reference to FIG. 7A, while the electronic device 300 is in the slide-in state (e.g., slide-in state in FIG. 3A), the first application A currently in execution (e.g., foreground application) may be displayed on the first display area 330*a* of the flexible display 330.

According to an embodiment, FIG. 7B may be a diagram illustrating a state where when the electronic device 300 in the slide-in state receives a notification 715 (e.g., push notification related to a video call or message) from an external electronic device 102, 104 or 108, while the first application A is being displayed on the first display area 330*a* of the flexible display 330, the notification 715 related to a second application B is displayed at a first position 710 (e.g., first region) of the first display area 330*a*, and a state change icon 725 is displayed at a second position 720 (e.g., second region) of the first display area 330*a*.

According to an embodiment, the notification 715 may include at least one of a push notification, a sharing notification, or a hyperlink notification. For example, the push notification may include receiving a video call from an external electronic device 102, 104 or 108, receiving a multi-media type message, or one of a plurality of text messages received within a specified time. For example, the sharing notification may include photo sharing or music sharing. For example, the hyperlink notification may include at least one hyperlink included in the application.

With reference to FIG. 7B, the electronic device 300 may receive an event related to the notification 715 (e.g., second application B) from the external electronic device 102, 104 or 108 using the wireless communication module 192 while the second housing 320 is slid in the first housing 310. Upon receiving an event related to the notification 715 from the external electronic device 102, 104 or 108, while the first application A is displayed on the first display area 330*a* of the flexible display 330, the processor 120 may display reception of the notification 715 (e.g., second application B) at a first position 710 (e.g., upper portion (y-axis direction)) of the first display area 330*a*. Based on receiving an event related to the notification 715 (e.g., second application B) from the external electronic device 102, 104 or 108, the processor 120 may generate a state change icon 725 at a second position 720 (e.g., lower portion (negative y-axis direction)) of the first display area 330*a*. According to various embodiments, when the electronic device 300 is in the slide-in state and a long press signal is input on the first display area 330*a* of the flexible display 330 for a specific period of time (e.g., about 1 to 3 seconds), the processor 120 may generate a state change icon 725 at a specific position on the first display area 330*a*.

According to an embodiment, FIG. 7C may be a diagram illustrating a state where when the user touches the state change icon 725 created based on reception of the notification 715 (e.g., second application B) by the electronic device 300 from the external electronic device 102, 104 or 108, the second application B is displayed on the second display area 330*b* of the flexible display 330. In an embodiment, when the state change icon 725 is touched, it may cause a transition or change to the state where the second housing 320 is slid out of the first housing 310, and the second display area 330*b* may be expanded in one direction (e.g., x-axis direction).

With reference to FIGS. 7B and 7C, when the user touches the state change icon 725 in a state where the second housing 320 is slid in the first housing 310, the electronic device 300 may make a transition or change to a state where the second housing 320 is slid out of the first housing 310. When transitioning to the slide-out state, the electronic device 300 may display the first application A on the first display area 330*a* (e.g., first display) of the flexible display 330, and may display the second application B on the second display area 330*b* (e.g., second display). In an embodiment, when the electronic device 300 transitions to the slide-out state, the processor 120 may control the first application A to run in the foreground state on the first display area 330*a* of the flexible display 330, and control the second application B to run in the foreground state on the second display area 330*b*. In various embodiments, the first application A and/or the second application B may include the applications 146 disclosed in FIG. 2.

According to an embodiment, when the second application B related to the notification is displayed on the second display area 330*b* of the flexible display 330, the processor 120 may control the notification 715 of the second application B displayed at the first position 710 of the first display area 330*a* and the state change icon 725 displayed at the second position 720 of the first display area 330*a* to disappear.

FIGS. 8A, 8B, 8C and 8D are diagrams illustrating a configuration in which the electronic device displays applications using a flexible display in response to receiving a video call according to various embodiments.

Figure 8A:
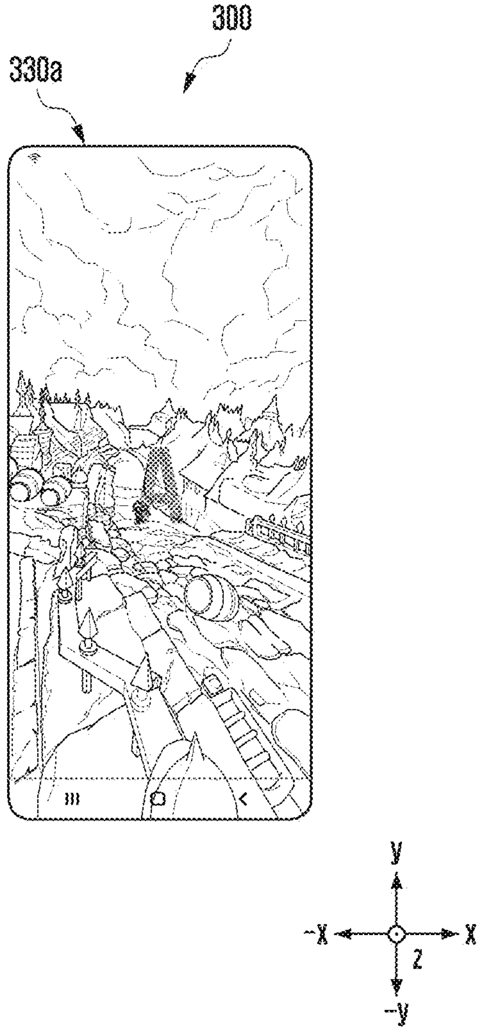
FIGS. 8A, 8B, 8C and 8D are diagrams illustrating a configuration in which the electronic device displays applications using a flexible display in response to receiving a video call according to various embodiments.

With reference to FIG. 8A, when the electronic device 300 is in the slide-in state, the processor 120 may display the first application A currently in execution on the first display area 330*a* (e.g., first display) of the flexible display 330. For example, the first application A may be displayed on the first display area 330*a* as a foreground application.

Figure 8B:
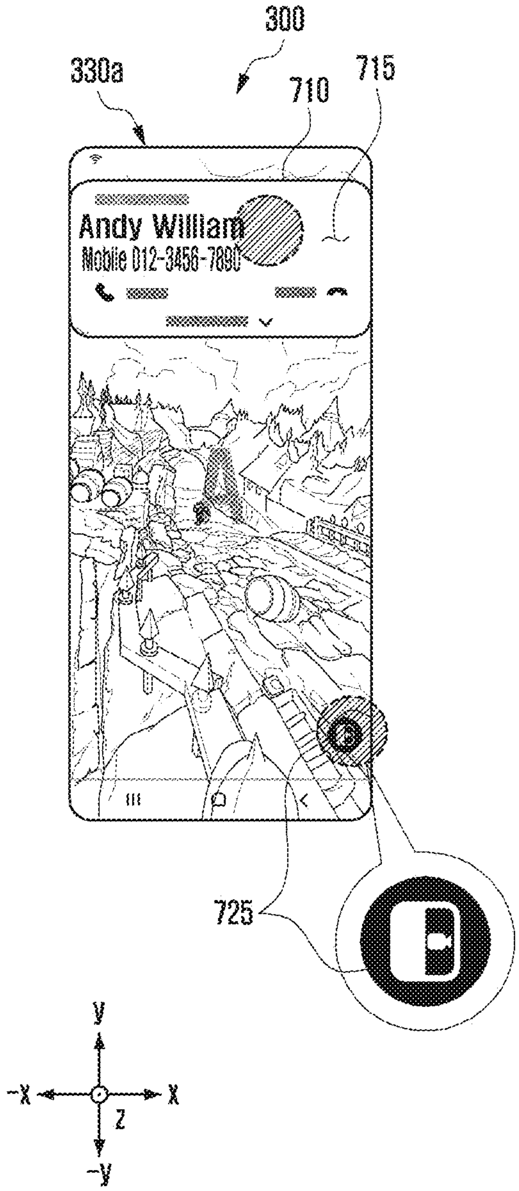

With reference to FIG. 8B, the electronic device 300 in the slide-in state may receive a notification 715 related to a video call (e.g., push notification indicating reception of second application B) from an external electronic device 102, 104 or 108 using the wireless communication module 192. When an event of the notification 715 related to a video call is received from the external electronic device 102, 104 or 108, while the first application A is being displayed on the first display area 330*a* (e.g., first display) of the flexible display 330, the processor 120 may display the notification 715 of the second application B related to a video call request at a first position 710 of the first display area 330*a*. In response to occurrence of an event of the notification 715 related to a video call from the external electronic device 102, 104 or 108, the processor 120 may generate a state change icon 725 (e.g., display expansion selection icon) at a second position (e.g., second position 720 in FIG. 7) of the first display area 330*a*.

Figure 8C:
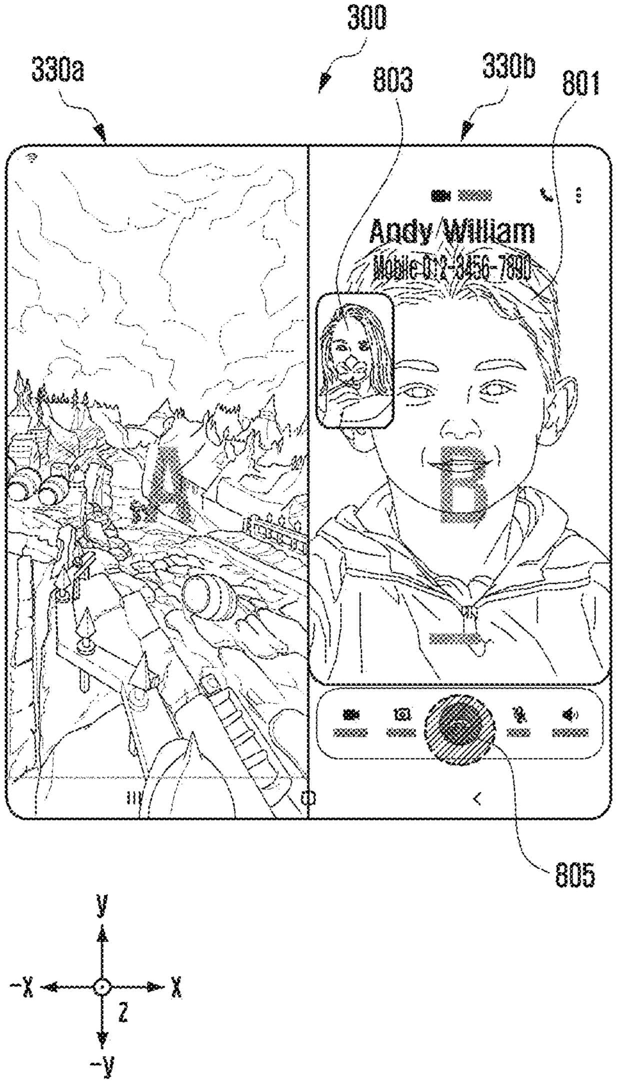

With reference to FIGS. 8B and 8C, when the user touches the state change icon 725 in a state where the second housing 320 is slid in the first housing 310, the electronic device 300 may make a transition or change to a state where the second housing 320 is slid out of the first housing 310. When the electronic device 300 transitions to the slide-out state, the processor 120 may display the first application A in the foreground state on the first display area 330*a* (e.g., first display) of the flexible display 330, and display the second application B in the foreground state on the second display area 330*b* (e.g., second display).

According to an embodiment, the second application B displayed on the second display area 330*b* of the flexible display 330 may display the screen of the video call requester 801 and the screen of the video call recipient 803. In an embodiment, the second application B displayed on the second display area 330*b* may display the screen of the video call requester 801 larger than the screen of the video call recipient 803. In various embodiments, the second application B displayed on the second display area 330*b* may display the screen of the video call requester 801 smaller than the screen of the video call recipient 803.

According to an embodiment, when the second application B related to a video call is displayed on the second display area 330*b* of the flexible display 330, the processor 120 may control the notification 715 related to the second application B displayed at the first position 710 of the first display area 330*a* and the state change icon 725 displayed at the second position 720 of first display area 330*a* to disappear.

According to an embodiment, when the video call between the electronic device 300 and the external electronic device 102, 104 or 108 is ended, or when the user touches the end icon 805 of the second application B displayed on the second display area 330*b*, the processor 120 may control the electronic device 300 to make a transition or change to the slide-in state (e.g., first state) as shown in FIGS. 3A and 3B.

Figure 8D:
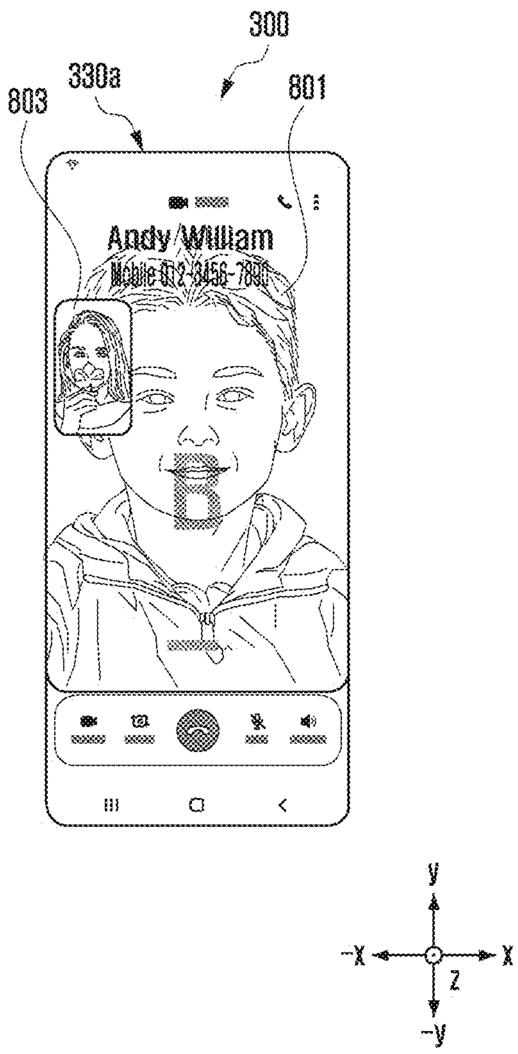

According to an embodiment, FIG. 8D may be a diagram showing a state where after a notification 715 of the second application B related to a video call request is displayed at the first position 710 of the first display area 330*a* in response to occurrence of an event of the notification 715 related to a video call in part (b) of FIG. 8, when the user touches the notification 715, the second application B is displayed on the first display area 330*a* of the flexible display 330.

With reference to FIG. 8D, in response to occurrence of an event of the notification 715 related to a video call in FIG. 8B, the user of the electronic device 300 may touch the notification 715 related to a second application B displayed at the first position 710 of the first display area 330*a*. When the notification 715 related to the second application B is touched, the processor 120 may display the second application B in the foreground state on the first display area 330*a* of the flexible display 330 while the electronic device 300 is in the slide-in state. When the second application B is displayed on the first display area 330*a*, the processor 120 may place the first application A previously in execution on the first display area 330*a* in the background state. For example, when the second application B is executed on the first display area 330*a*, the first application A previously in execution on the first display area 330*a* may be not displayed on the first display area 330*a*.

FIGS. 9A, 9B, 9C and 9D are diagrams illustrating a configuration in which the electronic device transitions from a slide-in state (e.g., first state) to a slide-out state (e.g., second state) according to various embodiments.

Figure 9A:
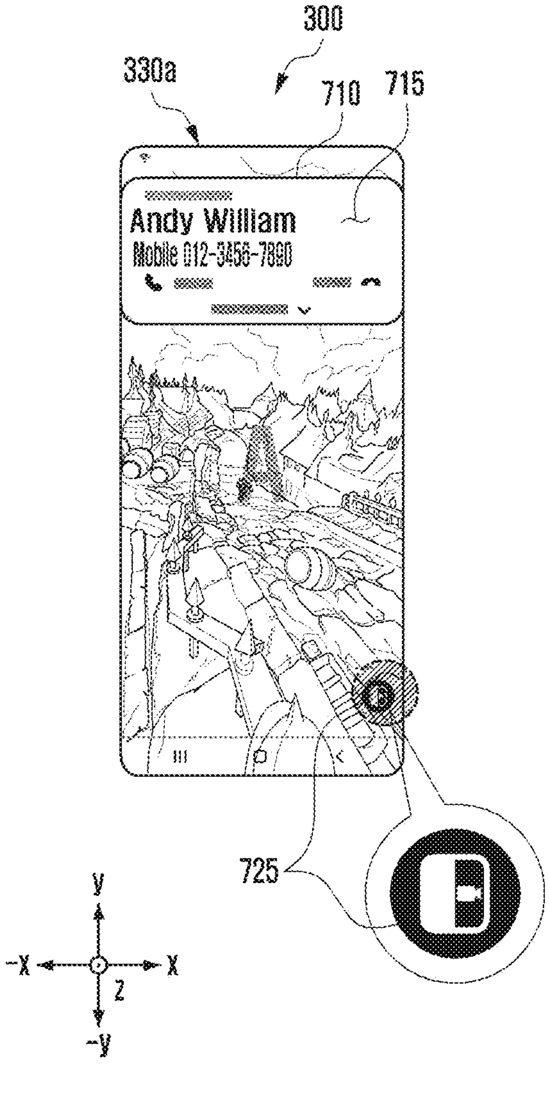
FIGS. 9A, 9B, 9C and 9D are diagrams illustrating a configuration in which the electronic device transitions from a slide-in state to a slide-out state according to various embodiments.

With reference to FIG. 9A, the electronic device 300 in the slide-in state may receive a notification 715 (e.g., push notification) related to a video call (e.g., second application B) from an external electronic device 102, 104 or 108 using the wireless communication module 192. In response to occurrence of an event of the notification 715 related to a video call from the external electronic device 102, 104 or 108, while the first application A is being displayed on the first display area 330*a* (e.g., first display) of the flexible display 330, the processor 120 may display a notification 715 of the second application B related to the video call request at a first position 710 of the first display area 330*a*. In response to occurrence of the notification 715 related to a video call from the external electronic device 102, 104 or 108, the processor 120 may generate a state change icon 725 at a second position (e.g., second position 720 in FIG. 7) of the first display area 330*a*.

Figure 9B:
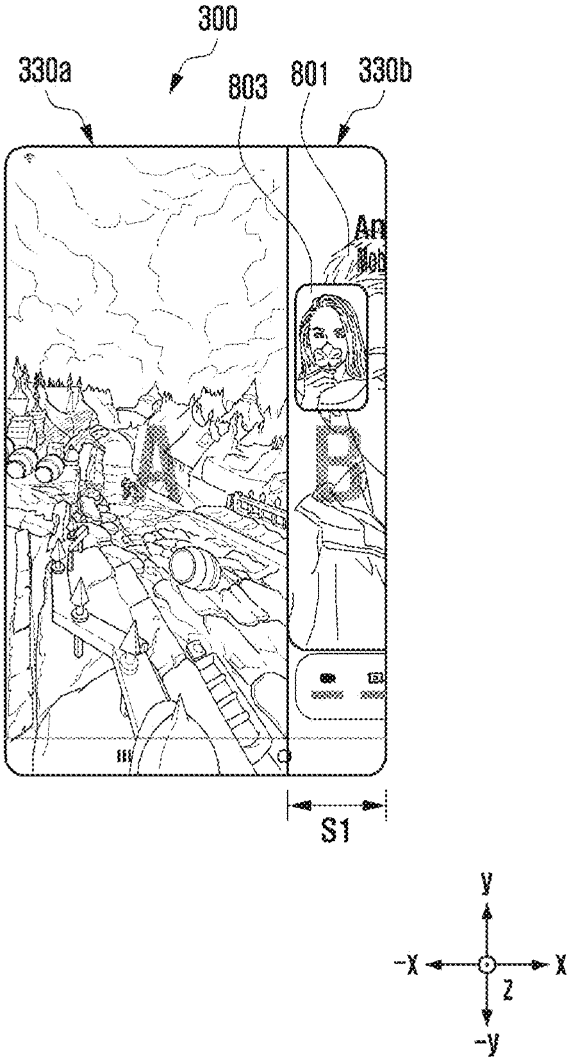
Figure 9C:
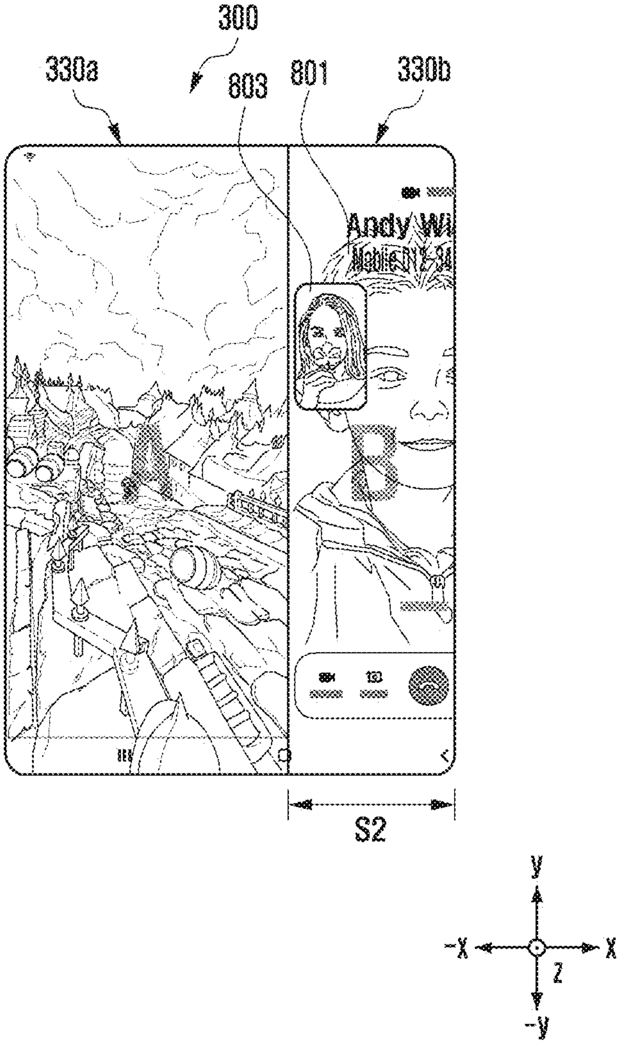
Figure 9D:
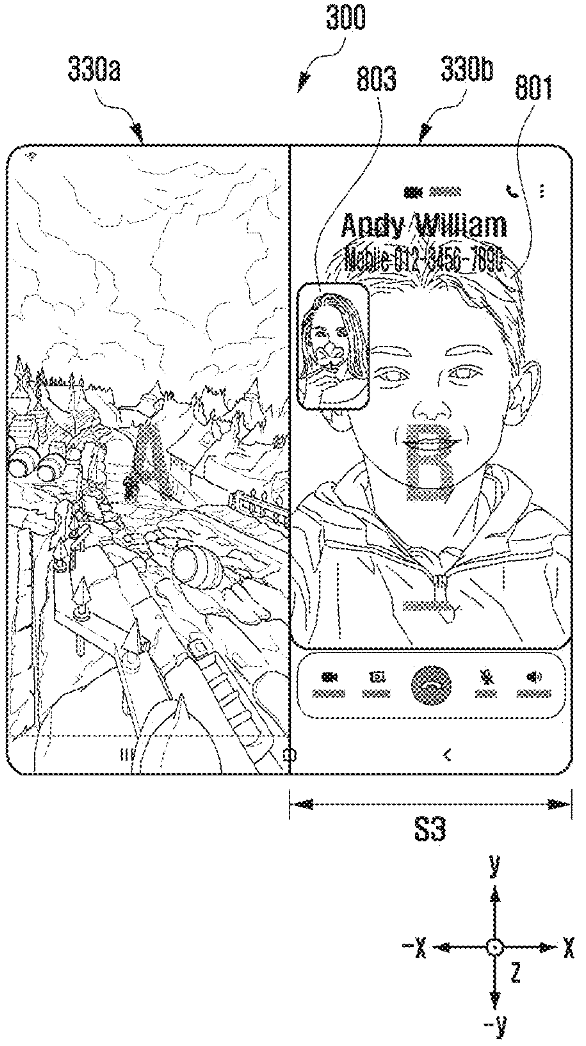

With reference to FIGS. 9B, 9C and 9D, when the user touches the state change icon 725 (e.g., display expansion selection icon), the processor 120 of the electronic device 300 may make a transition from the slide-in state to the slide-out state while sliding the second display area 330*b* of the flexible display 330 in one direction (e.g., x-axis direction). In an embodiment, as the second display area 330*b* of the flexible display 330 is slid in one direction (e.g., x-axis direction), the second display area 330*b* is expanded in sequence to have, for example, a first size S1, a second size S2, and a third size S3, and the screen related to the second application B displayed on the second display area 330*b* may also be displayed while being expanded in sequence. In an embodiment, in the second application B displayed on the second display area 330*b*, the screen of the video call recipient 803 may be fixed, and the screen of the video call requester 801 may be expanded to the first size S1, second size S2, and third size S3 while being displayed on the second display area 330*b*.

FIGS. 10A, 10B, 10C and 10D are diagrams illustrating a configuration in which the electronic device displays applications using a flexible display in response to receiving a message according to various embodiments.

Figure 10A:
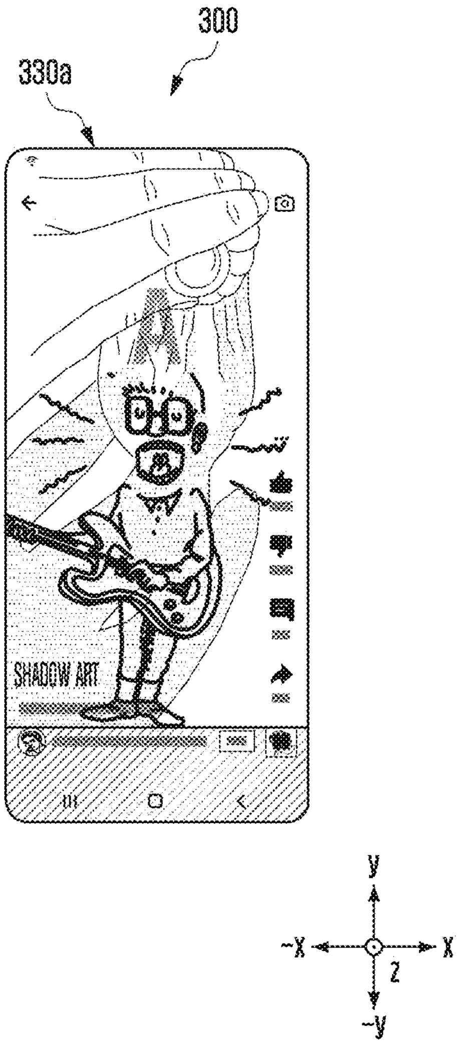
FIGS. 10A, 10B, 10C and 10D are diagrams illustrating a configuration in which the electronic device displays applications using a flexible display in response to receiving a message according to various embodiments.

With reference to FIG. 10A, the processor 120 may display a first application A (e.g., foreground application) on the first display area 330*a* of the flexible display 330 while the electronic device 300 is in the slide-in state.

Figure 10B:

With reference FIG. 10B, the electronic device 300 in the slide-in state may receive a notification 715 related to a multimedia type message (e.g., image or video) from an external electronic device 102, 104 or 108 using the wireless communication module 192. In response to occurrence of an event of the notification 715 related to a multimedia type message from the external electronic device 102, 104 or 108, while the first application A is being displayed on the first display area 330*a* of the flexible display 330, the processor

120 may display the notification 715 of the second application B related to a multimedia type message at a first position 710 of the first display area 330*a*. In response to occurrence of the event of the notification 715 related to receiving a multimedia type message from the external electronic device 102, 104 or 108, the processor 120 may generate a state change icon 725 at a second position (e.g., second position 720 in FIG. 7) of the first display area 330*a*. According to various embodiments, when multiple text messages are received from the same user of the external electronic device 102, 104 or 108 within a specific time (e.g., about 10 seconds to 5 minutes), the processor 120 may generate the state change icon 725.

Figure 10C:
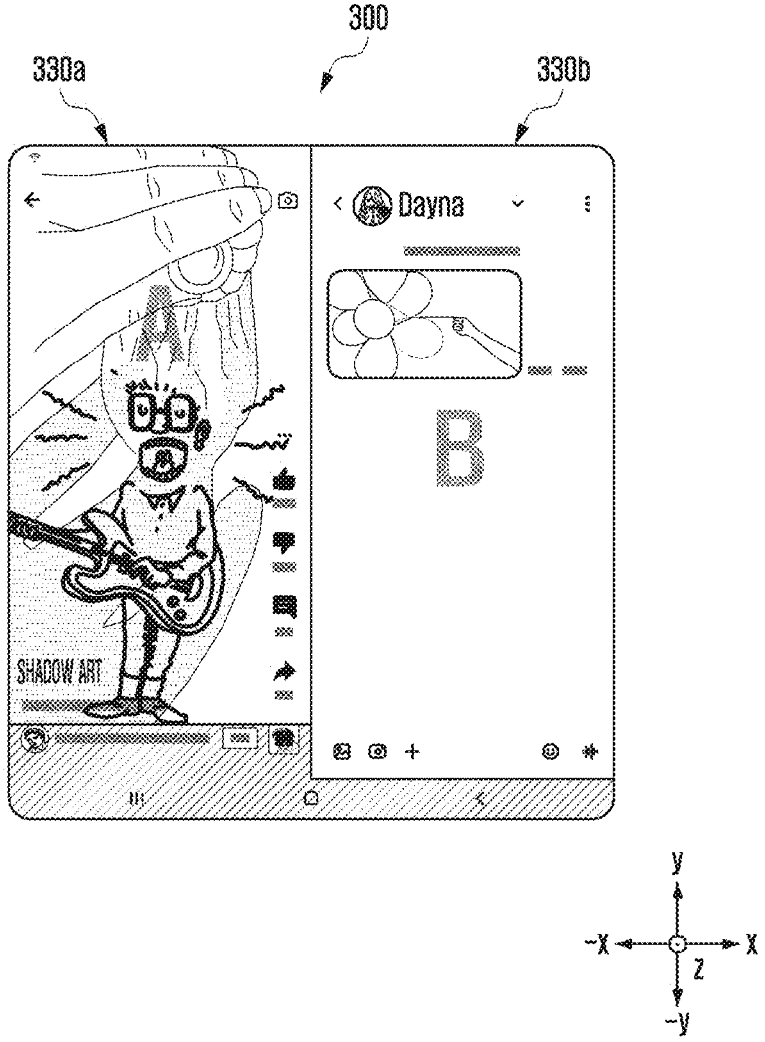

With reference to FIG. 10C, when the user touches the state change icon 725 in the slide-in state, the electronic device 300 may make a transition to the slide-out state. When the electronic device 300 transitions to the slide-out state, the processor 120 may display the first application A in the foreground state on the first display area 330*a* (e.g., first display) of the flexible display 330 and may display the second application B in the foreground state on the second display area 330*b* (e.g., second display). According to various embodiments, if the second application B includes a plurality of text messages received within a specific time from the same user of the external electronic device 102, 104 or 108, the processor 120 may display the plural text messages in a row on the second display area 330*b* of the flexible display 330 according to the order of reception by the electronic device 300.

In an embodiment, when the second application B related to a multimedia type message is displayed on the second display area 330*b* of the flexible display 330, the processor 120 may control the notification 715 related to the second application B partially displayed at the first position 710 of the first display area 330*a* and the state change icon 725 displayed at the second position 720 of the first display area 330*a* to disappear.

Figure 10D:
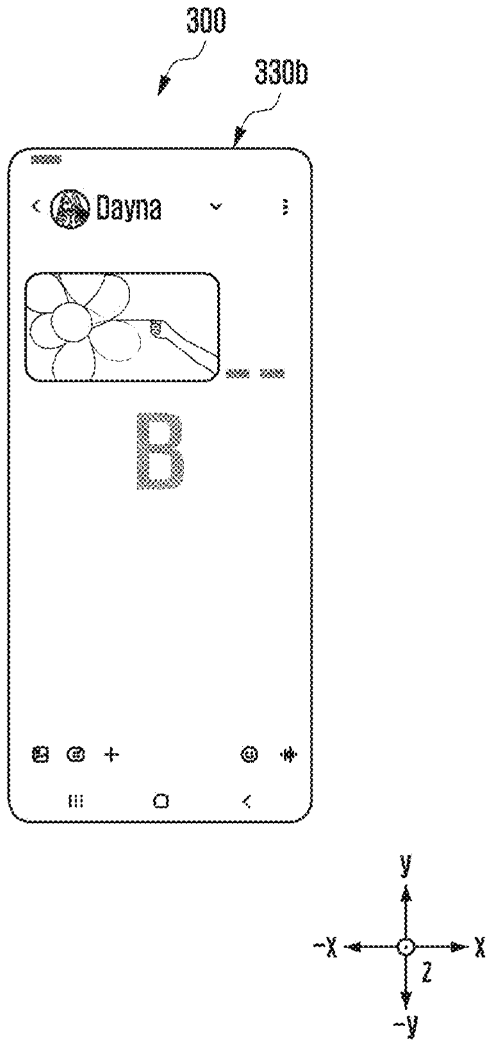

With reference to FIG. 10D, when an event of the notification 715 related to receiving a multimedia type message occurs in FIG. 10B, the user of the electronic device 300 may touch the notification 715 related to the second application B displayed at the first position 710 of the first display area 330*a*. When the notification 715 related to the second application B is touched, the processor 120 may display the second application B in the foreground state on the first display area 330*a* of the flexible display 330 while the electronic device 300 is in the slide-in state. When the second application B is displayed on the first display area 330*a*, the processor 120 may place the previously running first application A displayed on the first display area 330*a* in the background state and control it not to be displayed on the first display area 330*a*.

Figure 11:
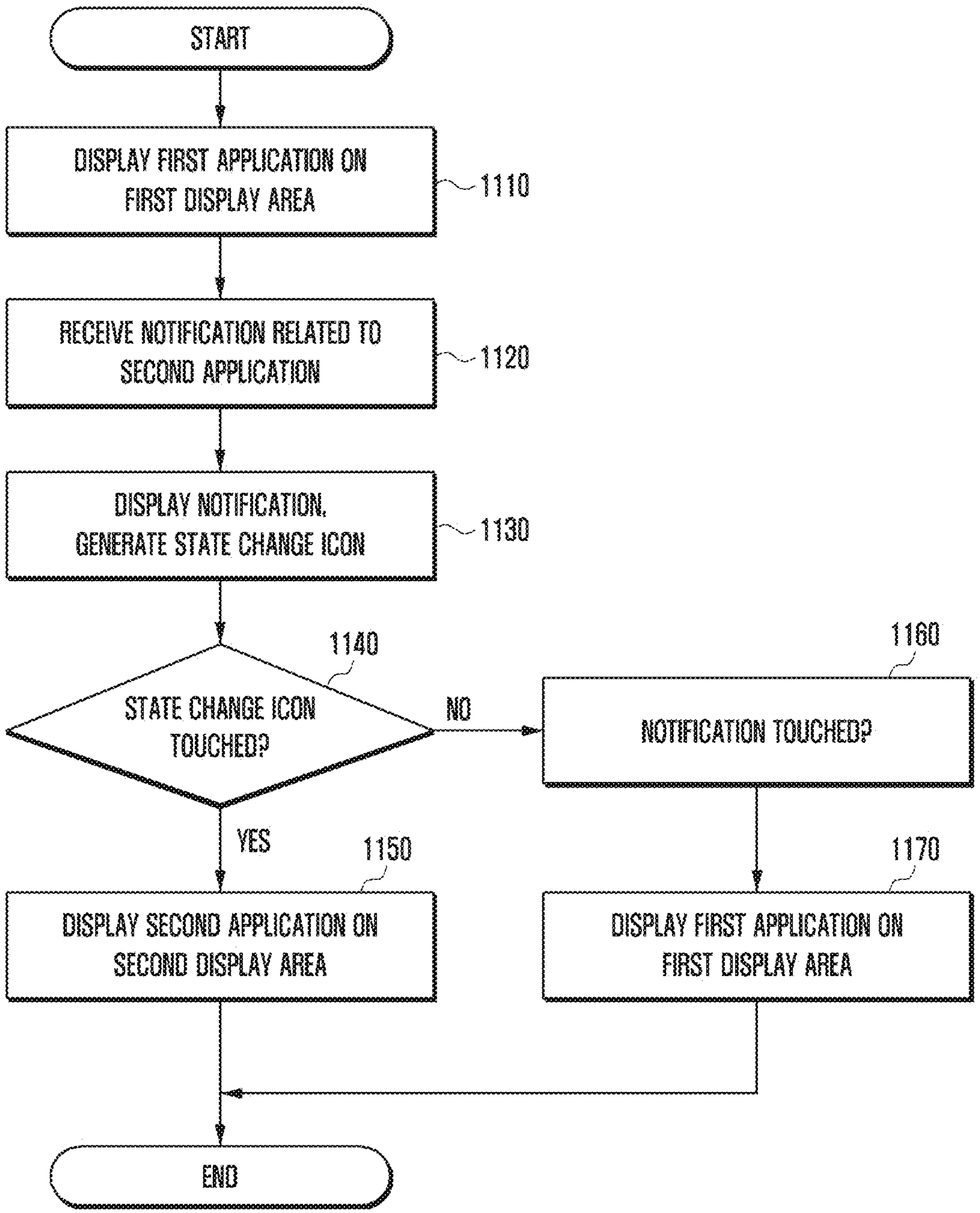
FIG. 11 is a flowchart illustrating an example method for the electronic device to display applications using a flexible display in response to receiving a notification according to various embodiments.

FIG. 11 is a flowchart illustrating an example method for the electronic device to display applications using a flexible display in response to receiving a notification according to various embodiments.

At operation 1110, in a state where the second housing 320 of the electronic device 300 is slid in the first housing 310, the processor 120 may display the first application. A currently in execution on the first display area 330*a* of the flexible display 330.

At operation 1120, in the state where the second housing 320 of the electronic device 300 is slid in the first housing 310, the processor 120 may receive a notification 715 related to a second application B from an external electronic device 102, 104 or 108.

At operation 1130, while the first application A is being displayed on the first display area 330*a* of the flexible display 330, the processor 120 may display the notification 715 related to the second application B at a first position 710 of the first display area 330*a*, and may generate a state change icon 725 (e.g., display expansion selection icon) at a second position 720 of the first display area 330*a*.

At operation 1140, the processor 120 may check whether the state change icon 725 or the notification 715 related to the second application B is touched by the user of the electronic device 300.

If the state change icon 725 is touched at operation 1140, at operation 1150, the processor 120 may switch the electronic device 300 to the slide-out state, display the first application A on the first display area 330*a* of the flexible display 330, and display the second application B on the second display area 330*b*.

At operation 1160, the processor 120 may check whether the notification 715 related to the second application B displayed at the first position 710 of the first display area 330*a* is touched at operation 1140.

If the notification 715 related to the second application B is touched, at operation 1170, the processor 120 may display the second application B on the first display area 330*a* of the flexible display 330 while the electronic device 300 is in the slide-in state.

According to an embodiment, if the second application B is displayed in the foreground state on the first display area 330*a* through operation 1170, the processor 120 may place the previously running first application A displayed on the first display area 330*a* in the background state.

FIGS. 12A, 12B, 12C and 12D are diagrams illustrating a configuration in which the electronic device displays applications using a flexible display in response to selecting a shared item according to various embodiments.

Figure 12A:
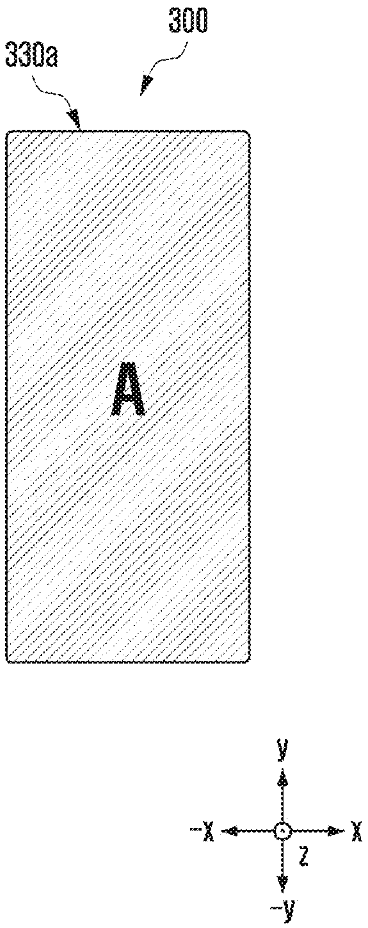
FIGS. 12A, 12B, 12C and 12D are diagrams illustrating a configuration in which the electronic device displays applications using a flexible display in response to selecting a shared item according to various embodiments.

With reference to FIG. 12A, while the electronic device 300 is in the slide-in state, the processor 120 may display the currently running first application A (e.g., foreground application) on the first display area 330*a* (e.g., first display) of the flexible display 330.

Figure 12B:
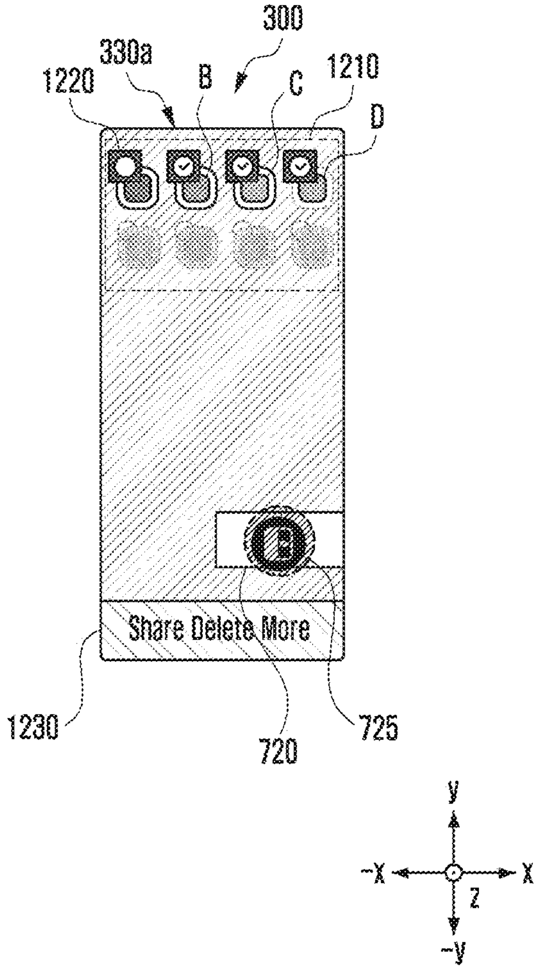

With reference to FIG. 12B, the electronic device 300 in the slide-in state may display a specific application including items 1210 that can be shared with the external electronic device 102, 104 or 108 according to the user's selection. In an embodiment, the shareable item 1210 may include at least one image and/or at least one video. The shareable item 1210 may include a check box 1220.

According to an embodiment, if a check box 1220 for a shareable item 1210 is selected (e.g., image B, image C, or image D in FIG. 12C), while the first application A is being displayed on the first display area 330*a* (e.g., first display) of the flexible display 330, the processor 120 may generate a state change icon 725 (e.g., display expansion selection icon) at a second position 720 of the first display area 330*a*. According to various embodiments, if the check box 1220 for a shareable item 1210 is selected (e.g., image B, image C, or image D in FIG. 12C), the processor 120 may generate a navigation bar 1230 including items such as Share, Delete, and More at the lower portion of the first display area 330*a*.

Figure 12C:
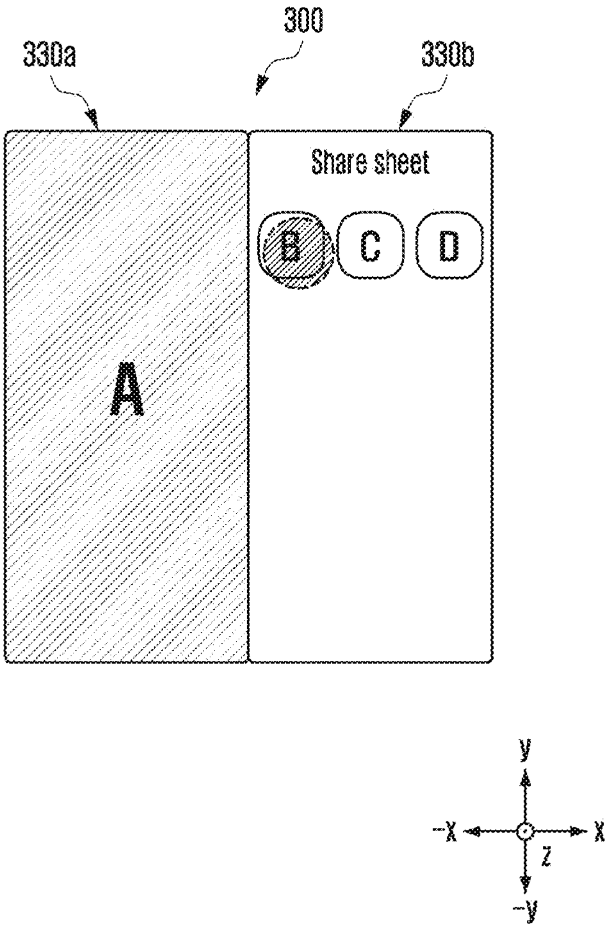

With reference to FIG. 12C, when the user touches the state change icon 725, the electronic device 300 may switch from the slide-in state to the slide-out state. When the electronic device 300 switches to the slide-out state, the processor 120 may display the first application A in the foreground state on the first display area 330*a* (e.g., first display) of the flexible display 330, and may display items related to image B, image C, and image D selected using the check box 1220 in the foreground state on the second display area 330*b* (e.g., second display).

According to an embodiment, when the items related to image B, image C, and image D selected using the check box 1220 are displayed on the second display area 330*b* of the flexible display 330, the processor 120 may control the state change icon 725 displayed on the first display area 330*a* to disappear.

Figure 12D:
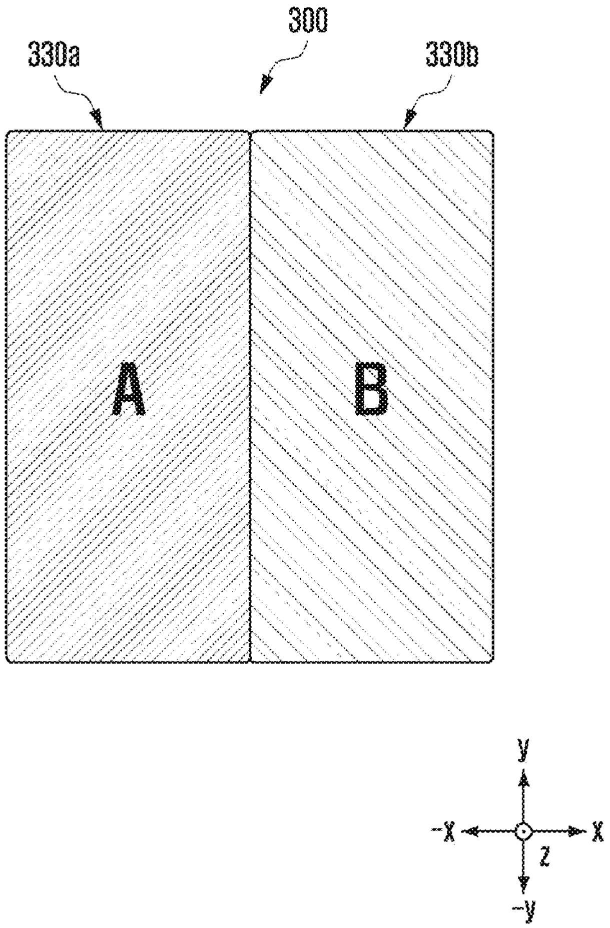

With reference to FIGS. 12B and 12C, if the item related to image B among image B, image C, and image D displayed on the second display area 330*b* (e.g., second display) is touched while the electronic device 300 is in the slide-out state, the processor 120 may display a second application B related to image B on the second display area 330*b* (see FIG. 12D).

FIGS. 13A, 13B, 13C and 13D are diagrams illustrating a configuration in which the electronic device displays applications so that a shared item can be shared with an external electronic device according to various embodiments.

Figure 13A:
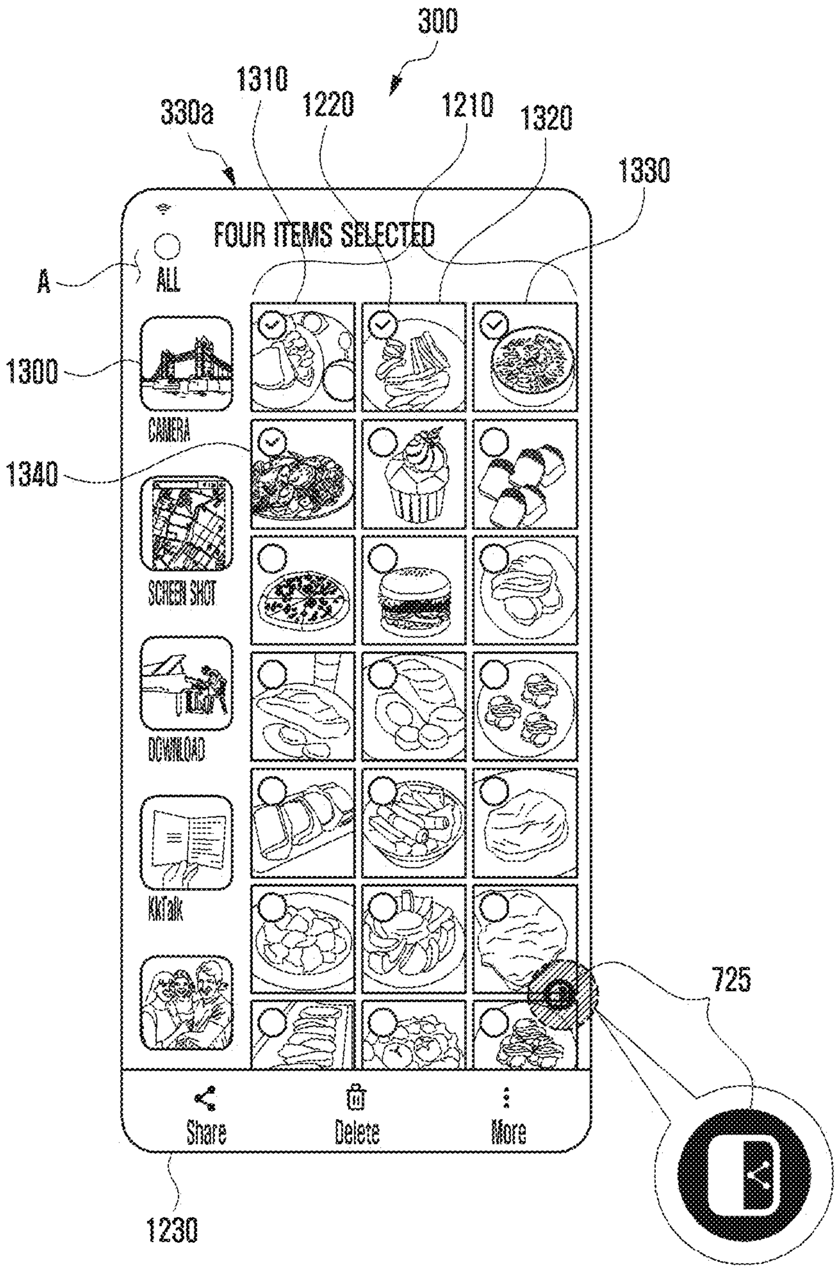
FIGS. 13A, 13B, 13C and 13D are diagrams illustrating a configuration in which the electronic device displays applications so that a shared item can be shared with an external electronic device according to various embodiments.

With reference to FIG. 13A, while the electronic device 300 is in the slide-in state, the processor 120 may display a first application A currently in execution (e.g., foreground application) on the first display area 330*a* (e.g., first display) of the flexible display 330.

According to an embodiment, the first application A may include at least one menu selection item 1300 that can provide a sharable item 1210 stored in the memory 130. The at least one menu selection item 1300 may include, for example, an image or video captured using a camera, an image captured using a screen shot, content downloaded from an external electronic device 102, 104 or 108, or content received using social media (SNS) (e.g., KakaoTalk).

According to an embodiment, if the user of the electronic device 300 touches a menu selection item 1300 (e.g., camera), the processor 120 may display a sharable item 1210 stored in the memory 130 on the first application A activated on the first display area 330*a* of the flexible display 330.

According to an embodiment, when at least one of a first image 1310, a second image 1320, a third image 1330, or a fourth image 1340 among the plural shareable items 1210 is selected using the check box 1220, while the first application A is being displayed on the first display area 330*a* (e.g., first display) of the flexible display 330, the processor 120 may generate a state change icon 725 at a second position 720 of the first display area 330*a*. According to various embodiments, if at least one image (e.g., first image 1310, second image 1320, third image 1330 and/or fourth image 1340) is selected using check boxes 1220 for the shareable items 1210, the processor 120 may generate a navigation bar 1230 including menus such as Share, Delete, and More at a lower portion of the first display area 330*a*.

Figure 13B:
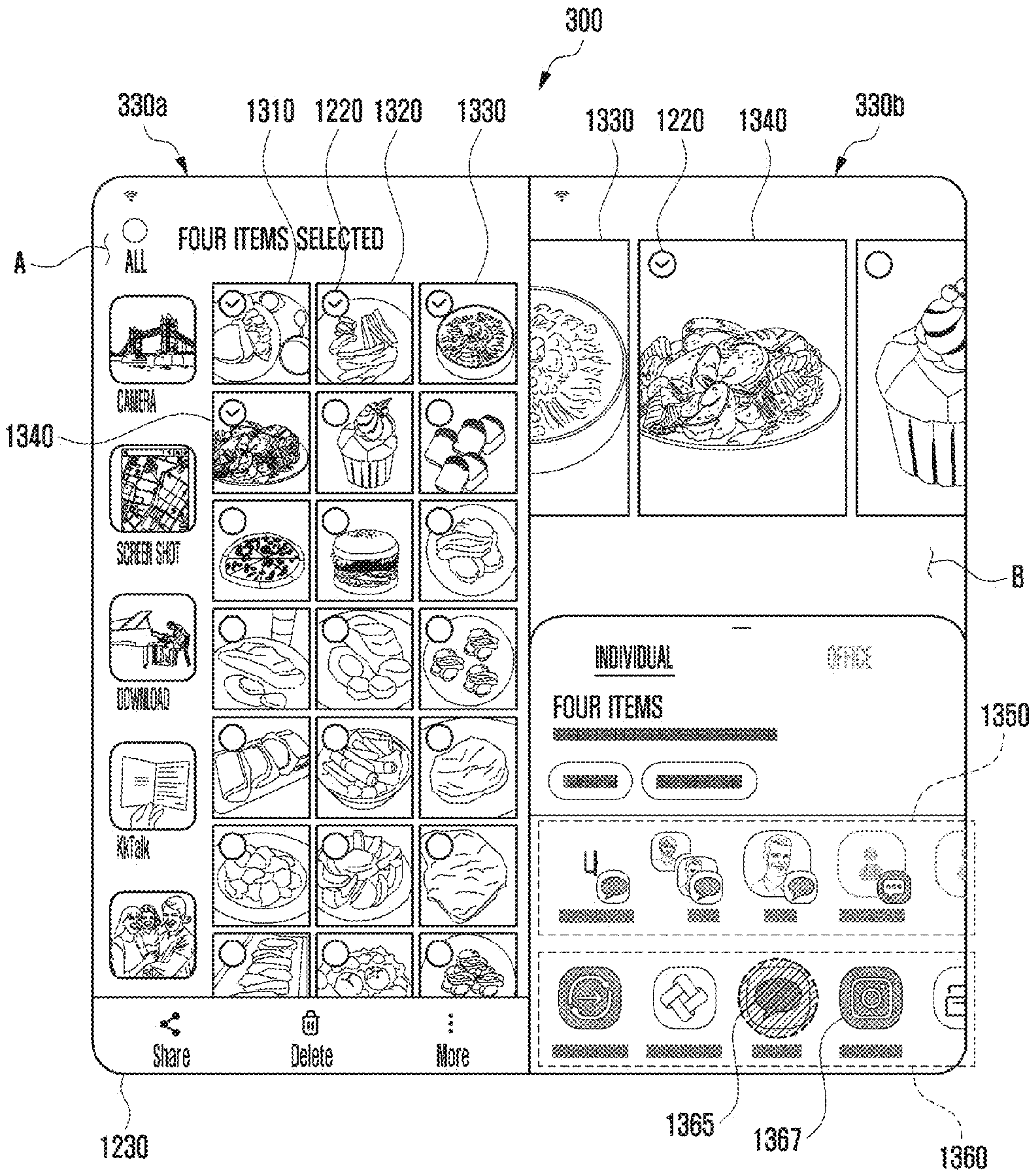

With reference to FIGS. 13A and 13B, when the user touches the state change icon 725, the electronic device 300 may make a transition from the slide-in state to the slide-out state. When the electronic device 300 transitions to the slide-out state, the processor 120 may display the first application A in the foreground state on the first display area 330*a* (e.g., first display) of the flexible display 330, and may display the second application B including at least one of the at least one image (e.g., first image 1310, second image 1320, third image 1330, and/or fourth image 1340) selected using the check box 1220, a shareable user list menu 1350, or a shareable application menu 1360 on the second display area 330*b* (e.g., second display). In an embodiment, the shareable user list menu 1350 may include icons related to a list of phone numbers of users of the external electronic devices 102, 104 and 108 stored in the memory 130 so as to share the shareable items 1210 with the external electronic devices 102, 104 and 108. In an embodiment, the shareable application menu 1360 may include icons for selecting social network service (SNS) applications such as KakaoTalk, Line, Telegram, and Instagram.

Figure 13C:
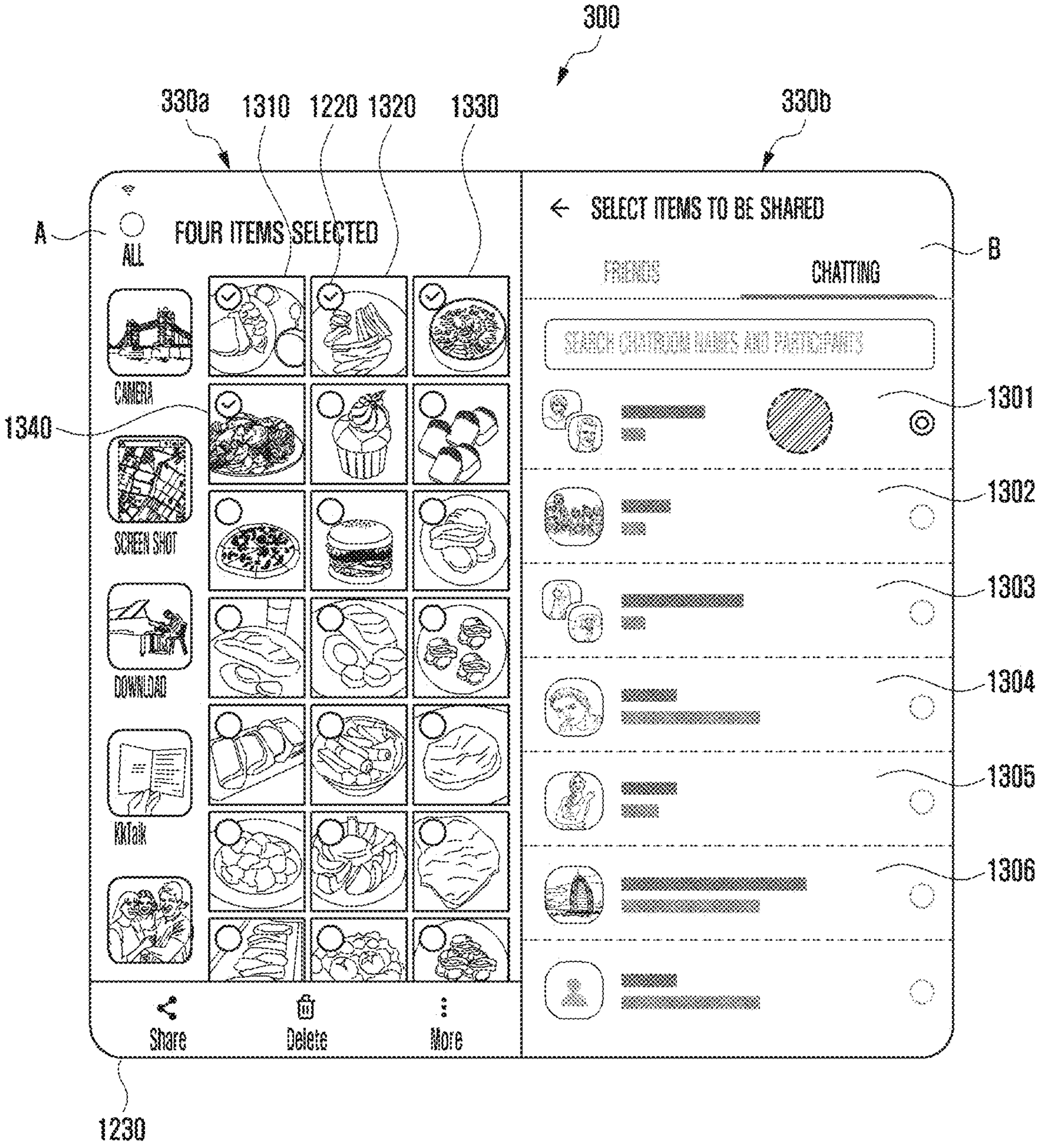

With reference to FIGS. 13B and 13C, while the electronic device 300 is in the slide-out state, when a sharing selection application 1365 (e.g., KakaoTalk icon) in the shareable application menu 1360 displayed on the second display area 330*b* (e.g., second display) is touched, the processor 120 may display a list of users of the external electronic devices 102, 104 and 108 related to the sharing selection application 1365 on the second application B.

Figure 13D:
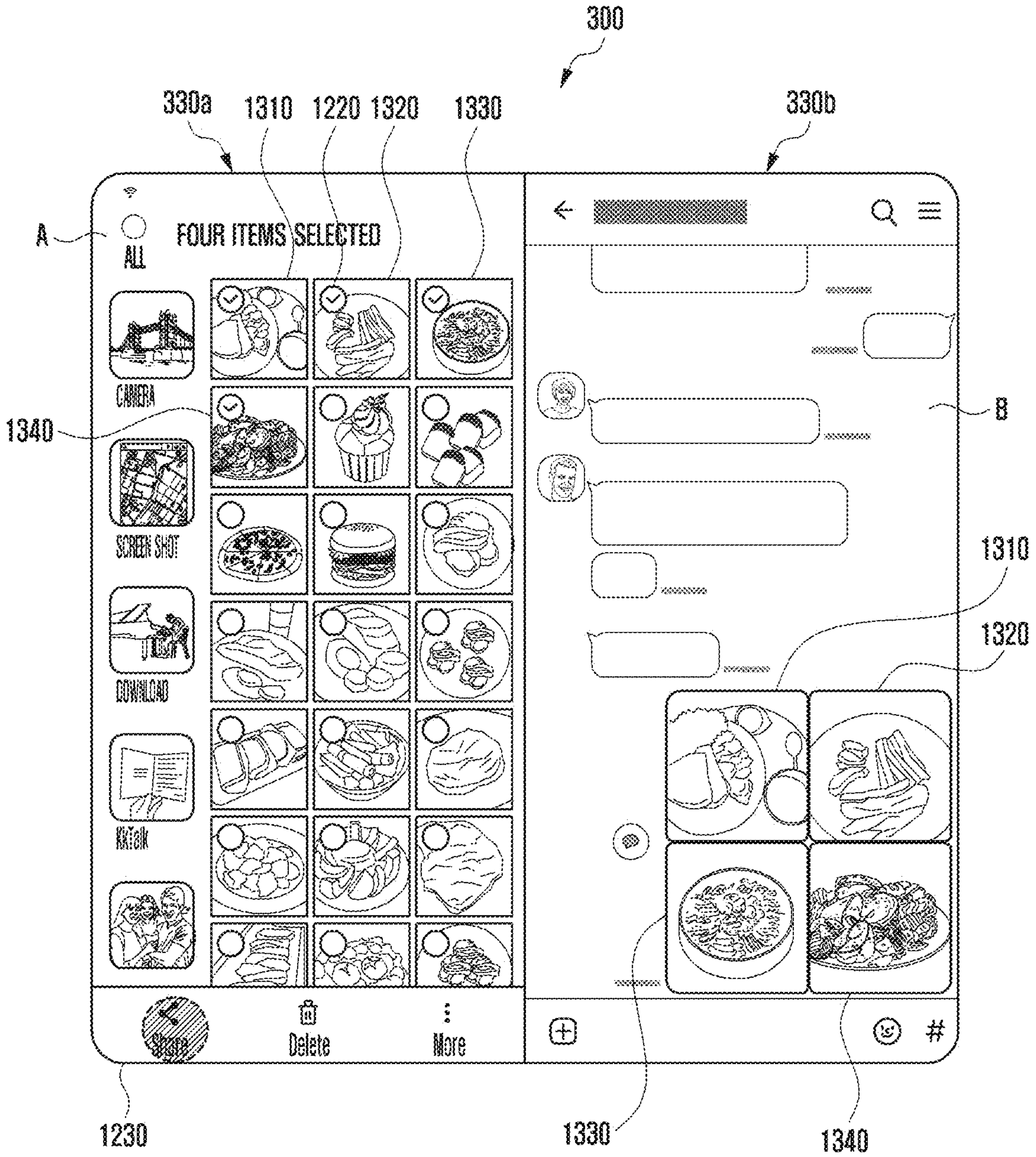

With reference to FIGS. 13C and 13D, when the user of the electronic device 300 touches a first user 1301 in the list of plural users (e.g., 1301, 1302, 1303, 1304, 1305 and 1306) displayed on the second application B of the second display area 330*b*, the processor 120 may transmit the at least one image (e.g., first image 1310, second image 1320, third image 1330, and/or fourth image 1340) selected using the check box 1220 to the first user 1301 for sharing.

According to an embodiment, in FIG. 13D, when the user of the electronic device 300 touches the Share item displayed on the navigation bar 1230, the processor 120 may switch the second application B displayed on the second display area 330*b* to a screen including a shareable user list menu 1350 or a shareable application menu 1360 as shown in FIG. 13B, and may control the at least one image (e.g., first image 1310, second image 1320, third image 1330, and/or fourth image 1340) to be shared using a sharing selection application 1365 (e.g. KakaoTalk icon) and another sharing selection application 1367 (e.g. Instagram) in the shareable application menu 1360.

Figure 14:
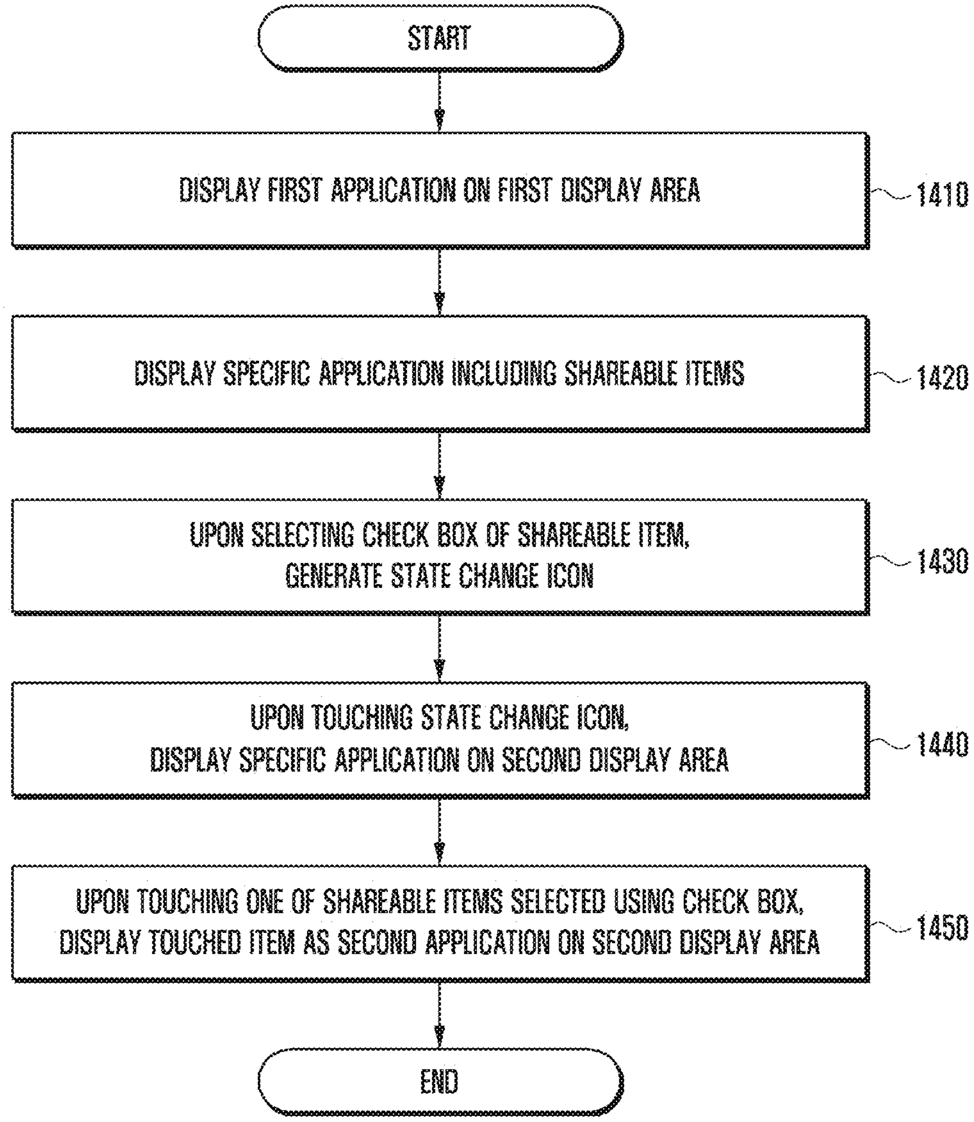
FIG. 14 is a flowchart illustrating an example method for the electronic device to display applications using a flexible display in response to selecting a shared item according to various embodiments.

FIG. 14 is a flowchart illustrating an example method for the electronic device to display applications using a flexible display in response to selecting a shared item according to various embodiments.

At operation 1410, while the electronic device 300 is in the slide-in state, the processor 120 may display a first application A currently in execution on the first display area 330*a* of the flexible display 330.

At operation 1420, while the electronic device 300 is in the slide-in state, the processor 120 may display a specific application including items 1210 that can be shared with the external electronic device 102, 104 or 108 on the first display area 330*a* in response to user's selection.

At operation 1430, if the check box 1220 of a shareable item 1210 is selected (e.g., image B, image C, image D in FIG. 12C), the processor 120 may generate a state change icon 725 on the first display area 330*a* of the flexible display 330.

If the user of the electronic device 300 touches the state change icon 725, at operation 1440, the processor 120 may switch the electronic device 300 to the slide-out state, display the first application A on the first display area 330*a* of the flexible display 330, and display a specific application related to image B, image C, or image D selected using the check box 1220 on the second display area 330*b*.

If one item (e.g., image B in FIG. 12C) of the shareable items 1210 selected using the check box 1220 is touched, at operation 1450, the processor 120 may display the touched item (e.g., image B) as a second application B on the second display area 330*b*.

FIGS. 15A, 15B, 15C and 15D are diagrams illustrating a configuration in which the electronic device displays applications using a flexible display in response to long pressing on an object containing a hyperlink according to various embodiments.

Figure 15A:
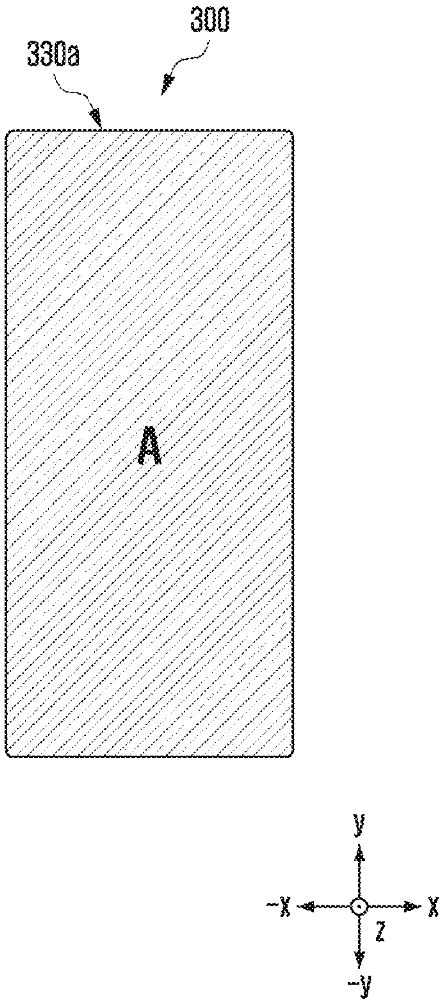
FIGS. 15A, 15B, 15C and 15D are diagrams illustrating a configuration in which the electronic device displays applications using a flexible display in response to long pressing on an object containing a hyperlink according to various embodiments.

With reference to FIG. 15A, while the electronic device 300 is in the slide-in state, the processor 120 may display a first application A currently in execution (e.g., foreground application) on the first display area 330*a* (e.g., first display) of the flexible display 330.

Figure 15B:
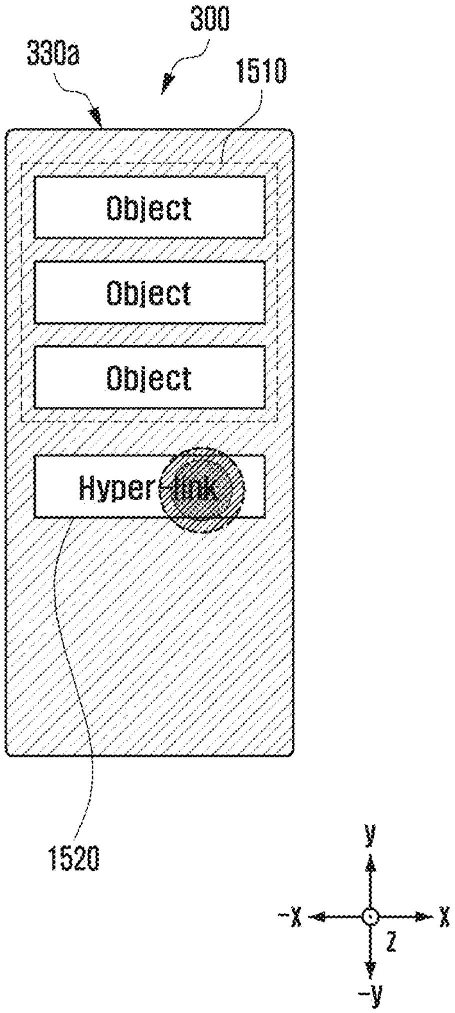

With reference to FIG. 15B, the electronic device 300 in the slide-in state may display a specific application that shares content (e.g., live broadcast) with the external electronic device 102, 104 or 108 according to user's selection. In an embodiment, the specific application that shares content may include at least one of at least one object 1510 (e.g., advertisement and live broadcast host video) or an object 1520 including a hyperlink.

Figure 15C:
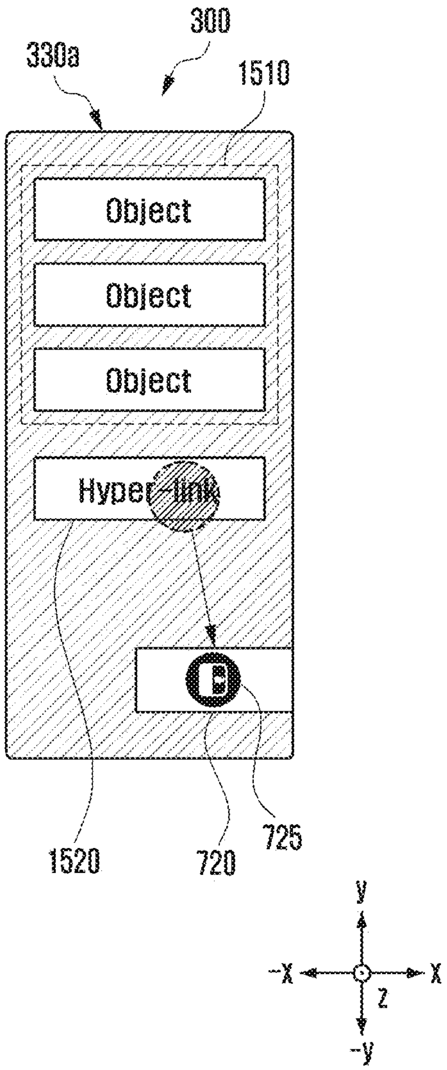
Figure 15D:
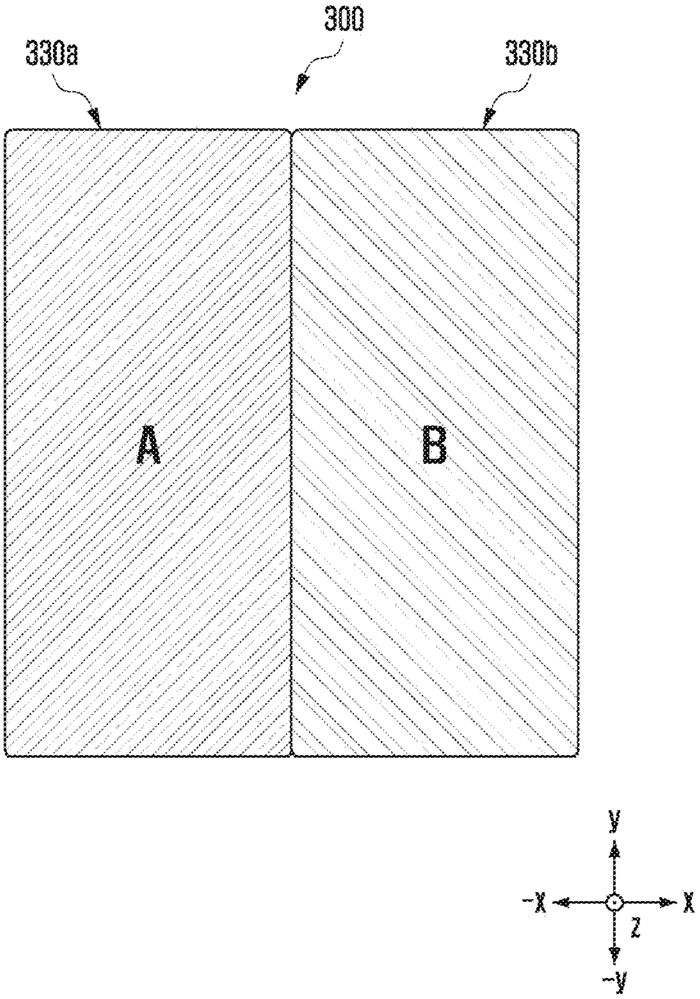

With reference to FIGS. 15B, 15C and 15D, while the electronic device 300 is in the first slide-in state, if the user long-presses the object 1520 including a hyperlink for a specific time (e.g., about 1 to 3 seconds), the processor 120 may generate a state change icon 725 (e.g., display expansion selection icon) at a second position 720 of the first display area 330*a*. If the object 1520 including a hyperlink having been selected through a long press is dragged and dropped onto the state change icon 725, the processor 120 may switch the electronic device 300 to the slide-out state. When the electronic device 300 is switched to the slide-out state, the processor 120 may display the first application A (e.g., foreground) on the first display area 330*a* (e.g., first display) of the flexible display 330, and display content (e.g., product advertisement) related to the object 1520 including a hyperlink as a second application B on the second display area 330*b* (e.g., second display).

FIGS. 16A, 16B, 16C, 16D and 17 are diagrams illustrating a configuration in which the electronic device displays applications using a flexible display in response to long pressing on an object containing a hyperlink during usage of the Internet according to various embodiments.

Figure 16A:
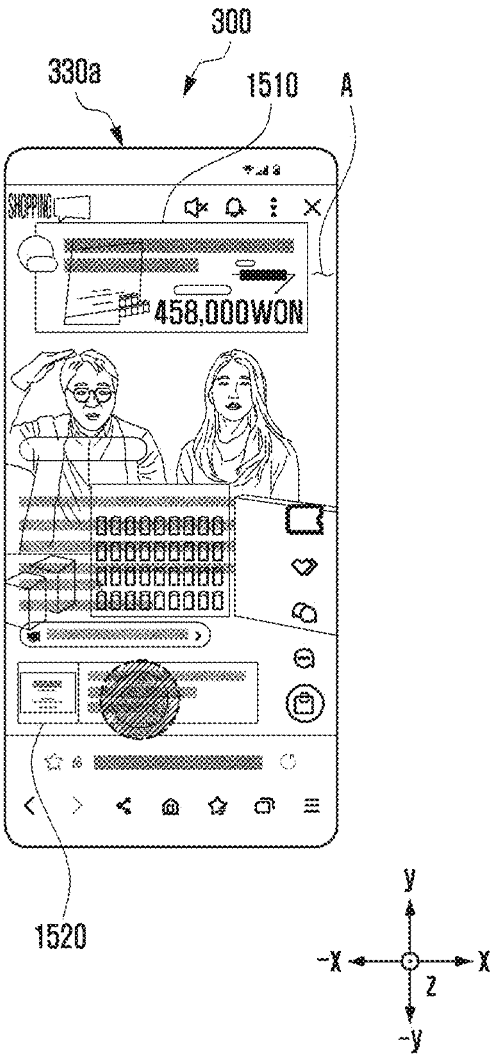
FIGS. 16A, 16B, 16C, 16D and 17 are diagrams illustrating a configuration in which the electronic device displays applications using a flexible display in response to long pressing on an object containing a hyperlink during usage of the Internet according to various embodiments.

With reference to FIG. 16A, while the electronic device 300 is in the slide-in state, the processor 120 may display a first application A currently in execution (e.g., foreground application) on the first display area 330*a* (e.g., first display) of the flexible display 330. In an embodiment, the first application A may include an application related to live broadcasting conducted in real time with the external electronic device 102, 104 or 108 while the electronic device 300 is in the slide-in state. In an embodiment, the first application A may include at least one of at least one object 1510 (e.g., advertisement and live broadcast host video) or an object 1520 including a hyperlink.

Figure 16B:
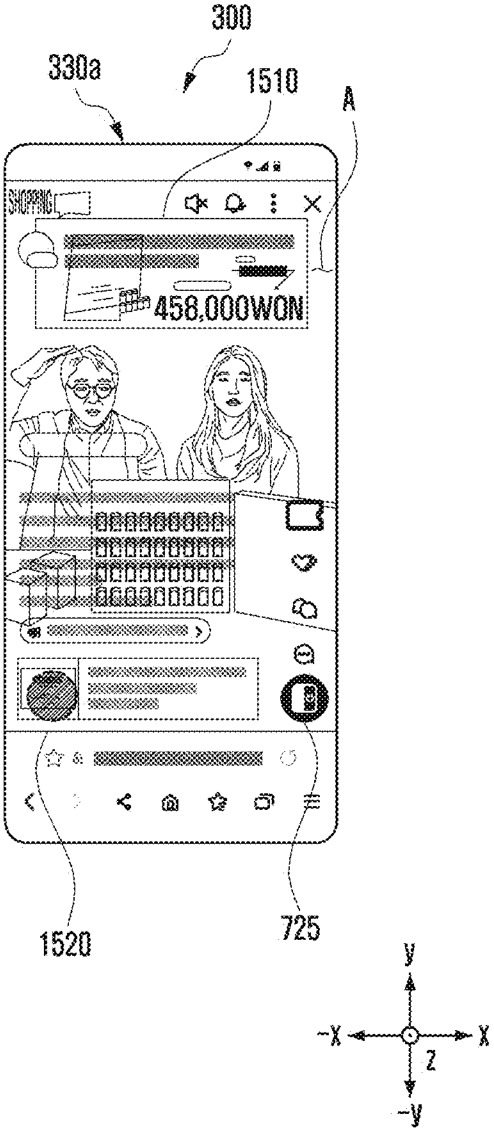

With reference to FIGS. 16A and 16B, while the electronic device 300 is in the slide-in state, if the user long-presses the object 1520 including a hyperlink for a specific time (e.g., about 1 to 3 seconds), the processor 120 may generate a state change icon 725 (e.g., display expansion selection icon) at a second position (e.g., second position 720 in FIG. 15) of the first display area 330*a*.

Figure 16C:
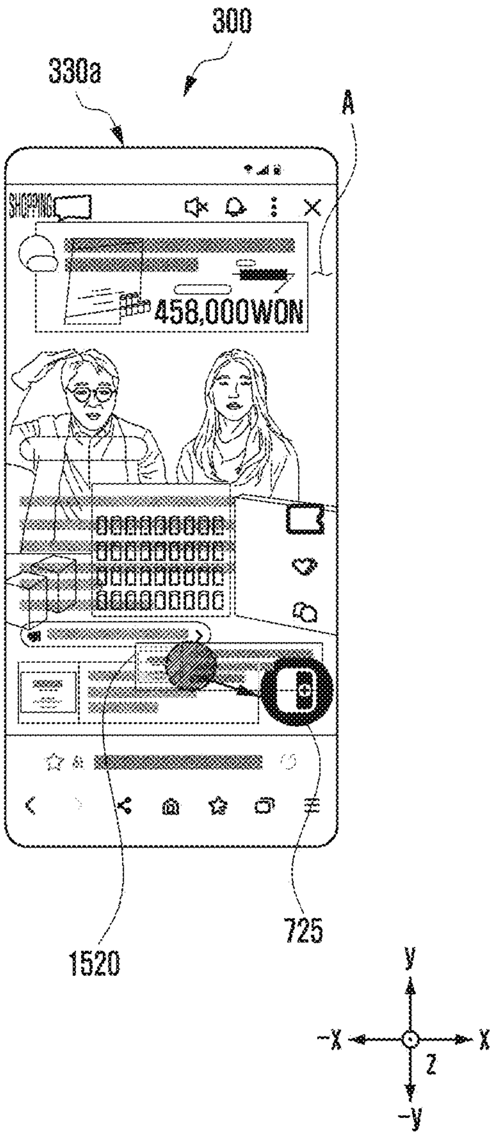

With reference to FIG. 16C, if the object 1520 including a hyperlink having been selected through a long press is dragged and dropped onto the state change icon 725, the processor 120 may switch the electronic device 300 to the slide-out state.

Figure 16D:
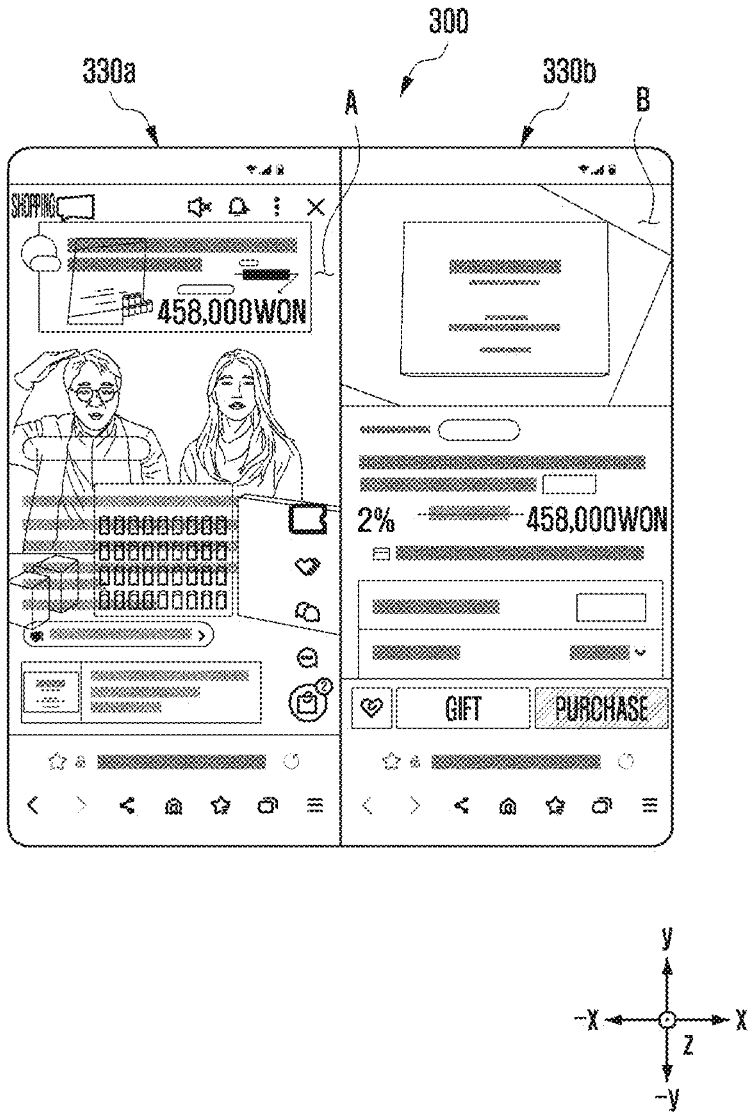

With reference to FIG. 16D, when the electronic device 300 is switched to the slide-out state, the processor 120 may display the first application A (e.g., foreground) on the first display area 330*a* (e.g., first display) of the flexible display 330, and display content (e.g., product advertisement) related to the object 1520 including a hyperlink as a second application B on the second display area 330*b* (e.g., second display).

Figure 17:
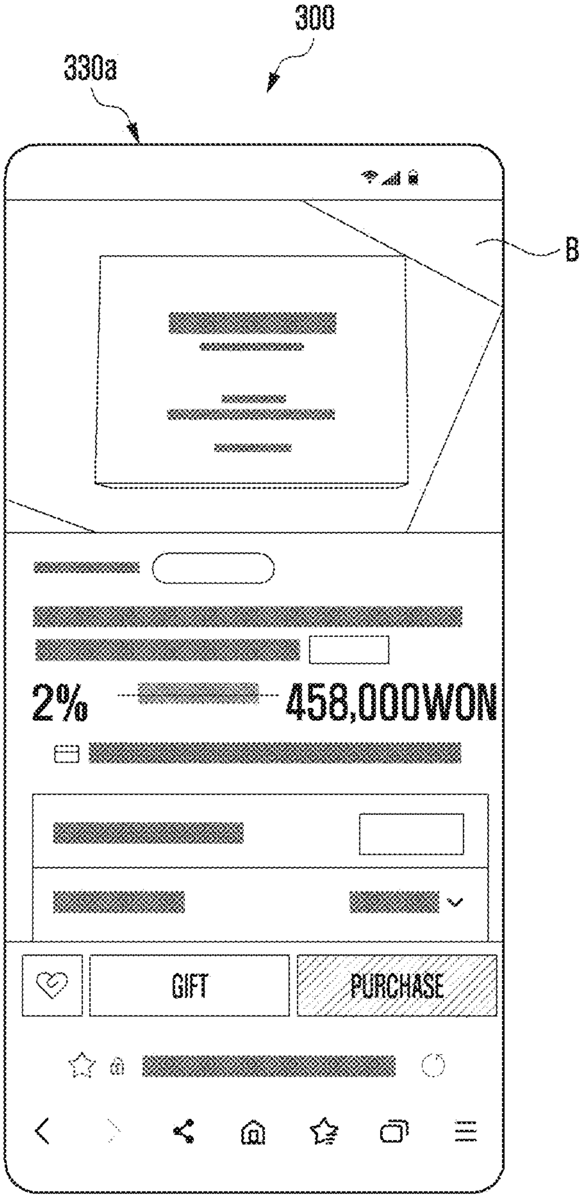

With reference to FIG. 17, while the electronic device 300 is in the slide-in state as shown in FIG. 16A or 16B, if the object 1520 including a hyperlink is touched without being long pressed, the processor 120 may display content (e.g., product advertisement) related to the object 1520 including a hyperlink as a second application B on the first display area 330*a* of the flexible display 330. In an embodiment, when the second application B is displayed on the first display area 330*a*, the processor 120 may place the previously running first application A displayed on the first display area 330*a* in the background state. For example, when the second application B is executed on the first display area 330*a*, the first application A previously in execution on the first display area 330*a* may be not displayed on the first display area 330*a*.

Figure 18:
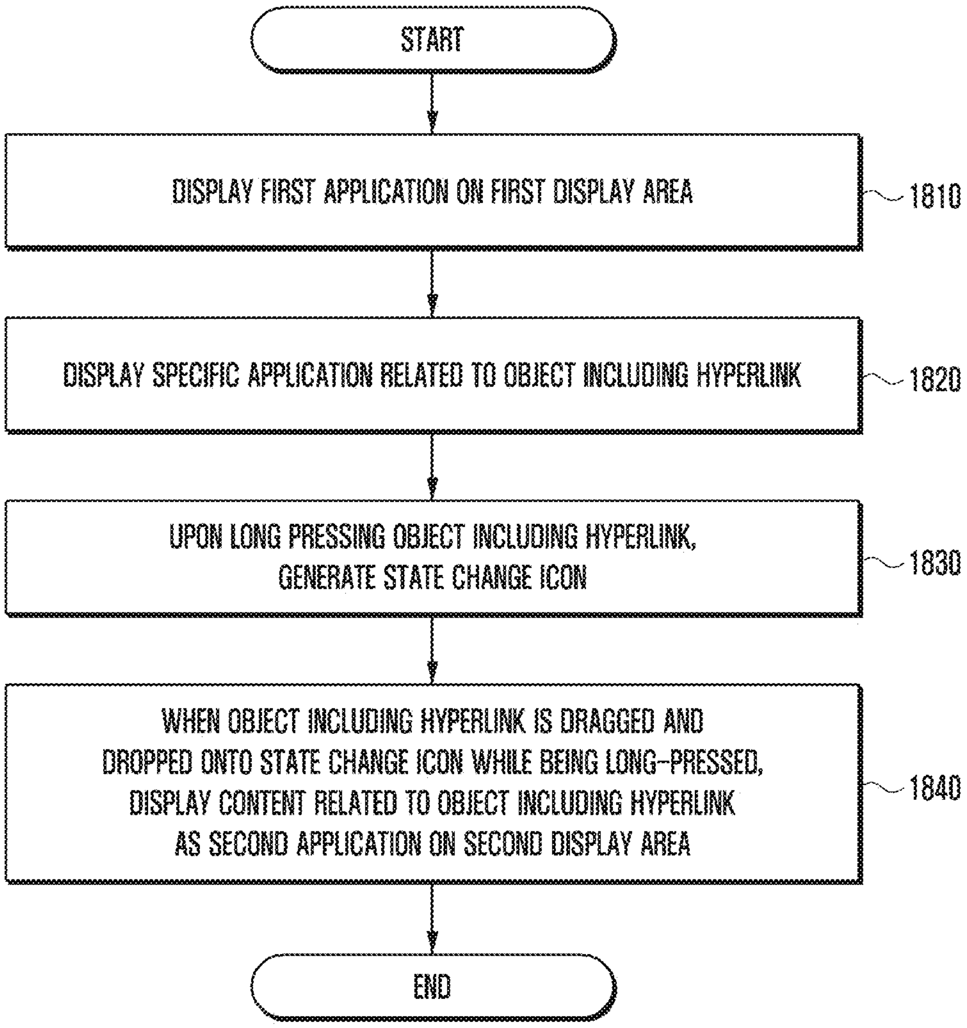
FIG. 18 is a flowchart illustrating an example method for the electronic device to display applications using a flexible display in response to long pressing on an object containing a hyperlink according to various embodiments.

FIG. 18 is a flowchart illustrating an example method for the electronic device to display applications using a flexible display in response to long pressing on an object containing a hyperlink according to various embodiments.

At operation 1810, while the electronic device 300 is in the slide-in state, the processor 120 may display a first application A currently in execution on the first display area 330*a* (e.g., first display) of the flexible display 330.

At operation 1820, while the electronic device 300 is in the slide-in state, the processor 120 may display a specific application that shares specific content (e.g., live broadcast) with an external electronic device 102, 104 or 108 according to user's selection. For example, the processor 120 may display a specific application related to the object 1520 including a hyperlink on the first display area 330*a*.

At operation 1830, if the object 1520 including a hyperlink is long pressed for a specific time (e.g., about 1 to 3 seconds), the processor 120 may generate a state change icon 725 (e.g., display expansion selection icon).

At operation 1840, if the object 1520 including a hyperlink is dragged and dropped onto the state change icon 725 while being long-pressed, the processor 120 may switch the electronic device 300 to the slide-out state, display the first application A on the first display area 330*a* of the flexible display 330, and display content (e.g., product advertisement) related to the object 1520 including a hyperlink as a second application B on the second display area 330*b*.

FIGS. 19A, 19B, 19C and 19D are diagrams illustrating a configuration in which the electronic device displays applications through a side menu and a long press on a specific icon according to various embodiments.

Figure 19A:
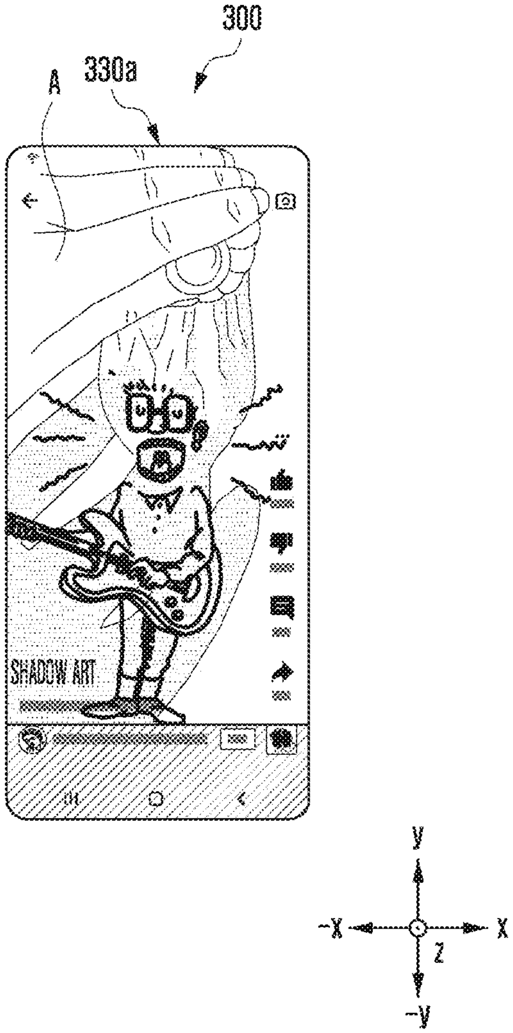
FIGS. 19A, 19B, 19C and 19D are diagrams illustrating a configuration in which the electronic device displays applications through a side menu and a long press on a specific icon according to various embodiments.

With reference to FIG. 19A, while the electronic device 300 is in the slide-in state, the processor 120 may display a first application A currently in execution (e.g., foreground application) on the first display area 330*a* (e.g., first display) of the flexible display 330.

Figure 19B:
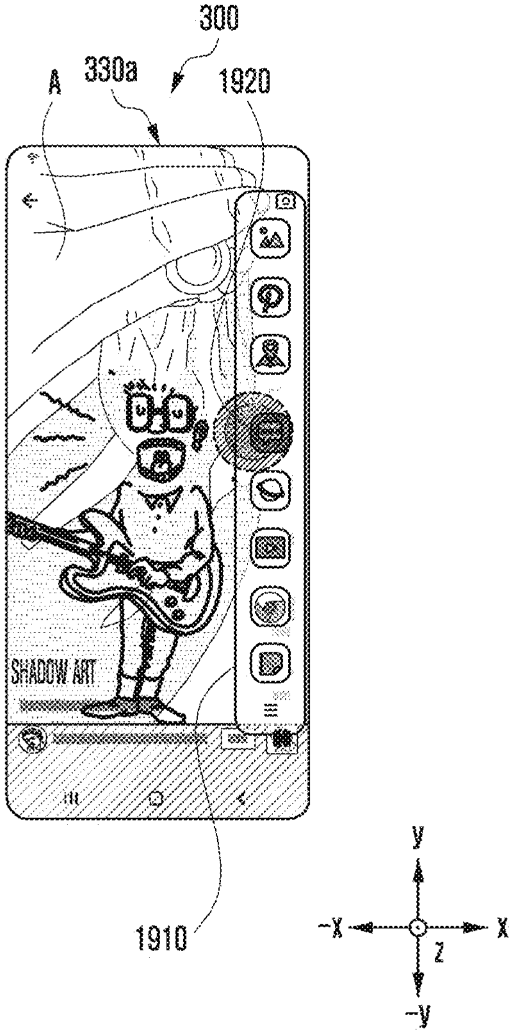
Figure 19C:
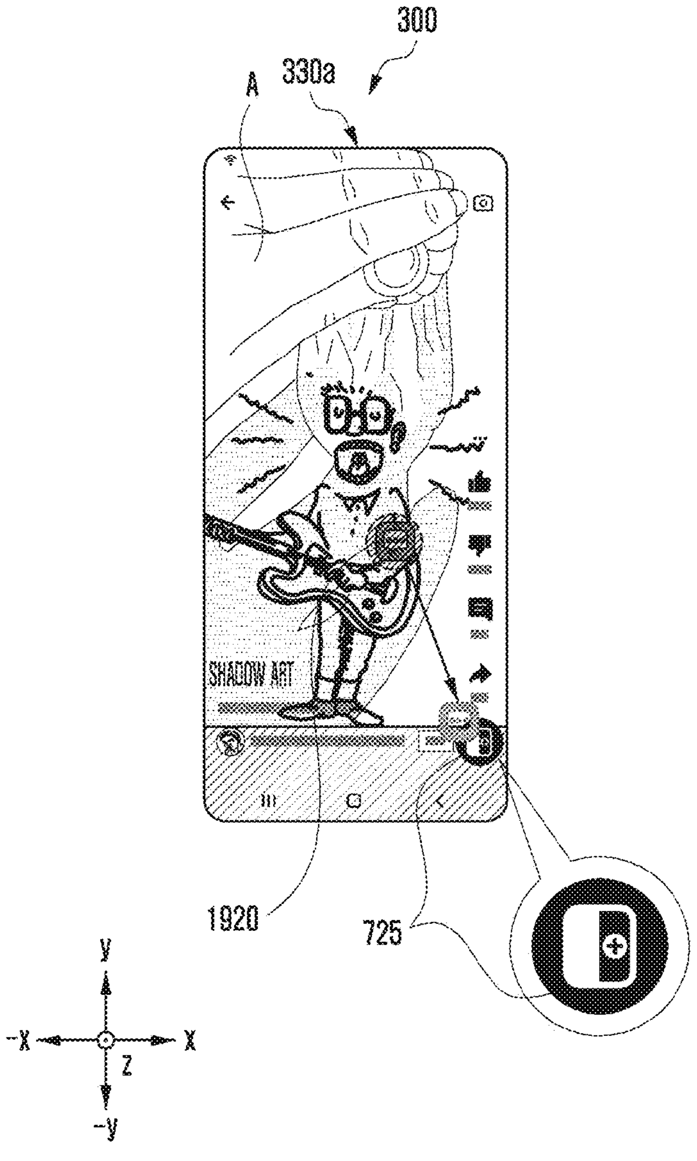

With reference to FIGS. 19B and 19C, while the electronic device 300 is in the slide-in state, if the user drags one side corner (e.g., x-axis direction) of the first display area 330*a* of the flexible display 330 in one direction (e.g., negative x-axis direction), the processor 120 may partially display a side menu 1910 (e.g., edge panel) including at least one icon on the first display area 330*a*. If the user of the electronic device 300 long-presses a specific icon 1920 (e.g., text icon) among at least one icon included in the side menu 1910 for a specific time (e.g., about 1 to 3 seconds), the processor 120 may generate a state change icon 725 at a second position (e.g., second position 720 in FIG. 15) of the first display area 330*a*.

Figure 19D:
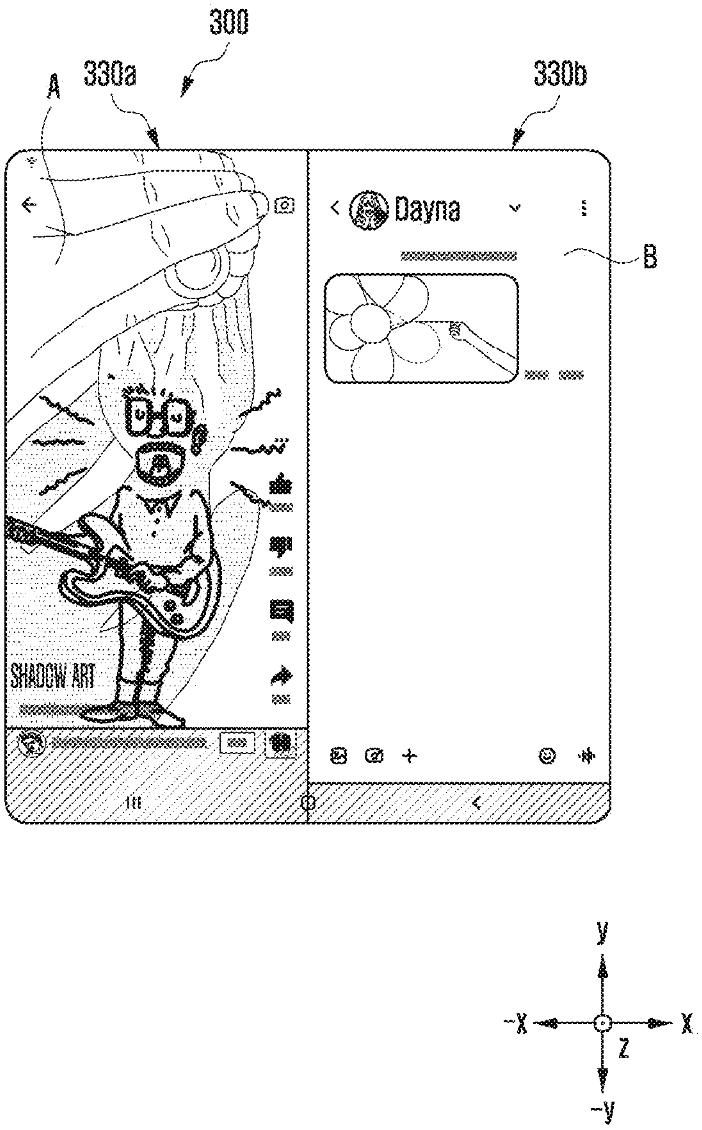

With reference to FIGS. 19B, 19C and 19D, if the specific icon 1920 (e.g., text icon) is dragged and dropped onto the state change icon 725 while being long-pressed, the processor 120 may switch the electronic device 300 to the slide-out state. When the electronic device 300 is switched to the slide-out state, the processor 120 may display the first application A (e.g., foreground) on the first display area 330*a* (e.g., first display) of the flexible display 330, and display content (e.g., image or text) related to the specific icon 1920 (e.g., text icon) on the second display area 330*b* (e.g., second display) as a second application B.

Figure 20A:
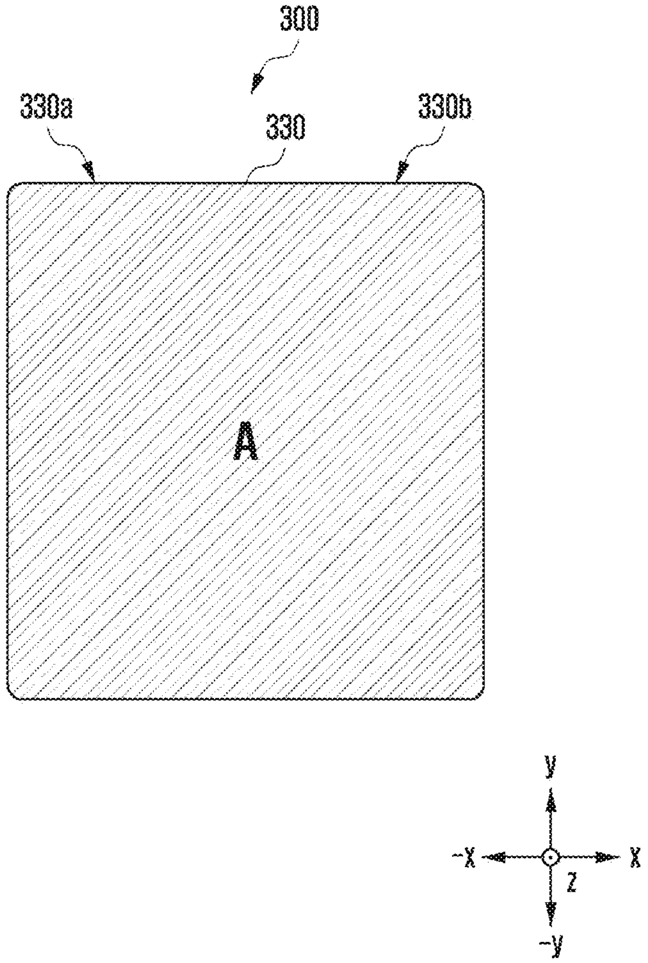
FIGS. 20A, 20B and 20C are diagrams illustrating a configuration in which the electronic device displays applications in response to receiving a notification while the flexible display is expanded according to various embodiments.
Figure 20B:
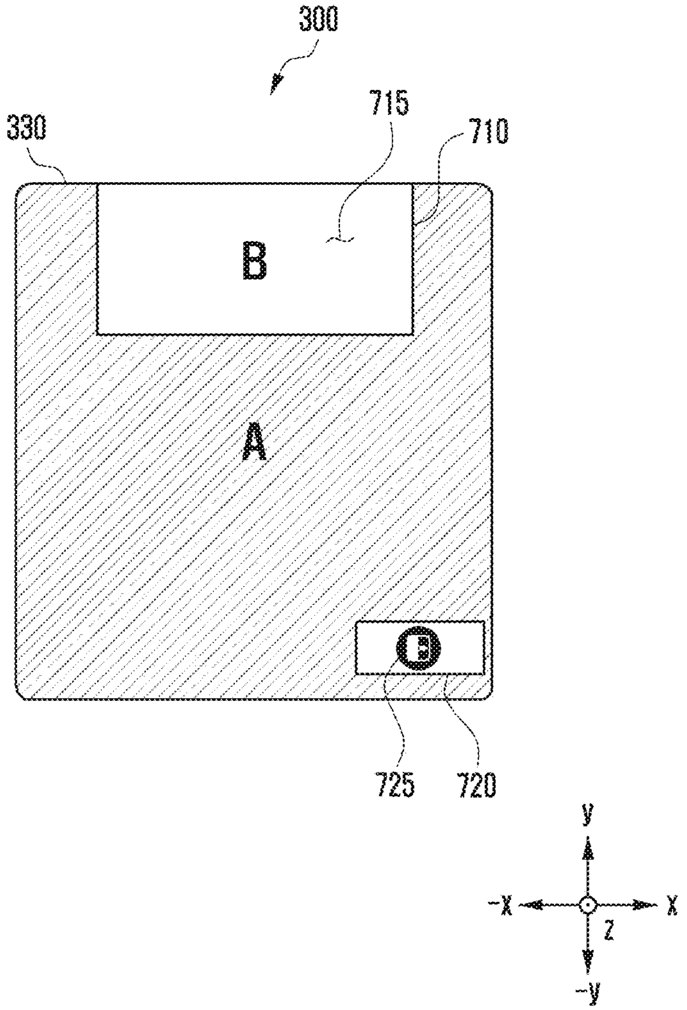
Figure 20C:
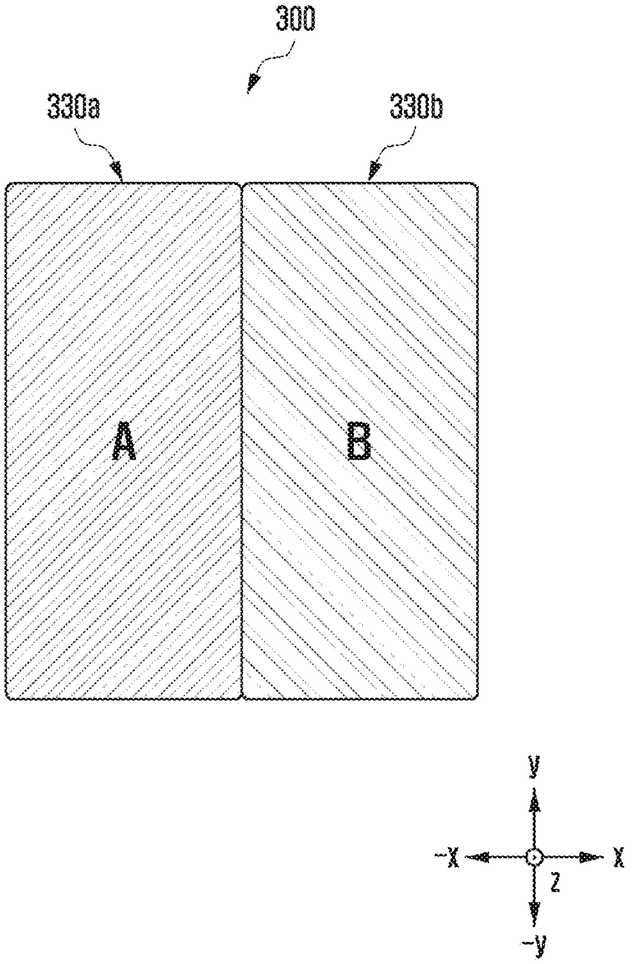

FIGS. 20A, 20B and 20C are diagrams illustrating a configuration in which the electronic device displays applications in response to receiving a notification while the flexible display is expanded according to various embodiments.

According to various embodiments, those embodiments described based on the electronic device 101 of FIG. 1 and the electronic device 300 of FIGS. 2 to 19 may be applied substantially the same to the embodiments to be described in greater detail below.

According to an embodiment, FIG. 20A may be a diagram showing a state where, while the electronic device 300 is in the slide-out state (e.g., second state) and the first display area 330*a* and the second display area 330*b* of the flexible display 330 are expanded, a first application A in execution is displayed on the first display area 330*a* and the second display area 330*b* of the flexible display 330.

With reference to FIG. 20A, while the electronic device 300 is in the slide-out state (e.g., second state), when the first display area 330*a* and the second display area 330*b* of the flexible display 330 are expanded, the processor 120 may display the first application A currently in execution (e.g., foreground application) on the first display area 330*a* and the second display area 330*b* of the flexible display 330.

According to an embodiment, FIG. 20B may be a diagram showing a state where, while the electronic device 300 is in the slide-out state and the first application A is being displayed on the first display area 330*a* and the second display area 330*b* of the flexible display 330, in response to reception of a notification (e.g., video call or message) from an external electronic device 102, 104 or 108, a notification 715 related to a second application B is displayed at a first position 710 of the flexible display 330 and a state change icon 725 (e.g., display expansion selection icon) is displayed at a second position 720 of the flexible display 330.

With reference to FIG. 20B, the electronic device 300 in the slide-out state may receive an event related to a notification 715 (e.g., second application B) from an external electronic device 102, 104 or 108 using the wireless communication module 192. Upon receiving an event related to the notification 715 from the external electronic device 102, 104 or 108, the processor 120 may display reception of the notification 715 related to a second application B at a first position 710 (e.g., upper portion (y-axis direction)) of the flexible display 330. When an event related to the notification 715 (e.g., second application B) is received from the external electronic device 102, 104 or 108, the processor 120 may generate a state change icon 725 at a second position 720 (e.g., lower portion (negative y-axis direction)) of the flexible display 330.

According to an embodiment, FIG. 20C may be a diagram showing a state where, when the user touches the state change icon 725 generated based on reception of the notification 715 by the electronic device 300 from the external electronic device 102, 104 or 108, the flexible display 330 displays the first application A using the first display area 330*a* and displays the second application B using the second display area 330*b*.

With reference to FIG. 20C, if the user touches the state change icon 725 while the electronic device 300 is in the slide-out state, the processor 120 may display the first application A in the foreground state on the first display area 330*a* (e.g., first display) of the flexible display 330, and display the second application B in the foreground state on the second display area 330*b* (e.g., second display). For example, to display the first application (A) and the second application (B) in the foreground state, the flexible display 330 may divide the display area into the first display area 330*a* and the second display area 330*b*.

FIGS. 21A, 21B, 21C and 21D are diagrams illustrating a configuration in which the electronic device displays applications in response to selecting a shared item while the flexible display is expanded according to various embodiments.

Figure 21A:
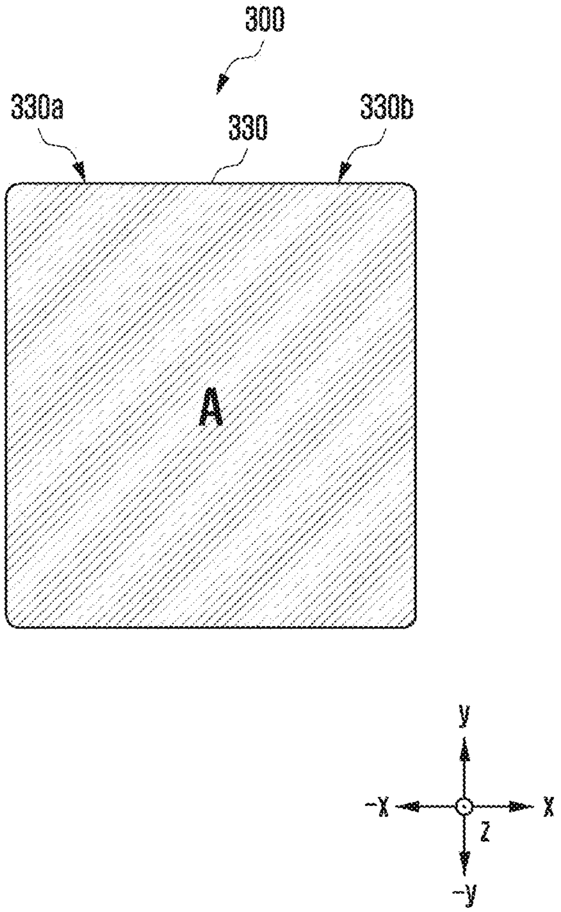
FIGS. 21A, 21B, 21C and 21D are diagrams illustrating a configuration in which the electronic device displays applications in response to selecting a shared item while the flexible display is expanded according to various embodiments.

With reference to FIG. 21A, while the electronic device 300 is in the slide-out state and the first display area 330*a* and the second display area 330*b* of the flexible display 330 are expanded, the processor 120 may display a first application A currently in execution (e.g., foreground application) on the first display area 330*a* and the second display area 330*b* of the flexible display 330.

Figure 21B:
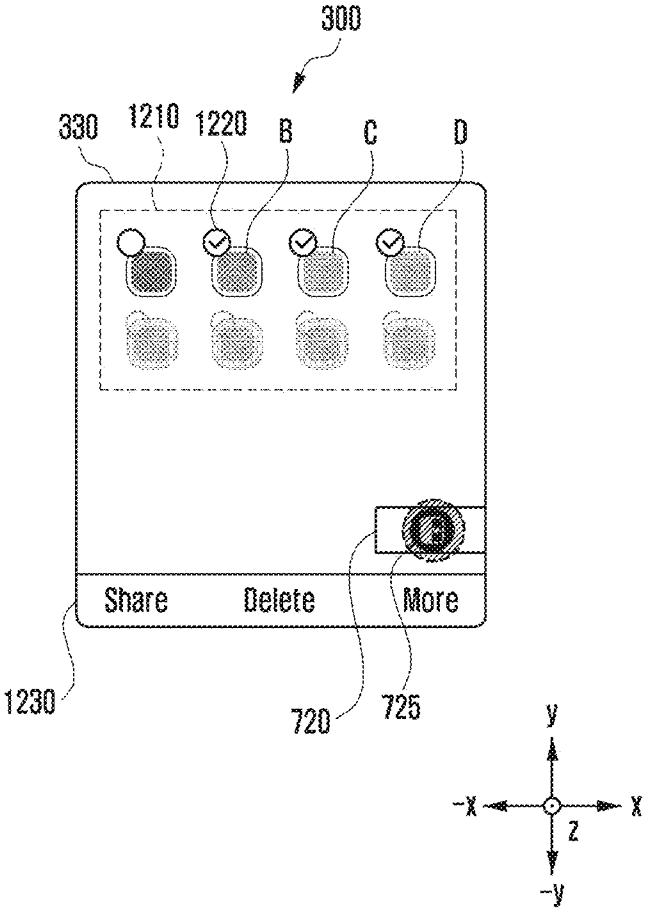

With reference to FIG. 21B, the electronic device 300 in the slide-out state may display a specific application including an item 1210 that can be shared with an external electronic device 102, 104 or 108 on the flexible display 330 (e.g., first display area 330*a* and second display area 330*b*) according to user's selection. In an embodiment, the shareable item 1210 may include at least one image and/or at least one video. The shareable item 1210 may include a check box 1220.

According to an embodiment, if the check box 1220 for a shareable item 1210 is selected (e.g., image B, image C, image D in FIG. 21C), the processor 120 may generate a state change icon 725 (e.g., display expansion selection icon) at a second position 720 while the first application A is being displayed on the flexible display 330. According to various embodiments, when the check box 1220 for a shareable item 1210 is selected (e.g., image B, image C, image D in FIG. 21), the processor 120 may generate a navigation bar 1230 including items such as Share, Delete, and More at a lower portion of the flexible display 330.

Figure 21C:
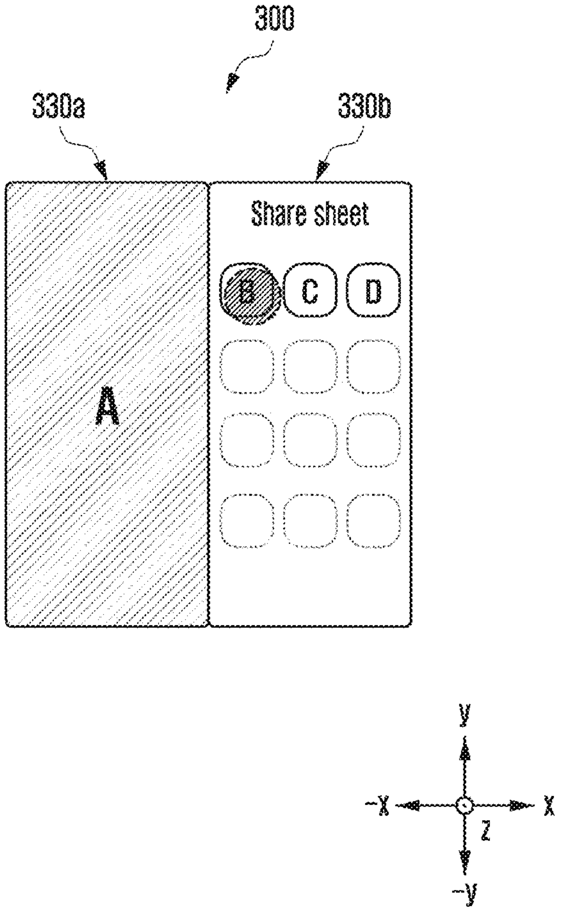

With reference to FIG. 21C, if the user touches the state change icon 725 while the electronic device 300 is in the slide-out state, the processor 120 may display the first application A in the foreground state on the first display area 330*a* (e.g., first display) of the flexible display 330, and display items related to image B, image C, and image D selected using the check box 1220 in the foreground state on the second display area 330*b* (e.g., second display).

Figure 21D:
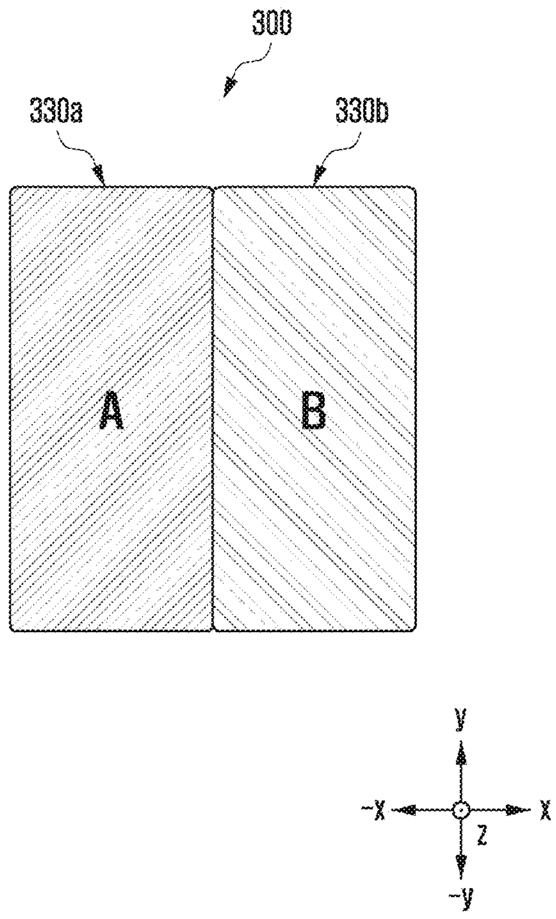

With reference to FIGS. 21C and 21D, if an item related to image B among image B, image C, and image D displayed on the second display area 330*b* (e.g., second display) is touched while the electronic device 300 is in the slide-out state, the processor 120 may display a second application B related to image B on the second display area 330*b*. For example, to display the first application A and the second application B in the foreground state, the flexible display 330 may divide the display area into the first display area 330*a* and the second display area 330*b*.

FIGS. 22A, 22B, 22C and 22D are diagrams illustrating a configuration in which the electronic device displays applications in response to long pressing on an object containing a hyperlink while the flexible display is expanded according to various embodiments.

Figure 22A:
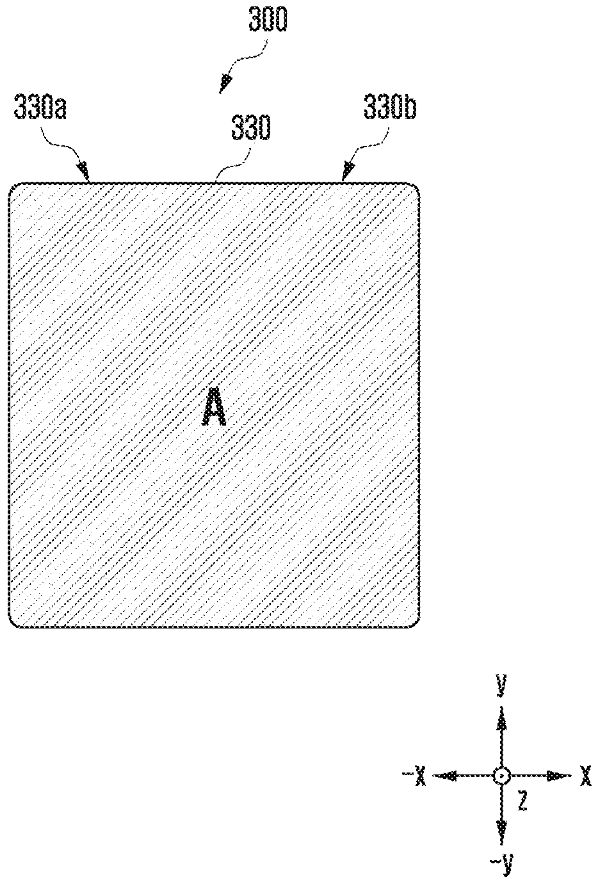
FIGS. 22A, 22B, 22C and 22D are diagrams illustrating a configuration in which the electronic device displays applications in response to long pressing on an object containing a hyperlink while the flexible display is expanded according to various embodiments.

With reference to FIG. 22A, when the electronic device 300 is in the slide-out state and the first display area 330*a* and the second display area 330*b* of the flexible display 330 are expanded, the processor 120 may display a first application A currently in execution (e.g., foreground application) on the first display area 330*a* and the second display area 330*b* of the flexible display 330.

Figure 22B:
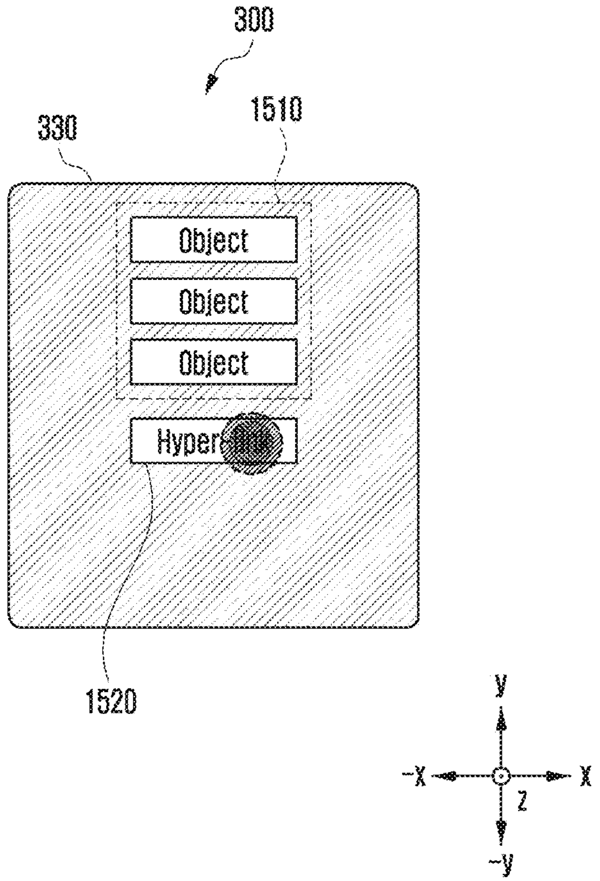

With reference to FIG. 22B, the electronic device 300 in the slide-out state may display a specific application that shares content (e.g., live broadcast) with an external electronic device 102, 104 or 108 on the flexible display 330 (e.g., first display area 330*a* and second display area 330*b*) according to user's selection. In an embodiment, the specific application that shares content may include at least one of at least one object 1510 (e.g., advertisement and live broadcast host video) or an object 1520 including a hyperlink.

Figure 22C:
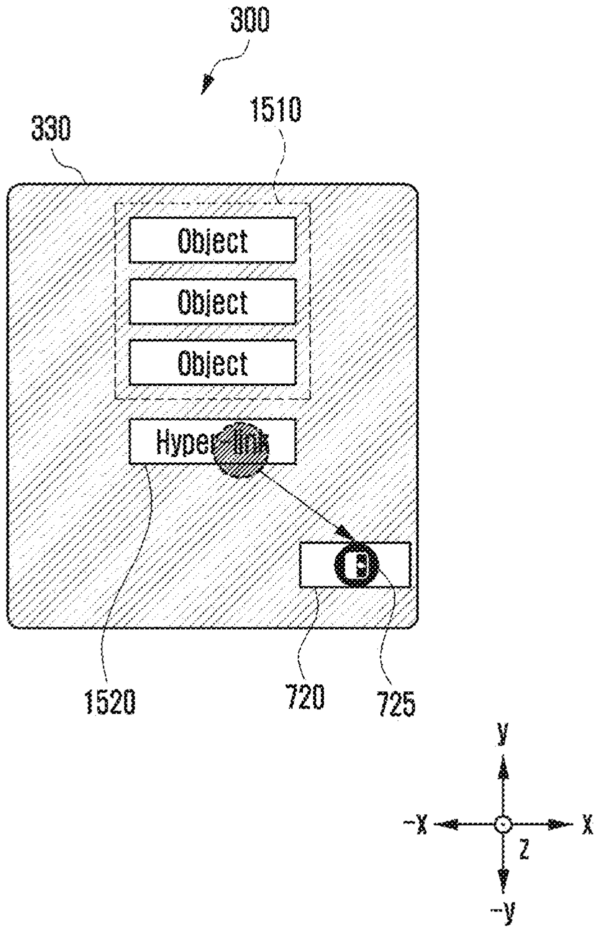
Figure 22D:
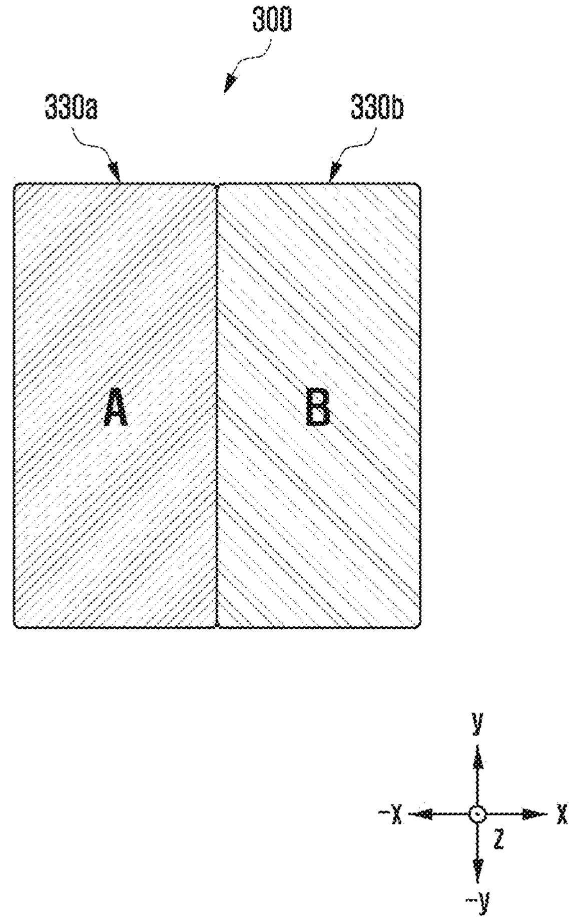

With reference to FIGS. 22B, 22C and 22D, if the user long-presses the object 1520 including a hyperlink for a specific time (e.g., about 1 to 3 seconds) while the electronic device 300 is in the slide-out state, the processor 120 may generate a state change icon 725 (e.g., display expansion selection icon) at a second position 720 of the flexible display 330. If the object 1520 including a hyperlink is dragged and dropped onto the state change icon 725 while being long-pressed, the processor 120 may display the first application A (e.g., foreground) on the first display area 330*a* (e.g., first display) of the flexible display 330, and display content (e.g., product advertisement) related to the object 1520 including a hyperlink as a second application B on the second display area 330*b* (e.g., second display area). For example, to display the first application A and the second application B in the foreground state, the flexible display 330 may divide the display area into the first display area 330*a* and the second display area 330*b*.

Figure 23A:
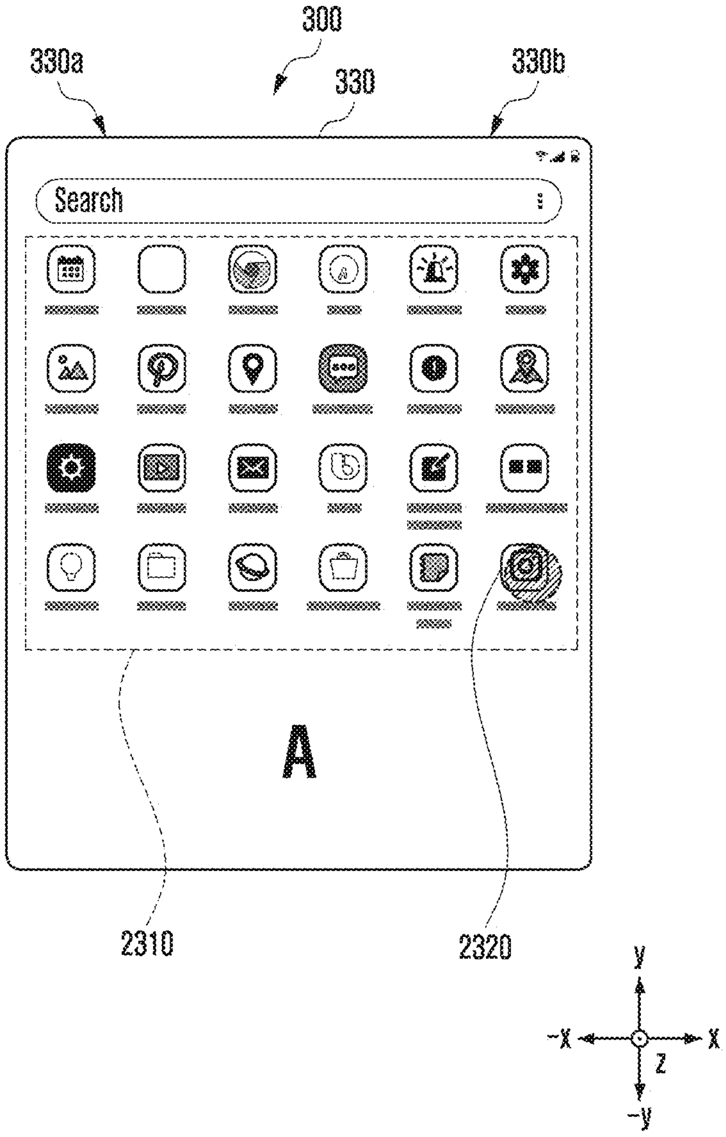
FIGS. 23A, 23B and 23C are diagrams illustrating a configuration in which the electronic device displays an application with a specified ratio while the flexible display is expanded according to various embodiments.
Figure 23B:
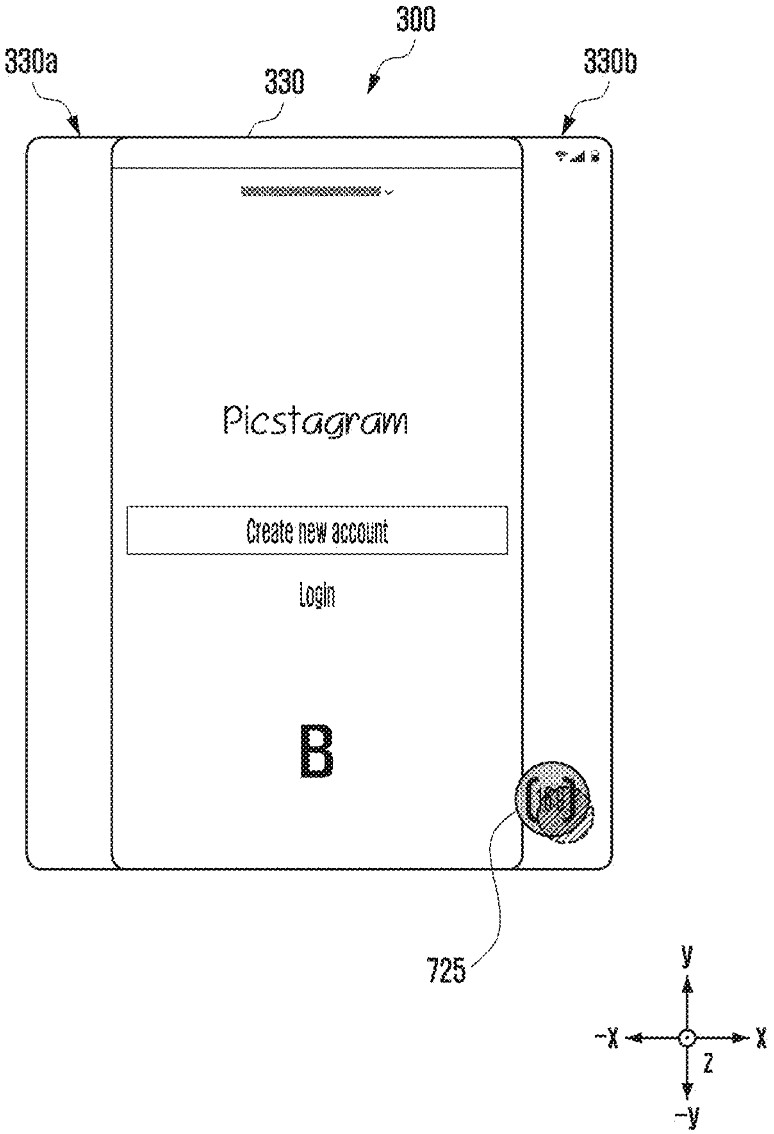
Figure 23C:
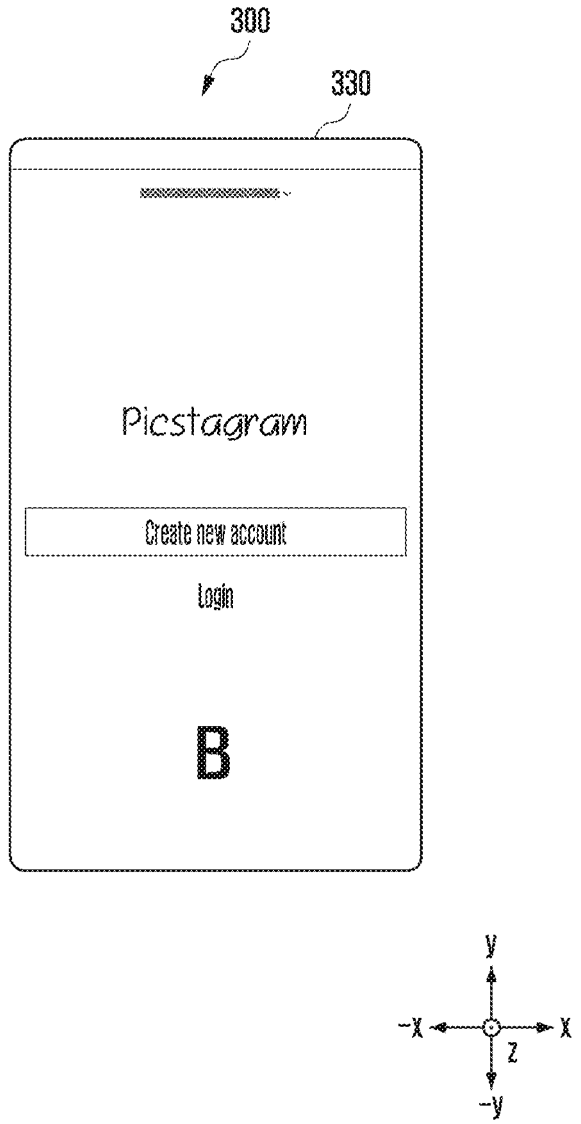

FIGS. 23A, 23B and 23C are diagrams illustrating a configuration in which the electronic device displays an application with a specified ratio while the flexible display is expanded according to various embodiments.

With reference to FIG. 23A, when the electronic device 300 is in the slide-out state and the first display area 330*a* and the second display area 330*b* of the flexible display 330 are expanded, the processor 120 may display a first application A currently in execution (e.g., foreground application) on the first display area 330*a* and the second display area 330*b* of the flexible display 330. According to an embodiment, the first application A may include at least one application execution icon 2310.

With reference to FIG. 23B, if the user touches a specific application execution icon 2320 (e.g., picstagram) among the at least one application execution icon 2310 included in the first application A while the electronic device 300 is in the slide-out state, the processor 120 may display a second application B related to the specific application (e.g., picstagram) on some of the first display area 330 and the second display area 330*b* of the flexible display 330, and generate a state change icon 725 on the second display area 330*b*. In the embodiment related to FIG. 23, the state change icon 725 may be an icon that may be used to adjust the second display area 330*b* of the flexible display 330. In an embodiment, the second application B related to the specific application (e.g., picstagram) may be an application with a specified ratio.

With reference to FIGS. 23B and 23C, if the user touches the state change icon 725 while the electronic device 300 is in the slide-out state, the processor 120 may switch the electronic device 300 to the slide-in state. In an embodiment, when the electronic device 300 is switched to the slide-in state, the second display area 330*b* of the flexible display 330 may be slid in one direction (e.g., negative x-axis direction) to be reduced in correspondence to the display area of the second application B having a specified ratio.

An electronic device according to an example embodiment of the disclosure may include: a wireless communication module including wireless communication circuitry; a first housing; a second housing slidably coupled to the first housing; a flexible display including a first display area visible in a slide-in state based on the second housing being slid in the first housing and a second display area visible in a slide-out state based on the second housing being slid out of the first housing; a memory; and at least one processor, comprising processing circuitry, operably connected to the wireless communication module, the flexible display, and the memory, wherein at least one processor, individually and/or collectively, may be configured to cause the electronic device to: display a first application on the first display area in the slide-in state where the second housing is slid in the first housing, display, in response to receiving a notification related to a second application from an external electronic device (e.g., external electronic device 102 or 104, or server 108 in FIG. 1) through the wireless communication module, the notification at a first position of the first display area, generate a state change icon at a second position of the first display area based on reception of the notification, and switch, in response to touching the state change icon, the second housing from the slide-in state to the slide-out state and display the second application corresponding to the notification on the second display area.

According to an example embodiment, at least one processor, individually and/or collectively, may be configured to operate the first application in a foreground state on the first display area, and operate the second application in the foreground state on the second display area.

According to an example embodiment, at least one processor, individually and/or collectively, may be configured to control at least one of the notification or the state change icon to disappear from the first display area based on the first application being displayed on the second display area.

According to an example embodiment, at least one processor, individually and/or collectively, may be configured to switch the second housing from the slide-out state to the slide-in state based on the second application ending or an end icon displayed on the second application being touched.

According to an example embodiment, at least one processor, individually and/or collectively, may be configured to generate the state change icon based on a long press signal being input on the first display area where the first application is displayed for a specific time based on the second housing being in the slide-in state.

According to an example embodiment, the notification may include one of a push notification, a sharing notification, and a hyperlink notification.

According to an example embodiment, the push notification may include one of receiving a video call, receiving a multimedia type message, or a plurality of text messages from the external electronic device; the sharing notification may include photo sharing or music sharing; and the hyperlink notification may include at least one hyperlink included in an application.

According to an example embodiment, at least one processor, individually and/or collectively, may be configured to generate a state change icon corresponding to a type of notification, and generate different state change icons depending on types of notification.

According to an example embodiment, at least one processor, individually and/or collectively, may be configured to display, based on the notification including a plurality of text messages received within a specific time, the plural text messages in a row according to the order of reception on the second display area.

According to an example embodiment, at least one processor, individually and/or collectively, may be configured to control the electronic device to display the second application on the first display area in response to touching the notification while the second housing is in the slide-in state.

According to an example embodiment, at least one processor, individually and/or collectively, may be configured to place the first application in a background state based on the second application being displayed on the first display area.

A method for controlling an electronic device according to an example embodiment of the disclosure may include: displaying, in a slide-in state based on a second housing being slid in a first housing (e.g., first state), a first application on a first display area of a flexible display; displaying, in response to receiving a notification related to a second application from an external electronic device, the notification at a first position of the first display area; generating a state change icon at a second position of the first display area based on reception of the notification; and switching, in response to touching the state change icon, the second housing from the slide-in state to a slide-out state, and displaying the second application on the second display area of the flexible display.

According to an example embodiment, the first application may be operated in a foreground state on the first display area, and the second application may be operated in the foreground state on the second display area.

According to an example embodiment, the method may include controlling at least one of the notification or the state change icon to disappear from the first display area based on the first application being displayed on the second display area.

According to an example embodiment, the method may include switching the second housing of the electronic device from the slide-out state to the slide-in state based on the second application ending or an end icon displayed on the second application is touched.

According to an example embodiment, the method may include generating the state change icon based on a long press signal being input on the first display area where the first application is displayed for a specific time based on the second housing of the electronic device being in the slide-in state.

According to an example embodiment, the notification may include one of a push notification, a sharing notification, and a hyperlink notification.

According to an example embodiment, the push notification may include one of receiving a video call, receiving a multimedia type message, or a plurality of text messages from the external electronic device; the sharing notification may include photo sharing or music sharing; and the hyperlink notification may include at least one hyperlink included in an application.

According to an example embodiment, the method may include displaying, based on the notification including a plurality of text messages received within a specific time, the plural text messages in a row according to the order of reception on the second display area.

According to an example embodiment, the method may include displaying the second application on the first display area in response to touching the notification based on the second housing of the electronic device being in the slide-in state.

According to an example embodiment, the method may include placing the first application in a background state based on the second application being displayed on the first display area.

While the disclosure has been illustrated and described with reference to various example embodiments thereof, it will be understood that the various example embodiments are intended to be illustrative, not limiting. It will be further understood by those skilled in the art that many variations and modifications may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a wireless communication module comprising wireless communication circuitry;

a first housing;

a second housing slidably coupled to the first housing;

a flexible display including a first display area exposed to outside in a slide-in state based on movement of the second housing in a first direction and a second display area exposed to outside in a slide-out state based on the movement of the second housing in a second direction, wherein the flexible display includes a touch panel to receive a user touch input;

memory comprising one or more storage media storing instructions; and at least one processor comprising processing circuitry, wherein the instructions, when executed by the at least one processor individually or collectively, cause the electronic device to:

display a first application on the first display area in the slide-in state, in response to receiving a notification related to a second application from an external electronic device through the wireless communication module, display the notification at a first position of the first display area and a state change icon at a second position of the first display area, wherein the state change icon is an icon to transition the electronic device from the slide-in state to the slide-out state, in case that the user touch input is received with respect to the notification at the first position, display an execution screen of the second application on the first display area in the slide-in state, the execution screen corresponding to the received notification, and in case that the user touch input is received with respect to the state change icon at the second position, switch the electronic device from the slide-in state to the slide-out state and display the execution screen of the second application on the second display area.

2. The electronic device of claim 1, wherein the instructions, when executed by the at least one processor individually or collectively, cause the electronic device to:

operate the first application in a foreground state on the first display area, and operate the second application in the foreground state on the second display area.

3. The electronic device of claim 1, wherein the instructions, when executed by the at least one processor individually or collectively, cause the electronic device to control at least one of the notification or the state change icon to disappear from the first display area based on the execution screen of the second application being displayed on the second display area.

4. The electronic device of claim 1, wherein the instructions, when executed by the at least one processor individually or collectively, cause the electronic device to switch the electronic device from the slide-out state to the slide-in state based on the execution screen of the second application ending or an end icon displayed on the second application being touched.

5. The electronic device of claim 1, wherein the instructions, when executed by the at least one processor individually or collectively, cause the electronic device to generate the state change icon based on a long press signal being input on the first display area where the first application is displayed for a specific time based on the second housing being in the slide-in state.

6. The electronic device of claim 1, wherein the notification includes one of a push notification, a sharing notification, or a hyperlink notification.

7. The electronic device of claim 6, wherein:

the push notification includes one of receiving a video call, receiving a multimedia type message, or a plurality of text messages from the external electronic device;

the sharing notification includes photo sharing or music sharing; or the hyperlink notification includes at least one hyperlink included in an application.

8. The electronic device of claim 1, wherein the instructions, when executed by the at least one processor individually or collectively, cause the electronic device to generate a state change icon corresponding to a type of notification, and generate different state change icons depending on types of notification.

9. A method of controlling an electronic device, the method comprising:

displaying, in a slide-in state based on a second housing being slid in a first housing, a first application on a first display area of a flexible display;

in response to receiving a notification related to a second application from an external electronic device, displaying the notification at a first position of the first display area and a state change icon at a second position of the first display area, wherein the state change icon is an icon to transition the electronic device from the slide-in state to a slide-out state;

in case that a user touch input is received with respect to the notification at the first position, displaying an execution screen of the second application on the first display area in the slide-in state, the execution screen corresponding to the received notification; and in case that the user touch input is received with respect to the state change icon at the second position, switching the electronic device from the slide-in state to the slide-out state, and displaying the execution screen of the second application on a second display area of the flexible display.

10. The method of claim 9, wherein:

the first application is operated in a foreground state on the first display area; and the second application is operated in a foreground state on the second display area.

11. The method of claim 9, comprising controlling at least one of the notification or the state change icon to disappear from the first display area based on the execution screen of the second application being displayed on the second display area.

12. The method of claim 9, comprising switching the electronic device from the slide-out state to the slide-in state based on the execution screen of the second application ending or an end icon displayed on the second application is touched.

13. The method of claim 9, comprising generating the state change icon based on a long press signal being input on the first display area where the first application is displayed for a specific time based on the second housing being in the slide-in state.

14. The method of claim 9, wherein:

the notification includes one of a push notification, a sharing notification, or a hyperlink notification;

the push notification includes one of receiving a video call, receiving a multimedia type message, or a plurality of text messages from the external electronic device;

the sharing notification includes photo sharing or music sharing; or the hyperlink notification includes at least one hyperlink included in an application.

* * * * *